US011079080B2

(12) United States Patent
Chien

(10) Patent No.: US 11,079,080 B2
(45) Date of Patent: Aug. 3, 2021

(54) LED LIGHT HAS IMAGE AND/OR PATTERNS PROJECTION

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 272 days.

(21) Appl. No.: 15/816,260

(22) Filed: Nov. 17, 2017

(65) Prior Publication Data

US 2018/0231199 A1 Aug. 16, 2018

Related U.S. Application Data

(60) Continuation-in-part of application No. 14/967,862, filed on Dec. 14, 2015, which is a (Continued)

(51) Int. Cl.
*F21V 13/00* (2006.01)
*F21S 8/00* (2006.01)

(Continued)

(52) U.S. Cl.
CPC .............. *F21S 8/035* (2013.01); *F21K 9/232* (2016.08); *F21S 4/28* (2016.01); *F21S 9/02* (2013.01);

(Continued)

(58) Field of Classification Search
CPC .. F21S 8/035; F21S 10/007; F21S 4/28; F21S 9/02; F21V 14/08; F21V 14/06;

(Continued)

(56) References Cited

U.S. PATENT DOCUMENTS

| | | |
|---|---|---|
| 3,762,082 A | 10/1973 | Mincy |
| 4,779,176 A | 10/1988 | Bornhorst |

(Continued)

*Primary Examiner* — Y M. Lee
(74) *Attorney, Agent, or Firm* — Bacon & Thomas, PLLC

(57) ABSTRACT

The AC power source LED light device has moving image has the moving projected image or-and lighted patterns by (1) circuitry control LEDs on-off time for desired time or period, or (2) magnetic field force to making moving, or (3) motor or movement to make move or changing of (A) the image-carrier which has preferred film/piece has opening/printed piece/textures lens/treated lens/prism-lens/variable thickness lens/marked lens/sild/film/window/craving treated lens/laser craving/or marked piece of different material/or printed piece with arts, or (B) at least one of plurality of project refractive-lens in disc or holder, or (C) LED(s); to move or change position, or location. All big images or lighted patterns or lighted arts created from LED(s) emit light beam through image-carrier as 1$^{st}$ optics-lens then through the 2$^{nd}$ optics-lens as (i) project-cover or (ii) refractive-lens; those at least has refractive or-and protective function to make the tiny lighted image or patterns created by image-carrier or texture-lens to passing though refraction properties project-cover or refractive-lens or protective-lens to get the bigger size or colorful or steady or moving bigger size image or-and patterns with predetermined view angle and size to shown on (a) building, house, fence, wall for outdoor, or (b) ceiling, walls, floor for indoors application. The said moving image effect created by having at least one of the said 3 basic-parts project-assembly fit into or built-into or install to all kind of different light's housing construction of LED projection light for outdoor or-and indoor application(s) said LED light image or lighted patterns has moving, shaking, spin, rotating, vibration to get the desired moving or-and changing effect(s) and other unique features.

53 Claims, 31 Drawing Sheets

Related U.S. Application Data continuation-in-part of application No. 14/539,267, filed on Nov. 12, 2014, which is a continuation-in-part of application No. 14/275,184, filed on May 12, 2014, now Pat. No. 10,371,330, which is a continuation of application No. 12/914,584, filed on Oct. 28, 2010, now Pat. No. 8,721,160, which is a division of application No. 12/318,470, filed on Dec. 30, 2008, now abandoned, application No. 15/816,260, which is a continuation-in-part of application No. 15/402,965, filed on Jan. 10, 2017, now Pat. No. 10,151,451, which is a continuation-in-part of application No. 14/606,242, filed on Jan. 27, 2015, now Pat. No. 9,541,260, which is a continuation-in-part of application No. 13/367,758, filed on Feb. 7, 2012, now Pat. No. 8,967,831, application No. 15/816,260, which is a continuation-in-part of application No. 15/296,599, filed on Oct. 18, 2016, now Pat. No. 10,228,112, which is a continuation of application No. 14/503,647, filed on Oct. 1, 2014, now Pat. No. 9,719,654, which is a division of application No. 14/451,822, filed on Aug. 5, 2014, now Pat. No. 10,047,922, which is a continuation-in-part of application No. 14/323,318, filed on Jul. 3, 2014, now Pat. No. 10,222,015, which is a continuation-in-part of application No. 14/023,889, filed on Sep. 11, 2013, now Pat. No. 10,323,811, application No. 15/816,260, which is a continuation-in-part of application No. 15/494,477, filed on Apr. 22, 2017, which is a continuation-in-part of application No. 15/355,515, filed on Nov. 18, 2016, which is a continuation-in-part of application No. 14/289,968, filed on May 29, 2014, now Pat. No. 9,551,477, which is a continuation-in-part of application No. 14/280,865, filed on May 19, 2014, now Pat. No. 9,581,299, which is a continuation-in-part of application No. 13/540,729, filed on Jul. 3, 2012, now abandoned, which is a continuation of application No. 13/296,508, filed on Nov. 15, 2011, now Pat. No. 8,562,158, and a continuation-in-part of application No. 13/296,469, filed on Nov. 15, 2011, now Pat. No. 8,711,216.

(51) Int. Cl.

| | |
|---|---|
| ***F21V 21/08*** | (2006.01) |
| ***F21S 9/02*** | (2006.01) |
| ***F21V 21/14*** | (2006.01) |
| ***F21V 23/04*** | (2006.01) |
| ***F21S 10/00*** | (2006.01) |
| ***F21S 4/28*** | (2016.01) |
| ***F21V 29/00*** | (2015.01) |
| ***F21K 9/232*** | (2016.01) |
| ***G03B 21/14*** | (2006.01) |
| ***F21V 21/22*** | (2006.01) |
| ***F21V 23/00*** | (2015.01) |
| ***F21V 33/00*** | (2006.01) |
| ***F21V 14/00*** | (2018.01) |
| ***G03B 23/00*** | (2006.01) |
| ***F21V 13/02*** | (2006.01) |
| ***G03B 21/20*** | (2006.01) |
| ***F21V 5/04*** | (2006.01) |
| ***F21V 17/02*** | (2006.01) |
| ***G02F 1/13*** | (2006.01) |
| ***F21V 14/06*** | (2006.01) |
| ***F21V 14/08*** | (2006.01) |
| ***G03B 21/00*** | (2006.01) |
| *F21V 21/30* | (2006.01) |
| *F21Y 115/10* | (2016.01) |
| *F21V 21/29* | (2006.01) |
| *F21W 121/00* | (2006.01) |
| *F21Y 101/00* | (2016.01) |

(52) U.S. Cl.

CPC .......... *F21S 10/002* (2013.01); *F21S 10/007* (2013.01); *F21V 5/04* (2013.01); *F21V 13/02* (2013.01); *F21V 14/003* (2013.01); *F21V 14/006* (2013.01); *F21V 14/06* (2013.01); *F21V 14/08* (2013.01); *F21V 17/02* (2013.01); *F21V 21/08* (2013.01); *F21V 21/14* (2013.01); *F21V 21/22* (2013.01); *F21V 23/00* (2013.01); *F21V 23/04* (2013.01); *F21V 29/00* (2013.01); *F21V 33/0052* (2013.01); *G02F 1/1313* (2013.01); *G03B 21/001* (2013.01); *G03B 21/142* (2013.01); *G03B 21/2033* (2013.01); *G03B 21/2046* (2013.01); *G03B 23/00* (2013.01); *F21V 21/29* (2013.01); *F21V 21/30* (2013.01); *F21V 23/0442* (2013.01); *F21V 23/0471* (2013.01); *F21W 2121/00* (2013.01); *F21Y 2101/00* (2013.01); *F21Y 2115/10* (2016.08); *Y10S 362/80* (2013.01); *Y10S 362/806* (2013.01)

(58) Field of Classification Search

CPC .......... F21V 14/006; F21V 17/02; F21V 5/04; F21V 13/02; F21V 23/00; F21V 21/22; F21V 29/00; F21V 21/14; F21V 21/08; F21V 23/0471; F21V 23/0442; F21V 21/29; F21V 21/30; G03B 21/2046; G03B 23/00; F21K 9/232; F21Y 2101/00; Y10S 362/806; F21W 2121/00

See application file for complete search history.

(56) References Cited

U.S. PATENT DOCUMENTS

| | | | | |
|---|---|---|---|---|
| 6,267,478 | B1 | 7/2001 | Chen | |
| 6,416,195 | B1 | 7/2002 | Lin | |
| 6,558,022 | B2 | 5/2003 | Kawahara | |
| 7,056,006 | B2 | 6/2006 | Smith | |
| 7,736,020 | B2 | 6/2010 | Baroky et al. | |
| 7,748,869 | B2 | 7/2010 | Sevack | |
| 7,789,532 | B2 | 9/2010 | Toriyama | |
| 7,871,192 | B2 | 1/2011 | Chien | |
| 8,113,698 | B2 | 2/2012 | Wu et al. | |
| 8,128,259 | B2 | 3/2012 | Myers | |
| 8,262,252 | B2 | 9/2012 | Bergman | |
| 8,721,160 | B2 | 5/2014 | Chien | |
| 8,827,496 | B2 | 9/2014 | Vanderschuit | |
| 8,834,009 | B2 | 9/2014 | Chien | |
| 8,847,491 | B2 | 9/2014 | Yotsumoto | |
| 9,081,269 | B2 | 7/2015 | Conti | |
| 9,107,248 | B2 | 8/2015 | Chen | |
| 9,134,012 | B2 | 9/2015 | Wu | |
| 9,206,952 | B2 | 12/2015 | Gold | |
| 9,217,555 | B2 | 12/2015 | Farmer | |
| 9,316,838 | B2 | 4/2016 | Chien | |
| 2001/0007527 | A1* | 7/2001 | Lammers ................ | F21S 6/002 362/294 |
| 2010/0238672 | A1 | 9/2010 | Wu | |
| 2011/0116266 | A1 | 5/2011 | Kim | |
| 2011/0134239 | A1 | 6/2011 | Vadai | |
| 2012/0176782 | A1* | 7/2012 | VanderSchuit ......... | F21V 14/08 362/184 |
| 2014/0306599 | A1 | 10/2014 | Edwards | |
| 2014/0340880 | A1* | 11/2014 | Benner .................. | F21V 21/14 362/253 |

* cited by examiner (# FF-2008) Parent Case

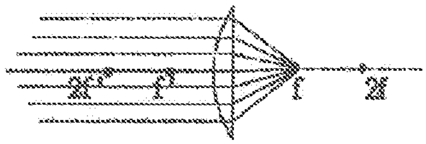

FIG. 6

Base Physic theory for Lens focus

FIG. 7

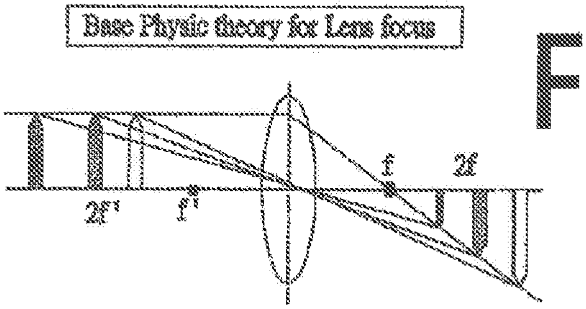

Basci Physic theory
Relation of object v.s. image v.s. focus of lens.
1.object on 2f' object has same size of image on 2f.
2.object between f' and 2f' -->
image behind 2f with large reverse image.
3. object away from 2f' -->
the image will fall within 1f and 2f
with smaller and reverse image.

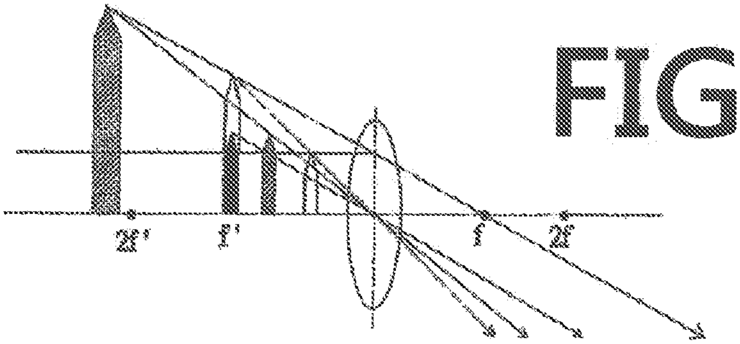

FIG.8

Object location < f' =>
Image located on the same side of the f'. Image size will become more smaller while the object more close the lens.

FIG. 9

Parent filed case

US 20160097499A1

(19) United States

Chien

(10) Pub. No.: US 2016/0097499 A1

(43) Pub. Date: Apr. 7, 2016

(54) LED PROJECTION NIGHT LIGHT

(71) Applicant: Tseng-Lu Chien, Walnut, CA (US)

(72) Inventor: Tseng-Lu Chien, Walnut, CA (US)

(21) Appl. No.: 14/967,862 (#FF-4)

(22) Filed: Dec. 14, 2015 (#FF-3)

Related U.S. Application Data

(60) Continuation of application No. 14/539,267, filed on Nov. 12, 2014, which is a division of application No. 14/275,184, filed on May 12, 2014, which is a division of application No. 12/318,470, filed on Dec. 30, 2008, now abandoned. Continuation of application No. 11/806,288, filed on May 31, 2007, now abandoned.

(#FF-2) (#Q-2007) (#FF-2008)

Publication Classification

(51) Int. Cl.

| | |
|---|---|
| F21S 8/00 | (2006.01) |
| F21V 14/08 | (2006.01) |
| F21V 21/33 | (2006.01) |
| F21V 13/02 | (2006.01) |
| F21V 14/06 | (2006.01) |
| F21V 14/08 | (2006.01) |
| F21V 5/04 | (2006.01) |

(52) U.S. Cl.

CPC ........ F21S 8/035 (2013.01); F21V 14/006 (2013.01); F21V 14/08 (2013.01); F21V 5/04 (2013.01); F21V 13/02 (2013.01); F21V 14/06 (2013.01); F21V 21/32 (2013.01); F21Y 2101/02 (2013.01)

(57) ABSTRACT

An LED projection night light for night time or dark area use includes a plug-in wall outlet night light or direct current operated night light with projection features to project an image, message, data, logo, or time on a ceiling, walls, floor, or other desired surface. The LED night light incorporates optics-lens and Object with preferred focus calculation to create bigger image to shown on locations. The parts for make night light including but not limited as an optics lens, slides, openings, or cut-outs, and/or a transparent material piece, translucent material piece, telescope assembly, housing-member, slide-film, slide-disc, elastic-member, tilt-means, rotating-means, adjust-means, motor-means, mechanical-means, gear-means, convex lens, and/or concave lens designed to make the desired image, message, data, logo, or time project to the ceiling, walls, floor, or other desired surface to be seen by a viewer. The LED light upgrade model has an interchangeable power source arrangement, permitting the night light to be selectively powered by either an AC powered socket-unit or a DC powered battery-pack.

Fig 2

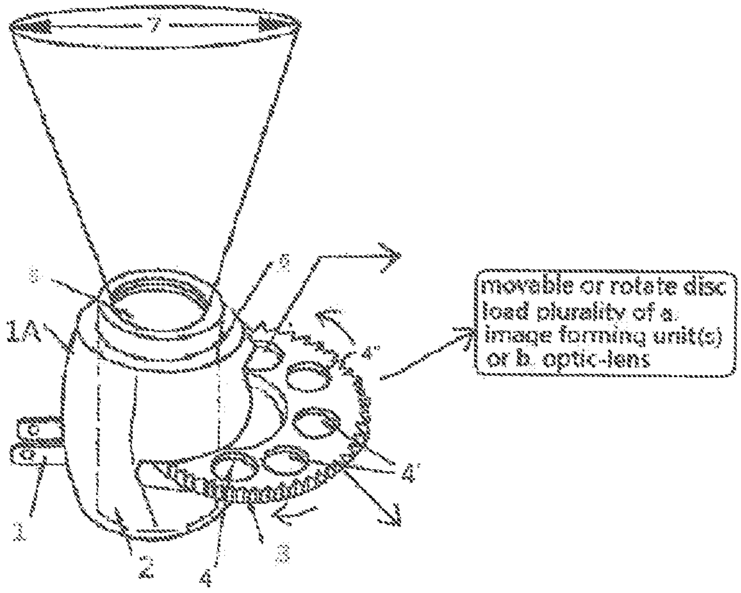

Patent Application Publication Nov. 19, 2009 Sheet 1 of 7 US 2009/0284960 A1
Patent Application Publication Apr. 7, 2016 Sheet 1 of 7 US 2016/0097499 A1
(# FF-4) Public data
=Pending case Patent Application Publication Jan. 13, 2011 Sheet 35 of 35 US 2011/0007496 A1

(# TT-2010) Public data
=Pending case

Patent Application Publication Nov. 19, 2009 Sheet 2 of 7 US 2009/0284960 A1
Patent Application Publication Jan. 13, 2011 Sheet 30 of 35 US 2011/0007496 A1
Co-Pending (# TT-2010) Public
Patent Application Publication Apr. 7, 2016 Sheet 2 of 7 US 2016/0097499 A1
co-pending: method and detail of inter-changeable power source & changeable slide/fim & fix angle & 180 adjust angle
Co-Pending (# FF-4) Public
Parent (# FF-2008) Filed on 2008
FIG. 15
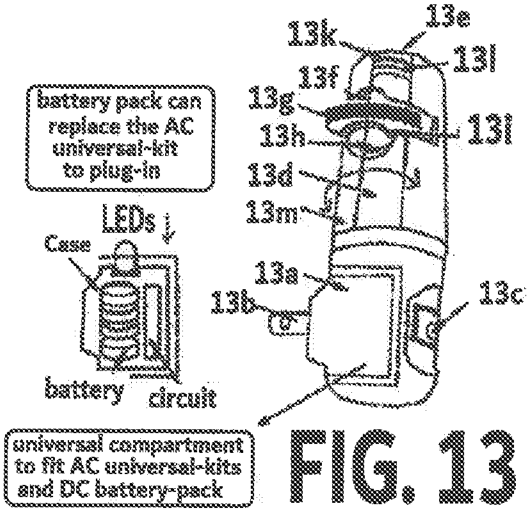
FIG. 13
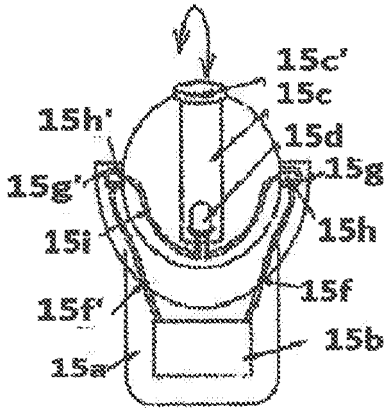
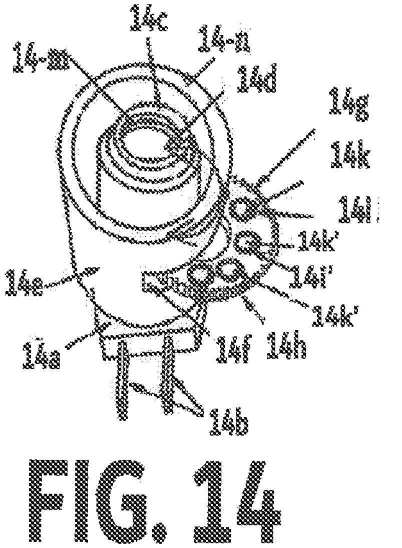
FIG. 14
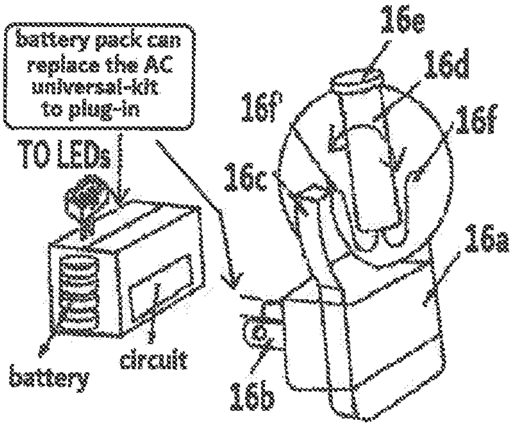
FIG. 16

FIG. 17

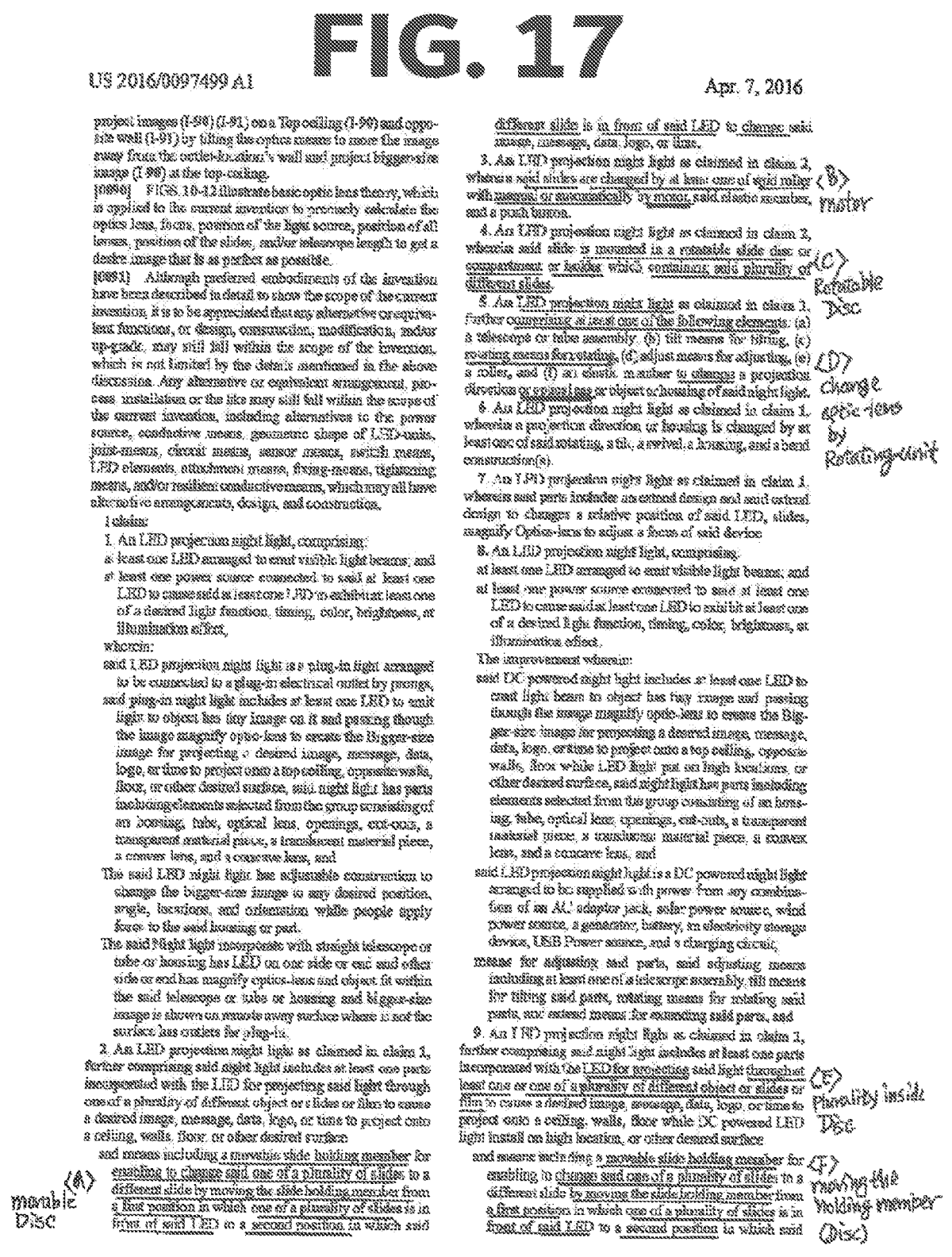

US 2016/0097499 A1 Apr. 7, 2016 project images (I-90) (I-91) on a Top ceiling (I-90) and opposite wall (I-91) by tilting the optics means to move the image away from the outlet-location's wall and project bigger-size image (I-90) at the top-ceiling.

[0090] FIGS. 10-12 illustrate basic optic lens theory, which is applied to the current invention to precisely calculate the optics lens, focus, position of the light source, position of all lenses, position of the slides, and/or telescope length to get a desire image that is as perfect as possible.

[0091] Although preferred embodiments of the invention have been described in detail to show the scope of the current invention, it is to be appreciated that any alternative or equivalent functions, or design, construction, modification, and/or up-grade, may still fall within the scope of the invention, which is not limited by the details mentioned in the above discussion. Any alternative or equivalent arrangement, process, installation or the like may still fall within the scope of the current invention, including alternatives to the power source, conductive means, geometric shape of LED-units, joint-means, circuit means, sensor means, switch means, LED elements, attachment means, fixing-means, tightening means, and/or resilient conductive means, which may all have alternative arrangements, design, and construction.

I claim:

1. An LED projection night light, comprising:

at least one LED arranged to emit visible light beams; and at least one power source connected to said at least one LED to cause said at least one LED to exhibit at least one of a desired light function, timing, color, brightness, or illumination effect, wherein:

said LED projection night light is a plug-in light arranged to be connected to a plug-in electrical outlet by prongs, said plug-in night light includes at least one LED to emit light to object has tiny image on it and passing though the image magnify optic-lens to create the Bigger-size image for projecting a desired image, message, data, logo, or time to project onto a top ceiling, opposite walls, floor, or other desired surface, said night light has parts including elements selected from the group consisting of an housing, tube, optical lens, openings, cut-outs, a transparent material piece, a translucent material piece, a convex lens, and a concave lens, and The said LED night light has adjustable construction to change the bigger-size image to any desired position, angle, locations, and orientation while people apply force to the said housing or part.

The said Night light incorporate with straight telescope or tube or housing has LED on one side or end and other side or end has magnify optics-lens and object fit within the said telescope or tube or housing and bigger-size image is shown on remote away surface where is not the surface has outlets for plug-in.

2. An LED projection night light as claimed in claim 1, further comprising said night light includes at least one parts incorporated with the LED for projecting said light through one of a plurality of different object or slides or film to cause a desired image, message, data, logo, or time to project onto a ceiling, walls, floor, or other desired surface and means including a movable slide holding member for enabling to change said one of a plurality of slides to a different slide by moving the slide holding member from a first position in which one of a plurality of slides is in front of said LED to a second position in which said different slide is in front of said LED to change said image, message, data, logo, or time.

movable ⟨A⟩ Disc

3. An LED projection night light as claimed in claim 2, wherein said slides are changed by at least one of said roller with manual or automatically by motor, said elastic member, and a push button. ⟨B⟩ motor 4. An LED projection night light as claimed in claim 2, wherein said slide is mounted in a rotatable slide disc or compartment or holder which containing said plurality of different slides. ⟨C⟩ Rotatable Disc 5. An LED projection night light as claimed in claim 1, further comprising at least one of the following elements: (a) a telescope or tube assembly, (b) tilt means for tilting, (c) rotating means for rotating, (d) adjust means for adjusting, (e) a roller, and (f) an elastic member to change a projection direction or optical lens or object or housing of said night light. ⟨D⟩ change optic lens by Rotating-unit 6. An LED projection night light as claimed in claim 1, wherein a projection direction, or housing is changed by at least one of said rotating, a tilt, a swivel, a housing, and a bend construction(s).

7. An LED projection night light as claimed in claim 1, wherein said parts includes an extend design and said extend design to changes a relative position of said LED, slides, magnify Optics-lens to adjust a focus of said device 8. An LED projection night light, comprising:

at least one LED arranged to emit visible light beams; and at least one power source connected to said at least one LED to cause said at least one LED to exhibit at least one of a desired light function, timing, color, brightness, or illumination effect, The improvement wherein:

said DC powered night light includes at least one LED to emit light beam to object has tiny image and passing though the image magnify optic-lens to create the Bigger-size image for projecting a desired image, message, data, logo, or time to project onto a top ceiling, opposite walls, floor while LED light put on high locations, or other desired surface, said night light has parts including elements selected from the group consisting of an housing, tube, optical lens, openings, cut-outs, a transparent material piece, a translucent material piece, a convex lens, and a concave lens, and said LED projection night light is a DC powered night light arranged to be supplied with power from any combination of an AC adaptor jack, solar power source, wind power source, a generator, battery, an electricity storage device, USB Power source, and a charging circuit, means for adjusting said parts, said adjusting means including at least one of a telescope assembly, tilt means for tilting said parts, rotating means for rotating said parts, and extend means for extending said parts, and 9. An LED projection night light as claimed in claim 1, further comprising said night light includes at least one parts incorporated with the LED for projecting said light through at least one or one of a plurality of different object or slides or film to cause a desired image, message, data, logo, or time to project onto a ceiling, walls, floor while DC powered LED light install on high location, or other desired surface ⟨E⟩ Plurality inside Disc and means including a movable slide holding member for enabling to change said one of a plurality of slides to a different slide by moving the slide holding member from a first position in which one of a plurality of slides is in front of said LED to a second position in which said ⟨F⟩ moving the holding member (Disc)

FIG. 18 different slide is in front of said LED to change said image, message, data, logo, or time.

Figure 18:
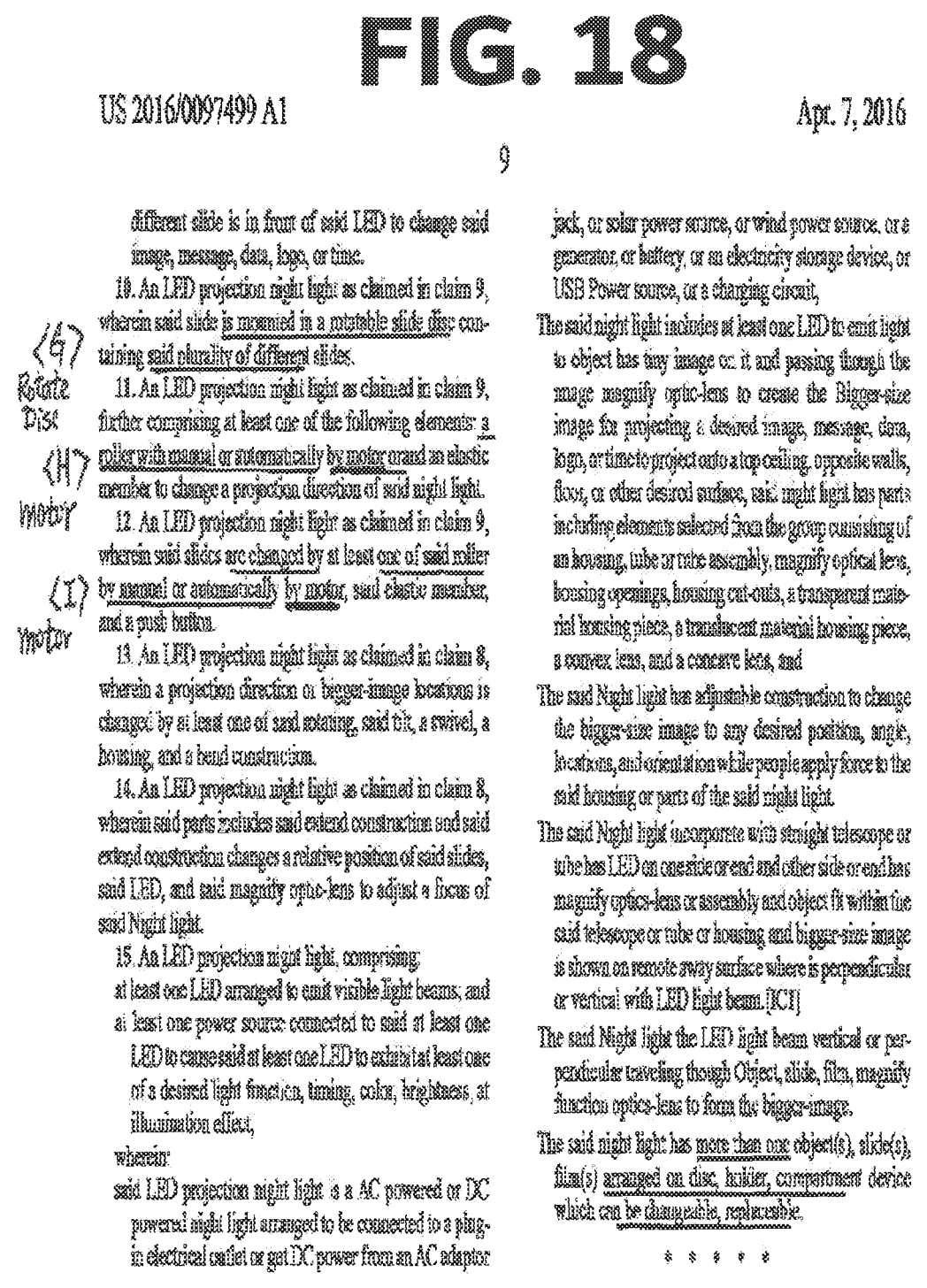

10. An LED projection night light as claimed in claim 9, wherein said slide is mounted in a rotatable slide disc containing said plurality of different slides.

<(G)> Rotate Disc

11. An LED projection night light as claimed in claim 9, further comprising at least one of the following elements: a roller with manual or automatically by motor orand an elastic member to change a projection direction of said night light.

<(H)> Motor

12. An LED projection night light as claimed in claim 9, wherein said slides are changed by at least one of said roller by manual or automatically by motor, said elastic member, and a push button.

<(I)> Motor

13. An LED projection night light as claimed in claim 8, wherein a projection direction or bigger-image locations is changed by at least one of said rotating, said tilt, a swivel, a housing, and a bend construction.

14. An LED projection night light as claimed in claim 8, wherein said parts includes said extend construction and said extend construction changes a relative position of said slides, said LED, and said magnify optic-lens to adjust a focus of said Night light.

15. An LED projection night light, comprising:

at least one LED arranged to emit visible light beams; and at least one power source connected to said at least one LED to cause said at least one LED to exhibit at least one of a desired light function, timing, color, brightness, at illumination effect, wherein:

said LED projection night light is a AC powered or DC powered night light arranged to be connected to a plug-in electrical outlet or get DC power from an AC adaptor jack, or solar power source, or wind power source, or a generator, or battery, or an electricity storage device, or USB Power source, or a charging circuit, The said night light includes at least one LED to emit light to object has tiny image on it and passing though the image magnify optic-lens to create the Bigger-size image for projecting a desired image, message, data, logo, or time to project onto a top ceiling, opposite walls, floor, or other desired surface, said night light has parts including elements selected from the group consisting of an housing, tube or tube assembly, magnify optical lens, housing openings, housing cut-outs, a transparent material housing piece, a translucent material housing piece, a convex lens, and a concave lens, and The said Night light has adjustable construction to change the bigger-size image to any desired position, angle, locations, and orientation while people apply force to the said housing or parts of the said night light.

The said Night light incorporate with straight telescope or tube has LED on one side or end and other side or end has magnify optics-lens or assembly and object fit within the said telescope or tube or housing and bigger-size image is shown on remote away surface where is perpendicular or vertical with LED light beam.[CI]

The said Night light the LED light beam vertical or perpendicular traveling though Object, slide, film, magnify function optics-lens to form the bigger-image.

The said night light has more than one object(s), slide(s), film(s) arranged on disc, holder, compartment device which can be changeable, replaceable.

* * * * *

Q-2007 Issued patent

US007632004B2

(12) United States Patent
Chien

(10) Patent No.: US 7,632,004 B2
(45) Date of Patent: Dec. 15, 2009

(54) LED NIGHT LIGHT WITH MORE THAN 1 OPTICS MEANS

(76) Inventor: Tseng-Lu Chien, 8F, No 29, Alley 73, Lin-Shen Road, Shi-Chi Town, Taipei Hsien (TW)

( * ) Notice: Subject to any disclaimer, the term of this patent is extended or adjusted under 35 U.S.C. 154(b) by 132 days.

(21) Appl. No.: 11/806,284

(22) Filed: May 31, 2007

(65) Prior Publication Data

US 2008/0304289 A1 Dec. 11, 2008

(51) Int. Cl.
*F21V 23/00* (2006.01)

(52) U.S. Cl. ........ 362/641; 362/642; 362/643; 362/644

(58) Field of Classification Search ........ 362/641–644, 362/800, 555, 640, 801, 802, 551, 318
See application file for complete search history.

(56) References Cited

U.S. PATENT DOCUMENTS 6,955,461 B1 * 10/2005 Chen ........ 362/96
2006/0007709 A1 * 1/2006 Yuen ........ 362/641
2007/0253222 A1 * 11/2007 Dubka et al. ........ 362/641

* cited by examiner

*Primary Examiner*—Bao Q Truong
(74) *Attorney, Agent, or Firm*—Bacon & Thomas, PLLC

(57) ABSTRACT

An LED night light having more than one optics means includes a first optics elements to change a narrow-viewing angle of the LED's spot-light beams into a wider-viewing angle for area illumination, and a second optics device to help enhance the appearance and value of the LED night light without taking up excess space. Other functions and devices such as an outlet adaptor, motion sensor, PIR sensor, air freshener, second light, bug repellent, sonic repellent, time piece or any combination of such functions or features may easily be added to increase the utility of the said LED night light while reducing electric power consumption and saving money for consumers.

7 Claims, 1 Drawing Sheet

FIG. 19

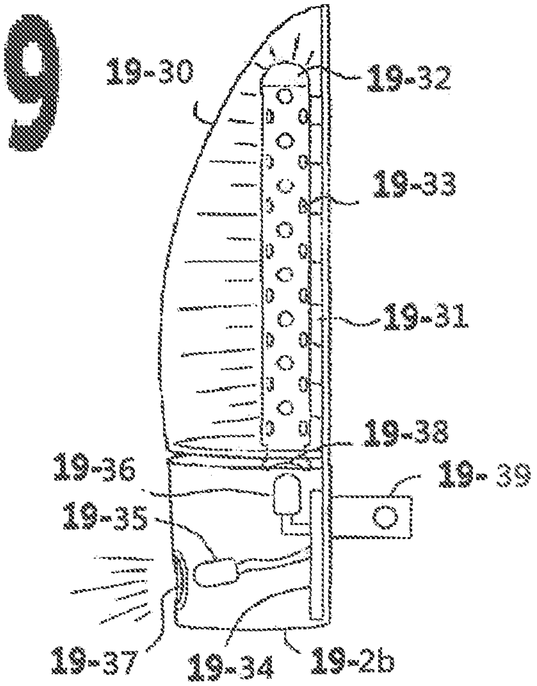

(12) United States Patent
Chien

(10) Patent No.: US 8,511,877 B2
(45) Date of Patent: Aug. 20, 2013

(54) PROJECTION DEVICE FOR A VARIETY OF LIGHT DEVICES

(76) Inventor: Tseng-Lu Chien, Shi-Chi Town (TW)

( * ) Notice: Subject to any disclaimer, the term of this patent is extended or adjusted under 35 U.S.C. 154(b) by 0 days.

(21) Appl. No.: 13/540,689

(22) Filed: Jul. 3, 2012

(65) Prior Publication Data

US 2012/0268662 A1 Oct. 25, 2012

Related U.S. Application Data

(63) Continuation of application No. 12/924,621, filed on Nov. 24, 2009, now Pat. No. 8,303,150.

(51) Int. Cl.
*G03B 21/20* (2006.01)

(52) U.S. Cl.
USPC ... 362/555; 362/800; 362/249.02; 362/311.01; 362/538

(58) Field of Classification Search
USPC ............ 362/84, 249.02, 249.11, 555, 565; 362/640, 643, 644
See application file for complete search history.

(56) References Cited

U.S. PATENT DOCUMENTS 6,192,824 B1 * 2/2001 Chang .............. 116/173
6,558,022 B2 * 5/2003 Kawahara .............. 362/257

* cited by examiner

*Primary Examiner* — Anabel Ton
(74) *Attorney, Agent, or Firm* — Bacon & Thomas, PLLC

(57) ABSTRACT

A projection assembly is arranged to be added onto or built into at least one LED-unit or other light-unit of an illuminated object that has more than one LED or other light source to cause the object to be illuminated and show the object's design or appearance while also offering illumination to people. The illuminated object may include all kinds of seasonal lighting, regular light fixtures, track lights, desktop lights, and battery operated lights having more than one light-unit or LED-unit.

13 Claims, 16 Drawing Sheets

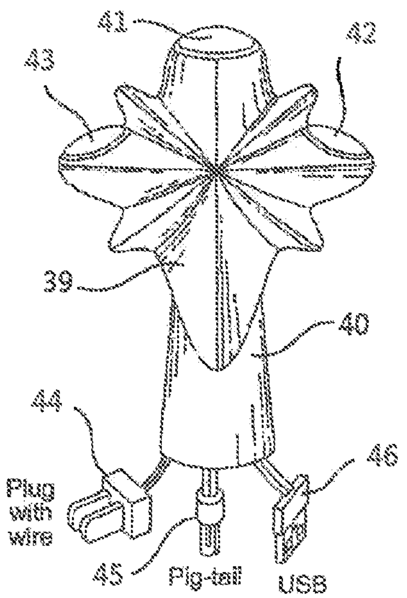

(12) United States Patent
Chien

(10) Patent No.: US 8,714,799 B2
(45) Date of Patent: May 6, 2014

(54) PROJECTION DEVICE FOR VARIETY OF LIGHT DEVICE

(76) Inventor: Tseng-Lu Chien, Shi-Chi Town (TW)

( * ) Notice: Subject to any disclaimer, the term of this patent is extended or adjusted under 35 U.S.C. 154(b) by 0 days.

(21) Appl. No.: 13/534,611

(22) Filed: Jun. 27, 2012

(65) Prior Publication Data

US 2012/0268947 A1 Oct. 25, 2012

Related U.S. Application Data

(62) Division of application No. 12/624,621, filed on Nov. 24, 2009.

(51) Int. Cl.
*G03B 21/20* (2006.01)

(52) U.S. Cl.
USPC ............ 362/555; 362/249.02; 362/249.11; 362/641; 362/644; 362/646

(58) Field of Classification Search
USPC ............ 362/249.02, 249.11, 565, 643, 644, 362/646, 555
See application file for complete search history.

(56) References Cited

U.S. PATENT DOCUMENTS

| | | | | |
|---|---|---|---|---|
| 5,595,435 | A * | 1/1997 | Palmer et al. | 362/109 |
| 6,350,042 | B1 * | 2/2002 | Lai | 362/277 |
| 6,558,022 | B2 * | 5/2003 | Kawahara | 362/257 |
| 7,314,293 | B2 * | 1/2008 | Sieter et al. | 362/351 |
| 7,748,869 | B2 * | 7/2010 | Sevack et al. | 362/277 |

* cited by examiner

*Primary Examiner* — Anabel Ton

(74) *Attorney, Agent, or Firm* — Bacon & Thomas, PLLC

(57) ABSTRACT

A projection assembly is arranged to be added onto or built into at least one LED-unit or other light-unit of an illuminated object that has more than one LED or other light source to cause the object to be illuminated and show the object's design or appearance while also offering illumination to people. The illuminated object may include all kinds of seasonal lighting, regular light fixtures, track lights, desktop lights, and battery operated lights having more than one light-unit or LED-unit.

8 Claims, 16 Drawing Sheets

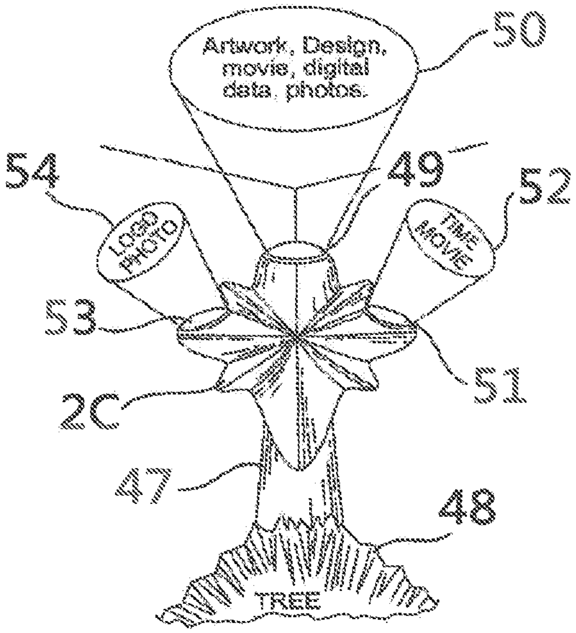

II-2009 Filed

(12) United States Patent
Chien

(10) Patent No.: US 8,303,150 B2
(45) Date of Patent: Nov. 6, 2012

(54) PROJECTION DEVICE FOR A VARIETY OF LED LIGHTS

(76) Inventor: Tseng-Lu Chien, Shi-Chi Town (TW)

(*) Notice: Subject to any disclaimer, the term of this patent is extended or adjusted under 35 U.S.C. 154(b) by 0 days.

(21) Appl. No.: 12/624,621

(22) Filed: Nov. 24, 2009

(65) Prior Publication Data

US 2010/0214541 A1 Aug. 26, 2010

(51) Int. Cl.
*G03B 21/14* (2006.01)

(52) U.S. Cl. ................ 362/555; 362/640; 362/249.02; 362/644; 362/646

(58) Field of Classification Search ................ 362/84, 362/249.02, 249.11, 565, 555, 560, 640, 362/641, 643, 644, 646
See application file for complete search history.

(56) References Cited

U.S. PATENT DOCUMENTS

| | | | | |
|---|---|---|---|---|
| 4,025,779 | A * | 5/1977 | Ahroni | 362/565 |
| 4,443,832 | A * | 4/1984 | Kanamori et al. | 362/84 |
| 5,311,356 | A * | 5/1994 | Freilich | 359/467 |
| 7,832,917 | B2 * | 11/2010 | Chien | 362/641 |
| 7,832,918 | B2 * | 11/2010 | Chien | 362/641 |
| 8,128,274 | B2 * | 3/2012 | Chien | 362/641 |
| 8,157,422 | B2 * | 4/2012 | Paik et al. | 362/294 |
| 2003/0151926 | A1 * | 8/2003 | Mesmer et al. | 362/565 |

* cited by examiner

*Primary Examiner* — Anabel Ton
(74) *Attorney, Agent, or Firm* — Bacon & Thomas, PLLC

(57) ABSTRACT

A projection assembly is arranged to be added onto or built into at least one LED-unit or other light-unit of an illuminated object that has more than one LED or other light source to cause the object to be illuminated and show the object's design or appearance while also offering illumination to people. The illuminated object may include all kinds of seasonal lighting, regular light fixtures, track lights, desktop lights, and battery operated lights having more than one light-unit or LED-unit.

8 Claims, 16 Drawing S"

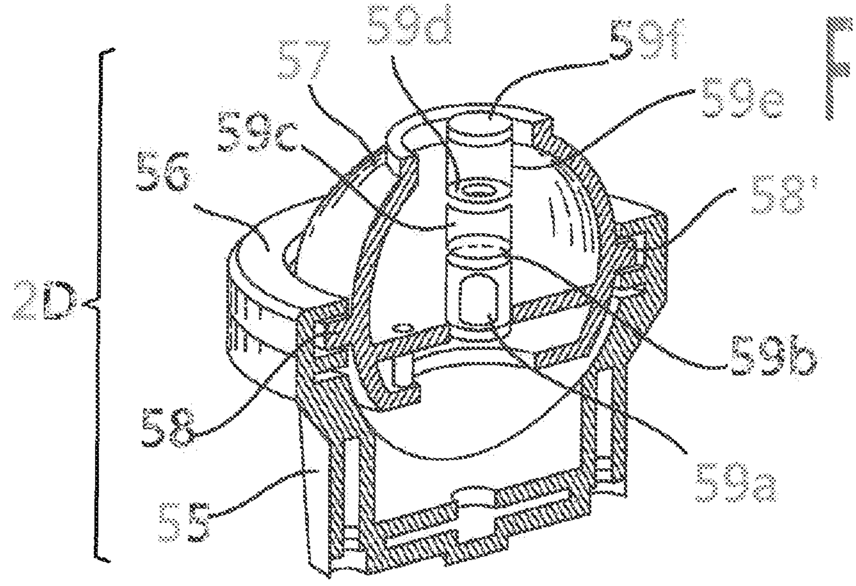

Fig 2-13 light fixture has LED units:
at least one can change anytime with project function.

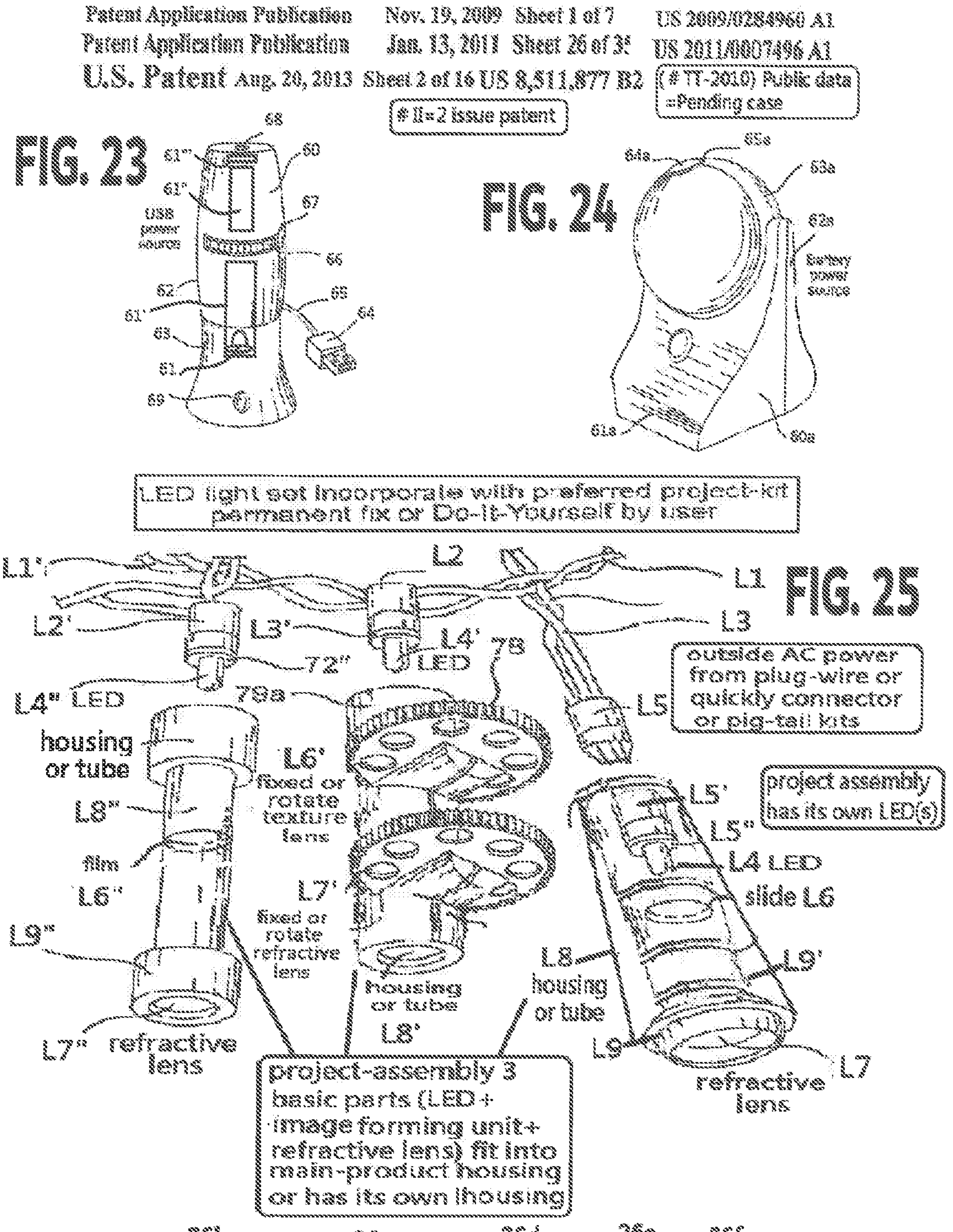

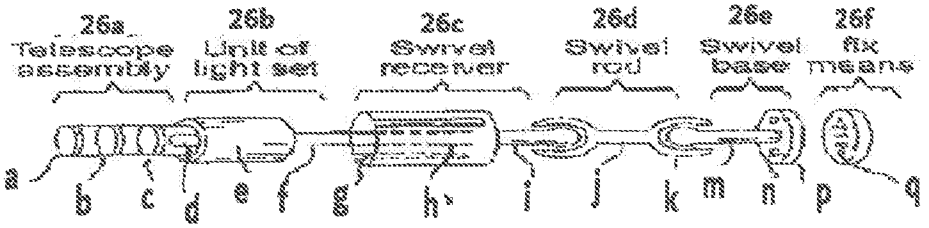

FIG. 26

Patent Application Publication Nov. 19, 2009 Sheet 1 of 7 US 2009/0284960 A1
Patent Application Publication Jan. 13, 2011 Sheet 26 of 3 US 2011/0007496 A1
U.S. Patent Aug. 20, 2013 Sheet 2 of 16 US 8,511,877 B2
USB power source (# TT-2010) Public data =Pending case
II=2 issue patent
Battery power source LED light set incorporate with preferred project-kit permanent fix or Do-It-Yourself by user
L1'
L2
L1
L2'
L3'
L3
L4'
LED
72"
78
L4" LED
78a
outside AC power from plug-wire or quickly connector or pig-tail kits
L5
housing or tube
L6'
fixed or rotate texture lens
L5'
project assembly has its own LED(s)
L8"
L5"
film
L4 LED
L6"
L7'
slide L6
fixed or rotate refractive lens
L9"
L8
L9'
housing or tube
housing or tube
L8'
L9
L7" refractive lens
L7
refractive lens
project-assembly 3 basic parts (LED+ image forming unit+ refractive lens) fit into main-product housing or has its own housing 26a Telescope assembly
26b Unit of light set
26c Swivel receiver
26d Swivel rod
26e Swivel base
26f fix means
a
b
c
d
e
f
g
h
i
j
k
m
n
p
q FIG. 27
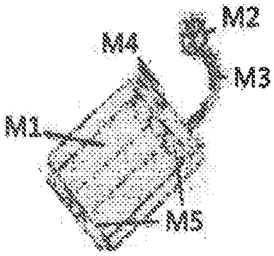
FIG. 28
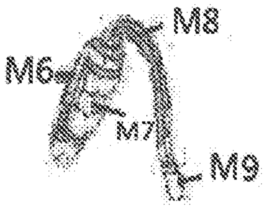
FIG. 29
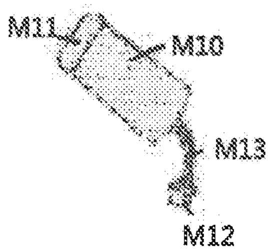
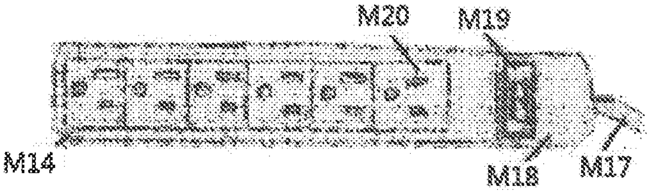
FIG. 30
FIG. 31
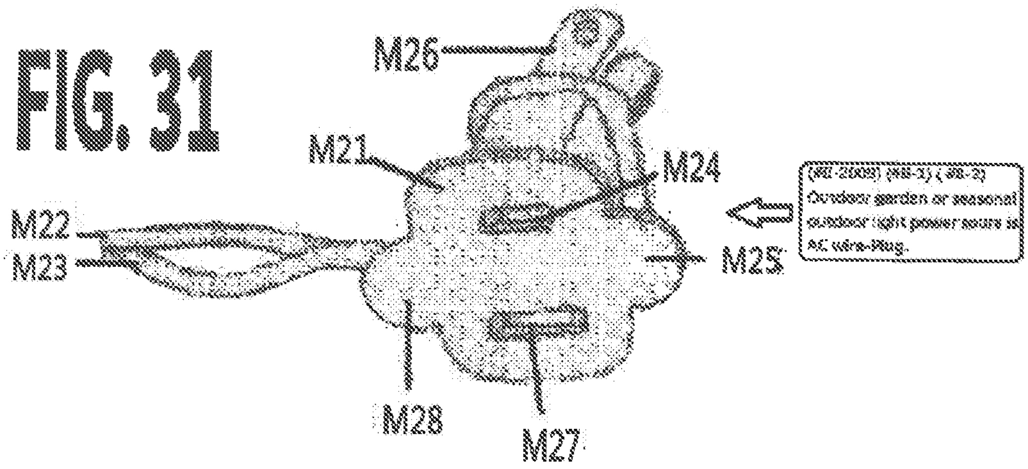
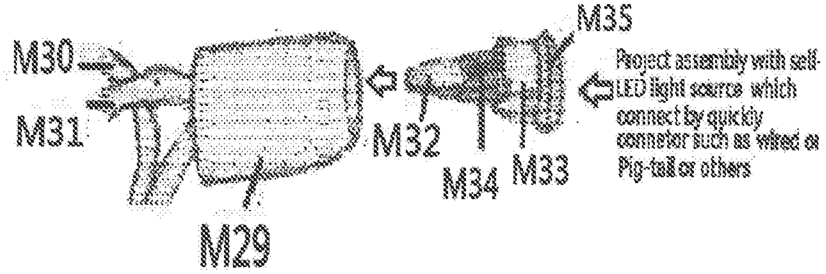
FIG. 32

Co-Pending (#QQQ-5) Ser.No. 15-341,782 P 6/ 15

Patent Application Publication Aug. 24, 2017 Sheet 14 of 15 US 2017/0241596 A1
Co-Pending (#QQQ-5) Ser.No. 15-341,782 P14/15
FIG. 40
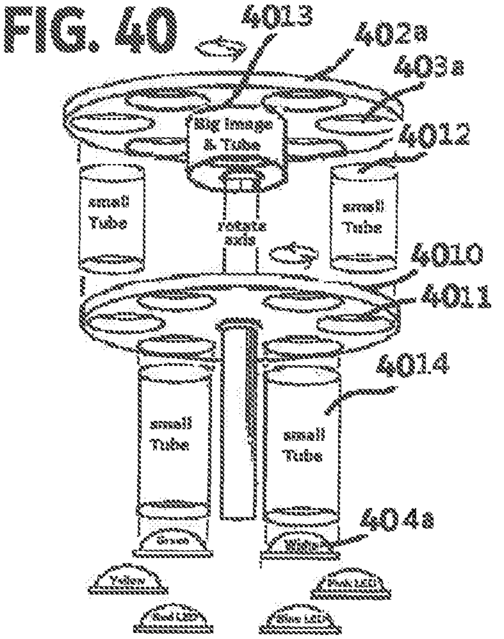
FIG. 41
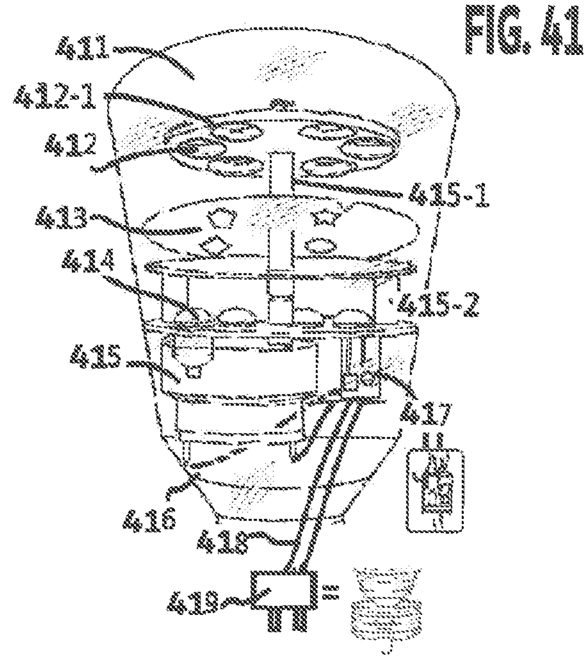
FIG. 42
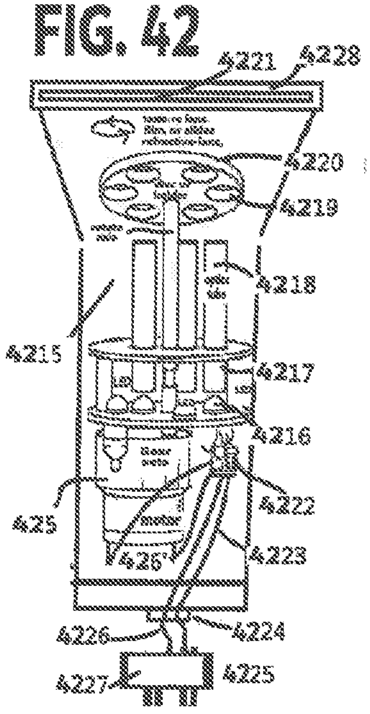
FIG. 44
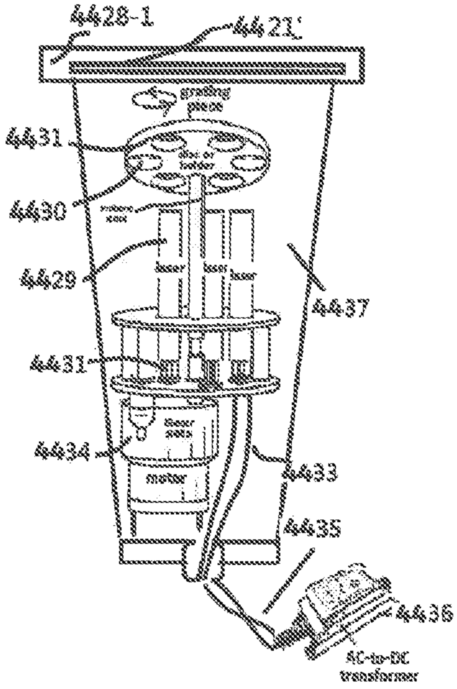
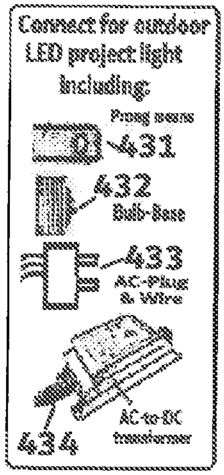
FIG. 43
AC-to-DC transformer Co-Pending (#QQQ-5) Ser. No. 15-341,782 P14/15
FIG. 47
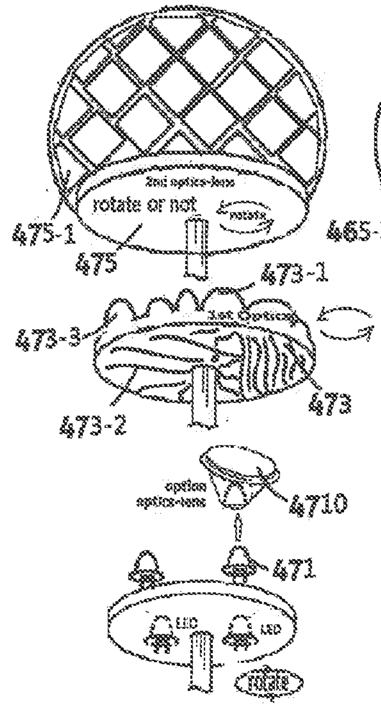
FIG. 46
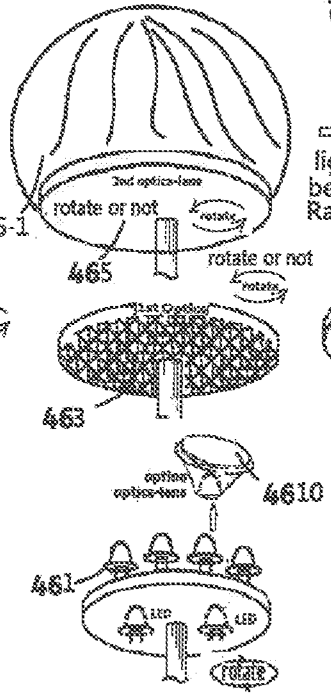
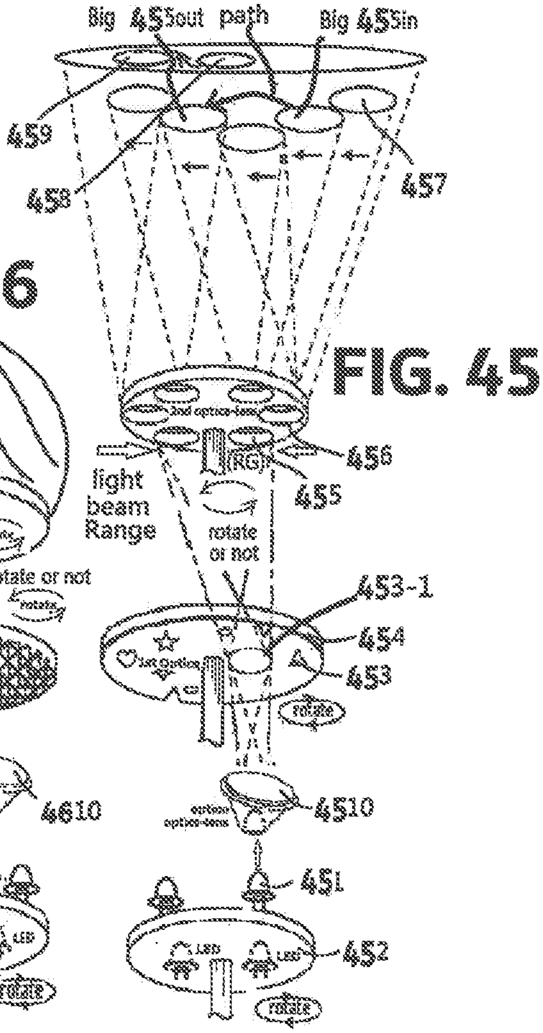
FIG. 45
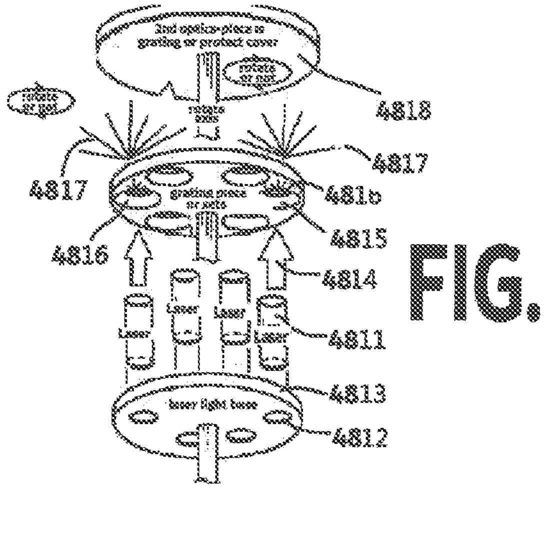
FIG. 48

Co-Pending filed case (# ZZZ-Sereis) US Application Sereis No. 14-023-889 filed on 9-22-2013 Drawing
FIG. 49
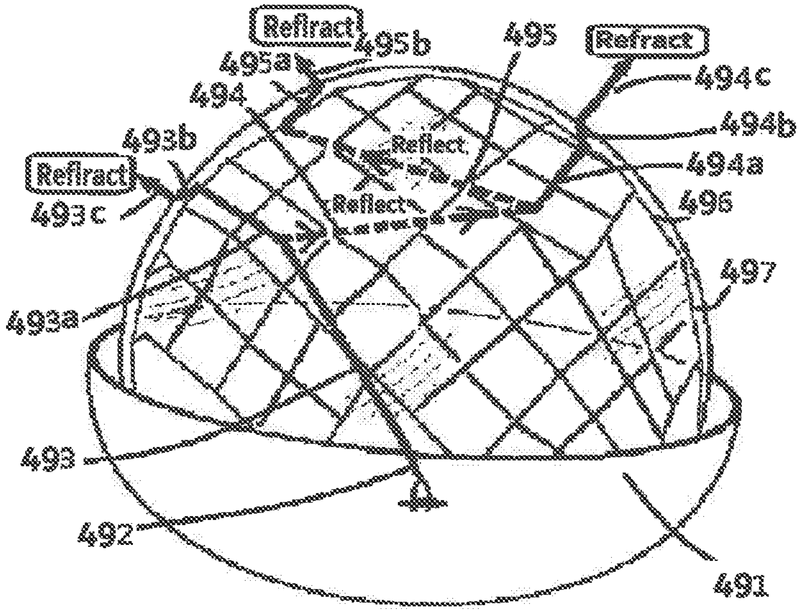
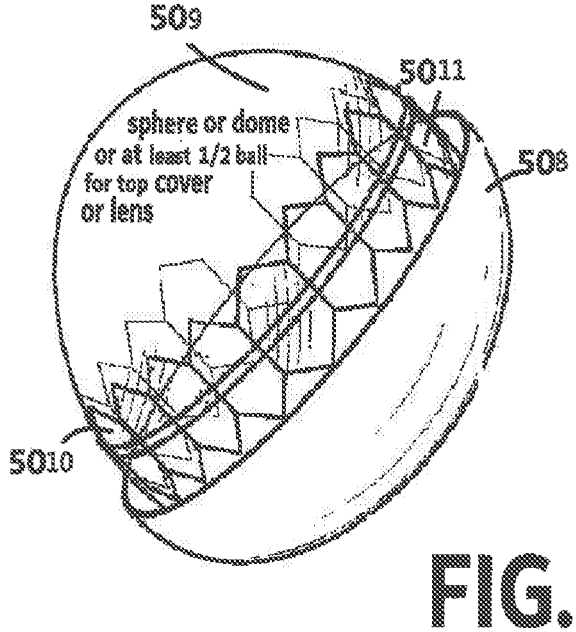
FIG. 50
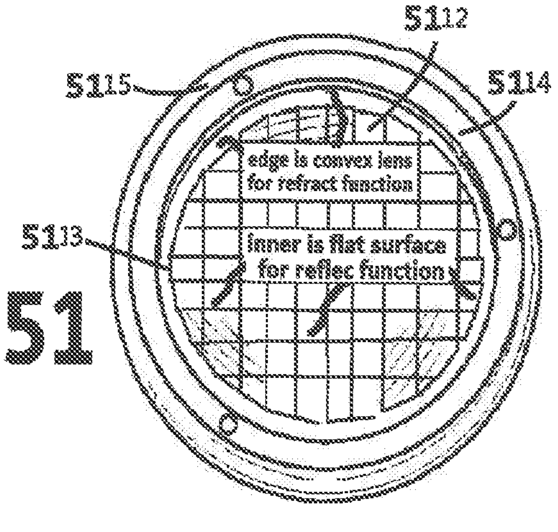
FIG. 51

Co-Pending filed case ( # ZZZ-Sereis) US Application Sereis No. 14-023-889 filed on 9-22-2013 Drawing
Co-Pending (#QQQ-5) Ser.No. 15-341,782 F13/15
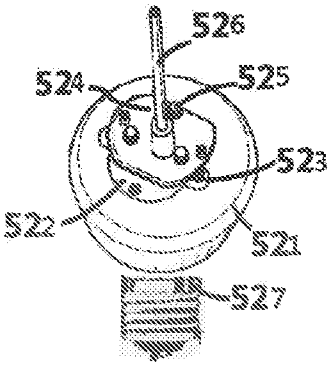
FIG. 52
Co-pending filing
US App. Ser. No.
(#ZZZ-1) 14-323,318 &
(#ZZZ-12)14-023,889
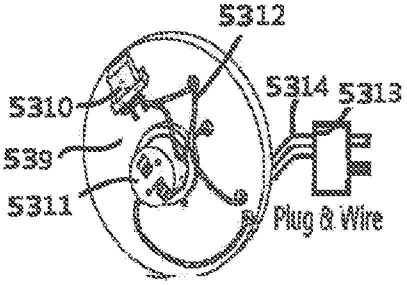
FIG.53
Connector for Outdoor LED Light including:
FIG.54
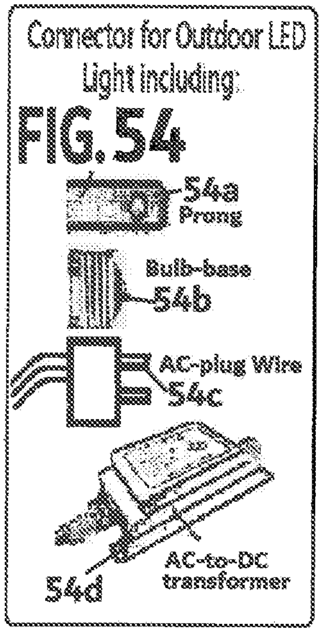
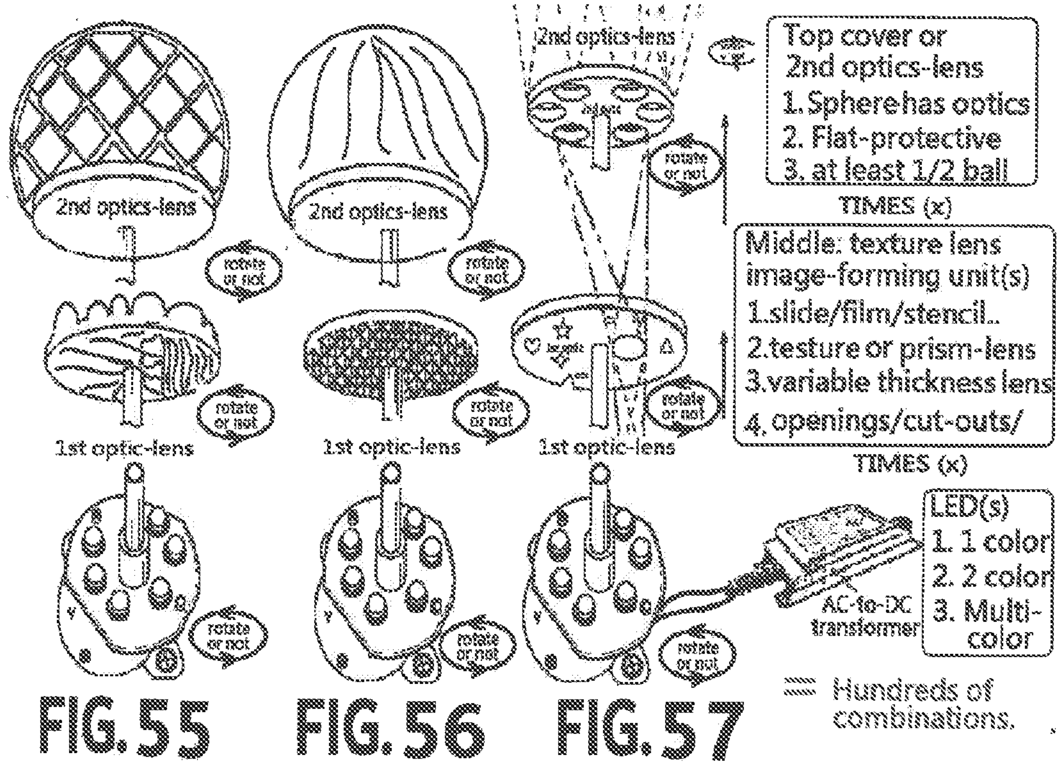
FIG.55 FIG.56 FIG.57

Co-Pending Case (# ZZZ-4) US Application Ser. No. 15-296,599 P 2/12
FIG. 58
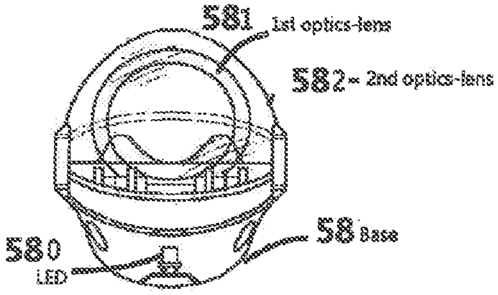
FIG. 59
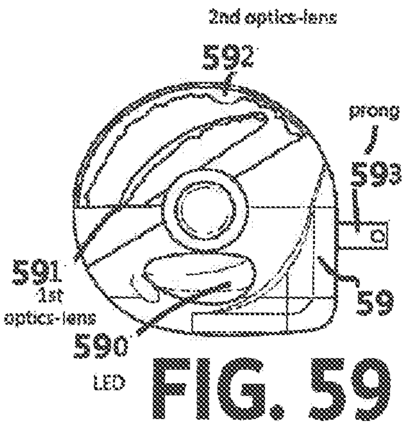
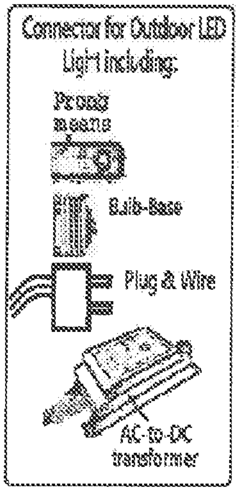
FIG. 60
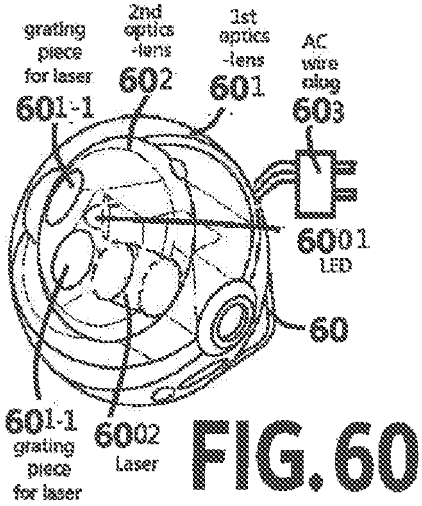
FIG. 61
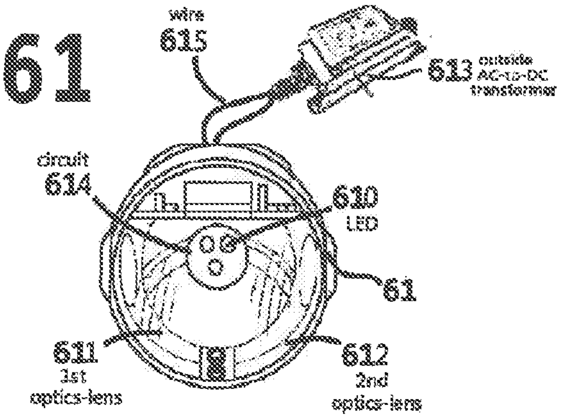

Co-Pending (# ZZZ-4) Ser.No.15-296,599 P 4/12

Co-Pending (# ZZZ-4) Ser.No.15-296,599 P 5 /12
FIG. 63
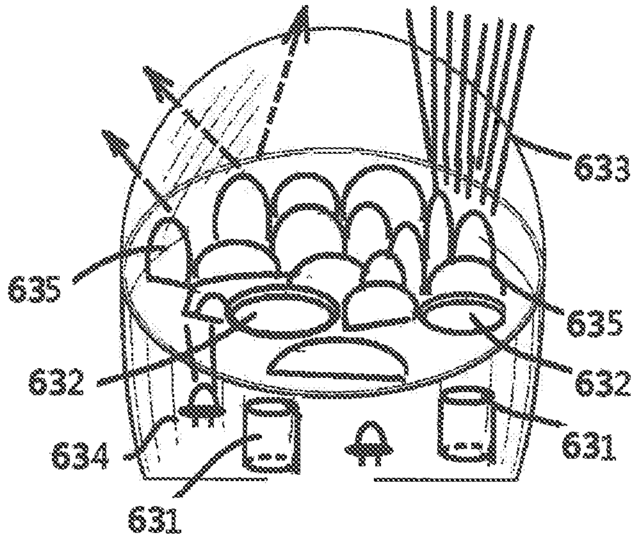
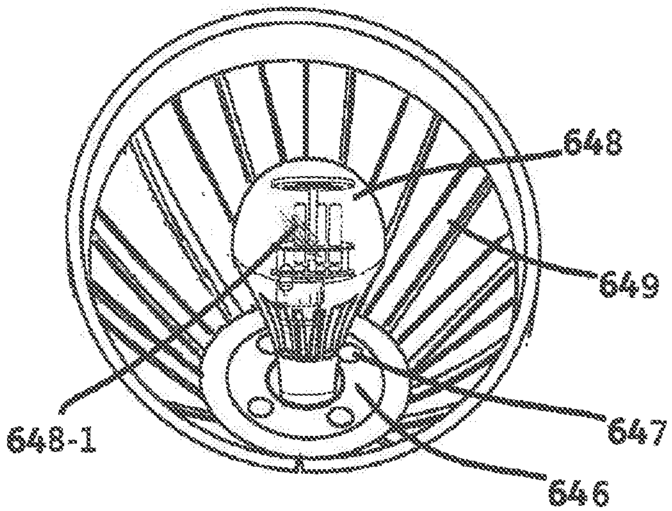
FIG. 64

Co-Pending (#QQQ-5) Ser.No. 15-341,782 P 9/ 15

Co-Pending (# ZZZ-4) Ser.No.15-296,599 P 1/12

U.S. Patent Jan. 19, 2016 Sheet 4 of 4 US 9,239,513 B2
co-pending filed (# XX-1) ( # XX-2) CIP of Parent filed case (# XX-2010)

72
7211
7215
7211
7215
7215
7210
7210
7215
7214
2nd lens
7213
1st lens
7212
729
728
721
725
726
722
723
727
724

Connector for Outdoor LED Light including:
Prong means
Bulb-Base
Plug & Wire
AC-to-DC transformer Garden light application with ground stake, Bracket, stand Including Cafe-lite, Patio, building, Seasonal light string.

7427
7426
7418
7410
741
741
742
7411
7412
743
7413
7425
7428
7419
7415-1
7416-1
7429
744
7417-1
7430
7414
745
7420
7416
746
Light string including
Cafe-lite, Patio light,
7421
7415
747
748
7422
7417
7423
749
7424
7431
7432
7433

FIG. 75
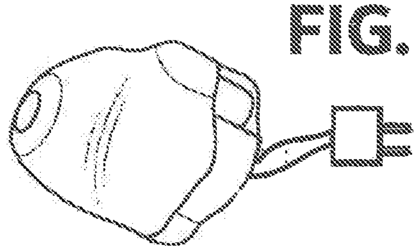
FIG. 76
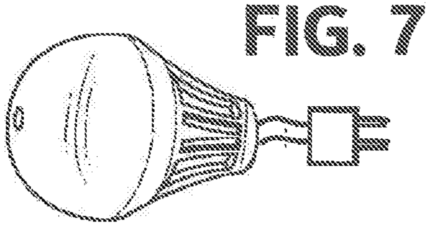
FIG. 77
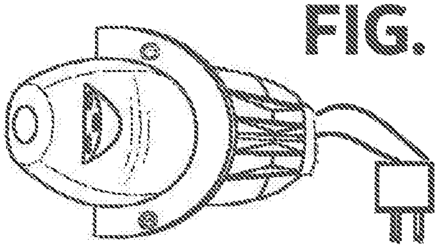
FIG. 78
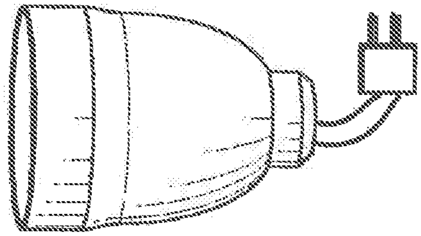
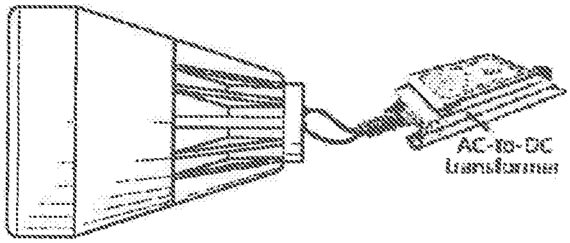
FIG. 79
FIG. 80
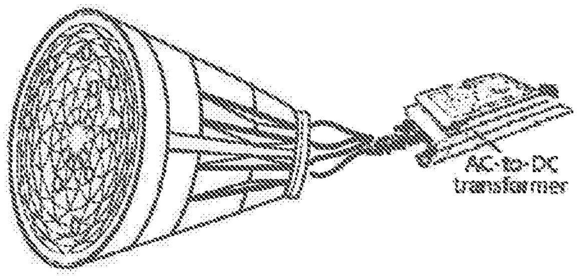
FIG. 81
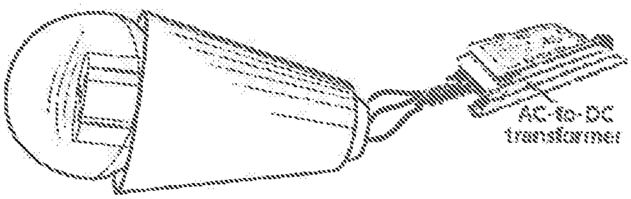

LED LIGHT HAS IMAGE AND/OR PATTERNS PROJECTION

RELATED U.S. APPLICATION DATA

This is Division filing for (#FF-5) U.S. application Ser. No. 15/730,291 filed on Oct. 11, 2017, now is U.S. Pat. No. 10,495,274 issued on Dec. 3, 2019 which is CIP for filing of (#FF-4) U.S. application Ser. No. 14,967,862 filed on Dec. 14, 2015, now is allowanced on Nov. 22, 2019 which is CIP for filing of (#FF-3) U.S. application Ser. No. 14/539,267 filed on Nov. 12, 2014 which is CIP for filing of (#FF-2) U.S. application Ser. No. 14/275,184 filed on May 12, 2014, now is U.S. Pat. No. 10,371,330 issued on Aug. 6, 2019 which is CIP for filing of (#FF-I) U.S. application Ser. No. 12/886,832 filed on Sep. 21, 2010 now is U.S. Pat. No. 8,721,160 which is CIP for filing of (#FF-2008) U.S. application Ser. No. 12/318,470 filed on Dec. 30, 2008 now abandoned, which is Division for filing of which is Division for filing of (#Q-2007) U.S. application Ser. No. 11/806,284 Filed on Dec. 15, 2007 now is U.S. Pat. No. 7,630,004

This filing is Division filing of (#ZZZ-4) U.S. application Ser. No. 14/296,599 Filed on Oct. 18, 2016, now is U.S. Pat. No. 10,228,112 issued on Mar. 12, 2019 which is Continue in Part filing of (#ZZZ-3) U.S. application Ser. No. 14/503,647 filed on Oct. 1, 2014 now is U.S. Pat. No. 9,719,654 which is Division filing of (#ZZZ-2) U.S. application Ser. No. 14/451,822 filed on Aug. 5, 2014, now is U.S. Pat. No. 10,047,922 issued on Aug. 14, 2018.

which is Continue in Part filing of (#ZZZ-1) U.S. application Ser. No. 14/323,318 filed on Jul. 3, 2014, now is U.S. Pat. No. 10,220,015 issued on Mar. 5, 2019 which is Continue In Part filing of (#ZZZ-2013) U.S. application Ser. No. 14/023,889 filed on Sep. 11, 2013, now is U.S. Pat. No. 10,323,811 issued on Jun. 18, 2019

Related to the wider area image or project image night light or LED bulb or AC plug wire LED outdoor light with or without motor/spin/rotating kits for moving image.

This filing is Division filing of (#QQQ-7) U.S. application Ser. No. 15/494,477 filed on Apr. 24, 2017 which is continue in part of (#QQQ-6) U.S. application Ser. No. 15/355,515 filed on Nov. 18, 2016 which is continue in part of (#QQQ-5) U.S. application Ser. No. 15/341,782 filed on Nov. 2, 2016, now is U.S. Pat. No. 10,563,823 issued on Feb. 18, 2020 which is continue in part of (#QQQ-4) U.S. application Ser. No. 15/348,218 filed on Nov. 10, 2016, now is allowanced on Oct. 5, 2019 which is continue in part of (#QQQ-3) U.S. application Ser. No. 14/983,993 filed on Dec. 30, 2015, now is U.S. 9,09,000 issued on Mar. 6, 2018.

Now is allowanced which is continue in part of (#QQQ-2) U.S. application Ser. No. 14/289,968 filed on May 29, 2014, Now is U.S. Pat. No. 9,551,477 which is continue in part of (#QQQ-1) U.S. application Ser. No. 14/280,865 filed on May 19, 2014, Now is U.S. Pat. No. 9,581,299 which is continue in part of (#QQQ-2012) U.S. application Ser. No. 13/540,728 filed on Jul. 3, 2012, now is U.S. Pat. No. 8,834,009 which is division filed of (#JJJ-1) U.S. application Ser. No. 13/296,469 Filed on Nov. 15, 2011 now is U.S. Pat. No. 8,711,216

This filing is Division filing of (#MMM-2) U.S. application Ser. No. 15/402,965 Filed on Jan. 10, 2017, now is U.S. Pat. No. 10,151,451 issued on Dec. 11, 2018.

Which is continue in Part of (#MMM-1) U.S. application Ser. No. 14/606,242 filed on Jan. 27, 2015 now is U.S. Pat. No. 9,541,260 which is Continue in Part of (#MMM-12) U.S. application Ser. No. 13/367,758 filed on Feb. 7, 2012 now is U.S. Pat. No. 8,967,831.

Related for the LED Bulb has more than one area has illumination including head, body.

This filing is Division filing of (#JJJ-1) U.S. application Ser. No. 14/049,427 Filed May 22, 2014, now is U.S. Pat. No. 9,010,986 Apr. 21, 2015 issued, which is continue filing of (#JJJ-11) U.S. application Ser. No. 13/296,508 Filed on Nov. 15, 2011. Now is U.S. Pat. No. 8,562,158 issued on Oct. 22, 2013.

Related the LED bulb has built-in Camera and storage-kits with multiple functions to replay, see by wired or wireless.

This is Division filing for (#AAA) U.S. application Ser. No. 12/948,953, Filed on Nov. 18, 2010, now is U.S. Pat. No. 9,157,589 which is Continue in Part of (#TT-2) U.S. application Ser. No. 14/968,250, Filed on Dec. 14, 2015, which is Continue in Part of (#TT-I) U.S. application Ser. No. 14/944,953, Filed on Nov. 18, 2015, now is U.S. Pat. No. 10,509,304 issued on Dec. 17, 2019 which is Continue in Part of (#TT-2010) U.S. application Ser. No. 12/866,832, Filed on Sep. 21, 2010

This is Division filing for (#11-2) U.S. application Ser. No. 13/540,689 filed on Jul. 3, 2012. Publication data US 2012-026 8668 dated on Oct. 25, 2012.

This is continue in part of (#11-1) U.S. application Ser. No. 13/534,611 filed on Jun. 27, 2012, publication data US 2012/0268947 dated on Oct. 25, 2012

This is continue in part of (#11-2009) U.S. application Ser. No. 12/624,621 filed on Nov. 24, 2009, publication data US2010/0214541 date Aug. 26, 2010

In addition, the following U.S. patents show light devices having some features that is similar to and some that are different from the current invention:

BACKGROUND

The current invention for the LED light has project lighted image or-and light patterns is unique and compare with prior arts as below:

I. U.S. Pat. No. 8,128,259 Myers et al.

disclosure a spherical ornamental fixture which (1) Power source is not an LED bulb (2) does not have optics lens to get refraction light design (3) does not have rotating or moving device such as motor or movement (4) does not have any image forming arrangement such as texture on lens or film or slide.

'259 maximum can be a ceiling light or desktop light which has light source (59) or (159) arrange on the post and emit light to the ornament piece which need glow the whole sphere which should be more close the co-inventor's earlier issued U.S. Pat. No. 5,667,736 has laser treated lens to spread the inner light source to wider range which filed on Feb. 7, 1995 and Sep. 16, 1997 issues.

So, this is nothing to do with current invention for above listed (4) major difference for (a) Application (b) physics theory (c) construe (d) design.

2. U.S. Pat. No. 7,748,869 Sevack et al.

'869 disclosure (1) a clip-on project assembly for recessed lighting fixture on its trim area. (2) The light source use the existing recessed light for (3) super high heat light source 50Wa MRI 6 or GU TO halogen bulb so (4) need use the thin metal template disk with cutout patterns or etched glass so can (5) project the patterns on surface on floor, wall from ceiling recessed lighting fixture. (Column 1)

'869 major difference with current invention including (a) does not have a Bulb with bulb has to fit into bulb receiving socket (b) does not has self-contained LED light source (3) does not use the cool light source so no need use heavy metal or glass (4) does not possible use film/slide/plastic printed piece as image forming kits because use the high wattage and high power consumption existing halogen bulb. All details disclosure inside of '869 including application, physical theory, attachment, installation, construction. None of any one is similar with current invention.

3. U.S. Pat. No. 6,558,022 Karahara

'022 disclosure the different device with current invention including (1) from FIG. 1,2,3,4,5,6 can see the light source (16) is a radiant light 17 (which is not the LED light source because LED light has no this radiant light source 117 to emit light to 360 degree)

Also, from Column 4 (line 54 to 63) all light source all belong to the Radiant light source. So the light source need for 360 degree radiant type not same as current invention for LED light.

The '022 patent teach a pin-hole image to form the image from a radiant light source (bulb) which is not same as the current invention has to use convex lens to get lighted image passing through and enlarge image. The '022 use pin hole image to create the enlarge size of the image by distance between the light source/shade/image location so can get desired image. So the physics theory for (Pin-Hole image) v.s. (convex lens image forming image) theory is totally different.

'022 use the convergent lens which is not same as convex lens. Convex lens has function to enlarge and make the light beam spread out not convergent purpose.

'022 use the radiant light source as column 4 line 53 to 63 which has high heat so the shape with opening or design have to far away with the light source or will be burn which is not like the current invention the image forming piece is made of plastic or slide or film or texture lens which all made by plastic and very close to light source because current invention use cool light source LED.

The '022 is not a LED bulb, '022 is a lighting fixture which no way to insert into bulb receiving socket at all. So Pen and Rocket totally nothing to do with '022 patent for current invention.

4. U.S. Pat. No. 6,267,478

The '478 Chen disclosure the changeable image construction for single image project to the locations which is different with current invention as (A) As FIG. 1 shown the display unit (40) is position front the opening (20) rotating-disc which is front of the single opening base-plate (10) so the image present to location is only SINGLE image not like the current invention for (Multiple of images shown on the locations at same time).

(B) The light source is Light Bulb (50) at the 2001 there do not have any LED for white light can get at marketplace and has enough light source and lighted any image.

(C) '478 the theory is as column 4 line 1 to Line 18 stating the light source (50) on reflector (531) because bulb radiant light source so need reflector (531) to collect all light beam to front and the light beam go through the light transmitting hole (12) of base plate and again go through hole of rotating disc (20) and hit the image carrier disc (40) and go out from the single front Lens. The (531) that is different than current invention for light from LED light source go to preferred and optional optical lens to adjustable LED light beam and go through the image forming means (may rotating or steady) and go through the magnify lens sets (rotating or steady) and go to outer dome or sphere optics-lens to get as wider as possible illuminated areas.

So current invention has following features;

(AA) the current invention the position for the image forming means is directly top of the LED (light source) because no heat issue like the '478 high heat bulb will melt the plastic slide/film/printed plastic piece.

(BB) The current invention no need reflector (531) to collect all the radiant light beam like bulb.

(CC) The current invention only moving the optics-lens disc which is not the image forming means and this moving optics-lens will create the image is moving, not changing functions so this is image performance and effects and theory different.

(DD) The '478 use a spring pressure box (35) and a lot of cam 33, pad 352, screw 231, nut 44 flap 31 teeth 24 pressure spring 351 for locking or freeze or release for mechanical design is not needed for current invention. So the current invention just uses a gear box which can get desired rotating speed which is much simple than the '478 construction and lower cost so not comparable at all.

(EE) '478 is not for a LED bulb that is mechanical construction which is totally different with current invention construction for rotating part, image function, light performance . . . etc. So this is major different with current invention for different image performance and different rotating object and different construction for motor and disc assembly and position so not same as current invention at all.

5. U.S. Pat. No. 3,762,082 Mincy

'082 disclosure the varicolored disk install on a fenestrated disk and juxtaposed varicolored to make the below light beam to reflected out to see twinkling pulses of color . . . . The difference at (A) light source (34) is high power bulb which is so hot so no way to have any image forming plastic piece on top because heat is always flows to top as current invention to use slide/film/printed plastic piece.

(B) the illumination member (14) which '082 as column 2 line 9 to 20 said how to make the distorted regions 36 and created the interface 38 of the top cylinder shape. So[,] this is not same as current image forming piece is flat plastic piece such as slide/film/printed plastic piece.

(CC) The '082 has no moving device. (DD)

The '082 does not has a LED bulb (EE) The '082 does not has optics theory for enlarge lighted image, So '082 is totally different with current invention.

6. U.S. Pat. No. 8,262,252 Bergman

'252 disclosure the image design change from I image to N number (N is any number) of images that depend on how many image and optics lens been arranged. This is not same as the current invention to make each image to travel an arc or partial of circle or predetermined path at the same time which is not become N-number (N is any number) light performance because major different is the current invention (A) '252 do not rotating the image and optics-lens together at the same time, the current invention only make the said plurality of optics-lens rotating on desired speed so need gear box which '252 do not need this gear box.

(B) '252 need to very precisely to design for distance and focus for the image to project on fixed distance so this will be a custom-made product which is not same as current invention the image can fit for any kind of ceiling or wall distance the image can be readable and acceptable because never had image effects to combine N-number (N is any number) of image into one clear image and/or separated I consolidated image to separate into N-Number of separate clear image. So the requirement for precisely calculation for the distance or gap of the LED or image carrier or the image location distance needed.

(C) '252 other big issues is the optics lens is too complicated in order to get the FIG. 1A, FIG. 2-A, FIG. 2-B light path because to get the light beam travel for a straight direction without enlarge so no way to use the current invention simple convex lens which will enlarge or/and diversify the image which never like the '252 FIG. 1A, FIG. 2-A, FIG. 2-B for precisely complicated lens assembly to get the result for parallel image present to image location just keep same radio same size as LED and image spacing or gap. So '252 is get image same size as the Image forming-unit. Not enlarge to N-times bigger for those of the said parallel light-beam after complicated lens assembly.

More important '252 is an illumination system. Not same as current invention (AA) is a LED.

(BB) The image is moving effects for arc or partial circle or follow predetermined path to move.

(CC) The current invention has multiple image spread only not consolidate into I image or/and separated into N-image (N is any number) both is clear.

(DD) the current invention has magnified and enlarge the image. And, the current invention do not like '252 still parallel and keep same size shown on the image locations (EE) The current invention use simple convex lens not same as '252 have to keep same space and distance as LEDs and Image space from lower device. So '252 patent teach details are nothing to do with the current invention on any aspects.

7. US Prior Art U.S. Pat. No. 6,588,002 as below.

1. The '002 is typical for Physics is (Pin Hole image) system which the
   1. Light traveling theory and direction Passing through the holes->Light beam go direction to the screen To show the shape.
      c:> The '002 light emit direction is straight which has no any reflective (emit into and emit back according to the light beam emit-into angle) or refractive (The light beam passing through the optics-lens to emit into the lens material and make deviation and emit out from optics-lens other surface). So the light traveling path is totally different as '002 all drawing show is simple straight light traveling.
2. Light source different:
   '002 show the light source is radiation spread out from light source which means that is bulb light source. So, can have more than 120 degree light beam emit out from single light source.
   c:> The current invention is LED light source which have to use DC current to drive so while apply for the outdoor light for big power have to connect with AC plug wire with outside or built-in AC-to-DC circuit or get DC big current power from outside AC-to-DC transformer to supply enough current to outdoor light device or high power consumption LEDs for other location application.
3. The Physics theory and light traveling theory is totally different:
   '002 apply the Pin-Hole image which has the radiation light beam light source as all text of '002 and Figures.
   c:> The current invention's light source is not same as '002, The current invention theory basing on the (Lens imaging) as the attached theory which create image basing object located on certain distance to the Len's focus location to form the size changed image which has smaller or equal or enlarge basing on the object located outside the $2^{nd}$ focus point or within the $1_{st}$ or $2^{nd}$ focus location or within the 1st focus location.==>more simple physics word is refraction. This is not only can created colorful and detail and sharp and fine image.
   c:>Also, the current invention also incorporated with reflective properties which is the light beam emit to the predesigned lens including prism or diamond cut-lens or other preferred or alternative lens design or construction and light beam emit to the lens for variety of angle to lens and will reflected to certain amount of light beam under variety of emit out angles out of the lens.
   That is not same as '002 Pin-hole image light beam travel straight through the opening or holes or light passing able material.
4. The '002 is a radiation light source which is a bulb so the display unit have to far away to the super high temperatures light source as all '002 drawing show. It is not same as the current invention which has is LED which is cold light source which does not make display-unit like film or slide or paper or plastic sheet or laser film to melt or deforming shape or even fired.
   So, the '002 is not any relation for current invention for
   a. Light source.
   b. Light passing direction.
   c. Physic theory and definition
   d. Heat issues e. Circuit need for AC-to-DC with big current for big power consumption for plurality LEDs or big power LED f. Distance between light source VS. display unit need far away for super high temperature or burn out.

8. The current invention is Continuous filing for (#FF-4) U.S. application Ser. No. 14/968,862, Filed on Dec. 14, 2015 which is Continue in Part of (#FF-3) U.S. application Ser. No. 14/539,267 Filed on Nov. 12, 2014 which is Continue in Part of (#FF-2) U.S. application Ser. No. 14/275,184 Filed on May 12, 2014 which is Continue in Part of (#FF-I) U.S. application Ser. No. 12/914,584 Filed on Oct. 28, 2010 now is U.S. Pat. No. 8,721,160, This is Division filing for (#Q-2007) U.S. Pat. No. 7,632,004 or U.S. application Ser. No. 11/806,284 which is CIP of the LED light has more than one of optics-means.

The above listed parent filed case basing on co-pending filing cases (#FF-series) has very details for current invention claims and scope and concept including:

(a) "movable disc to load plurality of image-carrier or film or slide or image forming units" as attached drawing FIGS. 9,10,11 of (#FF-4) and its FIG. 12 claim 4 for Rotatable slide disc or compartment or holder; and FIG. 12 claim 3 for change position by at least one of said roller with manually or automatically by motor.

(b) the LED light has other parts which including the "rotate device to make rotating the optic-lens" as attached drawing FIG. 12 claim 5 line 4 of (#FF-4) and its claims 5; and (c) The LED light has "rotating the optic-lens by motor" inside the FIG. 18 claim 10 "install into rotatable disc containing said plurality of different slide". and claims 11 and 12 "a roller with manual or automatically by motor to make rotating" of (#FF-4).

From (#FF-Series) is parent filing for the (a) Moving disc to install plurality of image-forming units (b) Rotating optics-lens by motor (c) Rotating optic-lens by motor; so the (#FF-Series) is parent filing case of current invention and (#FF-Series) is division filing case of (#Q-2007) U.S. application Ser. No. 11/806,284 filed on Dec. 15, 2007 which "LED light has more than one optics means" is just same as current invention has plurality of Optic-lens fit within the movable disc as (#FF-Series) drawing FIG. 1, FIG. 1B, FIG. 2 and FIG. 3. It is appreciated the pending (#FF-4) (#FF-3) (#FF-2) and its parent (#Q-2007) all concept, claims, idea should fall within the current invention claims and scope without any argument for these parent and pending cases before the current filing case filing date.

The current invention just make the said "disc or roller or compartment or holder" to contain plurality of slide change to the optics-lens as the (#FF-Family) claims 4, claim 10 change from slide to the optics-lens and same as claim 5 "has rotating means to rotate the optics-lens" for outdoor lighting so it will meet and same as the current invention's parent filing scope and claims.

The current invention also is division or continuously filing for co-pending filing (#TT-2010) which has all same drawing not only for (#FF-Family) as above listed drawing but also has the (#II-Family) FIG. 7 drawing to have 3 basic parts including LED+image forming unit(s) and top refractive lens to magnify the image for all outdoor lighting including the (#II-family) claim 1 of each of the said (#II-2009) (#II-2) stated the 3 basic parts of project assembly to fit or arrange or install into different outdoor lighting housing (main-products) so can become a projection light for (1) Outdoor lighting, (2) Outdoor garden light, (3) Seasonal light, (4) Ornament light powered by AC plug-wire or solar power or batteries for outdoor application. The said FIG. 22 is (#II-2009) U.S. Pat. No. 8,303,150 and FIG. 20 is (#II-2) U.S. Pat. No. 8,511,877 both are the first time and first invention for all the project application for (a) outdoor lighting, or-and (b) outdoor garden light, or-and (c) Seasonal lighting as the current invention discussed and figures attached, all of these co-pending of co-inventor cases (#FF-Series) and (#TT-Family) and (#II-family).

And[,] (#TT-Family) has all (#II-2009) (#II-1) (#II-2) drawing as the CIP case. So[,] the current invention also is the CIP of the (#II-200) (#M) (#II-2).

The same as the (#FF-Family) has listed the (#Q-2007) as parent filed case.

The current invention project function is made by project assembly which has 3 basic parts (Lower LED+Middle image-forming unit+Front refractive lens to magnify image) which can fit or arrange or install into all kind of different outdoor lighting housing to make outdoor project light as the above discussed for all co-inventor's co-pending filing and issued patents with details drawing and claims to support all the current invention is 1st for outdoor lighting as evidence.

The said project image or lighted patterns to get desired functions, the current invention has a lot of combinations as the below attached drawing for details descriptions.

The current invention made big improvement than all these 8 prior arts and make it simple manufacture, low cost, less assembly process, make different light functions.

As for the a lot of later file filed patents which should belong to invalid patents basing on all prior art study examiner did not review the all co-inventor's earlier public or issued patent data and each invalid patents has same of the all co-inventor's same concept and scope and construction and idea and should not granted patents at all including U.S. Pat. No. 9,068,726 U.S. Ser. No. 12/079,628 filed on Nov. 13, 2013, U.S. Pat. No. 9,194,551 U.S. Ser. No. 14/337,662 filed on Jul. 22, 2014

U.S. Pat. No. 9,395,608 U.S. Ser. No. 14/341,345 filed on Jul. 25, 2014

Which is later than current inventor filed (#ZZ-family) on Sep. 3, 2013 or later than co-inventor (#TT-family) on 2010, (#II-Family) on 2009, (#FF-Family) on 2008

(A) Basing on (#FF-family) FIG. 9+FIGS. 10 to 12+FIGS. 13 to 16+FIG. 17+FIG. 19 filed on 2008 drawing and claims has:

(1) disc to load plurality of the image-forming units (2) has motor to make automatically rotating the disc or compartment or holder (3) has rotating means to rotate the optics-lens.

(B) Basin on the (#II-Family) FIG. 20+FIG. 21+FIG. 22+FIGS. 23 to 26+FIGS. 27 to 32 filed on 2009 has drawing and claims has:

(a) The 3 project-assembly 3 parts (LED+image forming-unit+refractive lens) install or arrange or fit into Outdoor lighting, garden light, or seasonal lighting.

(b) Basing on (#ZZZ-Family) file don Sep. 3, 2013 has Figure FIGS. 27 to 32 FIGS. 49 to 51 FIGS. 52 to 57 FIG. 65 FIGS. 66 to 68 drawing and claims has:

(c) the LED light especially outdoor lighting has the "More than one of optics-lens and has LED light beam came out from LED to go through optic-lens has reflective or-and refractive properties and the light beam also passing through the $2^{nd}$ optics-lens has reflective or-and refractive properties, after the light beam go through the $I_{st}$ optic-lens".

(C) Basing on the (#QQQ-12) family file don 2012 has FIGS. 33 to 35 FIGS. 36 to 39 FIGS. 52 to 57 FIGS. 45 to 48 drawing and claims (d) all the LED outdoor project light has moving effects caused by move the (a) image forming unit(s), or-and (b) plurality of optics-lens inside disc by motor, or-and (c) single pt inner optics-lens with prism or diamond arrangement has reflective or-and refractive optics properties, or-and (d) move LED(s) light source or-and (e) use IC control LEDs for different timing to turn on and turn off These has all details drawing and claims of the (#QQQ-2012 filed parent and it all child filed cases).

As for LASER PROJECT OUTDOOR LIGHT U.S. Patents:

U.S. Pat. No. 9,458,994 Ser. No. 14/976,202 filed on Dec. 21, 2015 and

U.S. Pat. No. 9,546,775 Ser. No. 15/142,789 filed on Apr. 29, 2016, issued on Jan. 17, 2017

U.S. Pat. No. 9,752,761 Ser. No. 15/001,942 filed on Jan. 20, 2016, issued on Sep. 5, 2017

U.S. Ser. No. 14/958,667 Dec. 3, 2015 filed, and U.S. Ser. No. 14/958,657 Dec. 1, 2015 filed. All these related Laser outdoor project light which is 5 years later filed than current inventor's (#TT-Family) 2010 filed and (#XX-2010) filed.

(E) Basing on the attached FIG. 62 FIGS. 66 to 68 FIGS. 69 to 71 FIG. 72 FIG. 73 FIG. 74 FIGS. 75 to 81 FIGS. 82 to 88 for all kind of Laser light source application for Outdoor lighting+Garden light+Laser Bulb has drawing and claims from the below listed family filed cases: The (#XX-2010) filed on 2010 for Laser project LED light has CIP filed for (#XX-I) (#XX-2) as above listed which apply the inventor's prior art the laser grating film for the LED light source as U.S. Pat. No. 5,667,736 which filed on Feb. 7, 1995 and Sep. 16, 1997 issued for how to make the injection or stamping grating film. Furthermore, the (#ZZZ-3) U.S. application Ser. No. 14/503,647 filed on Sep. 11, 2013 now is U.S. Pat. No. 9,719,654 which has brief and details laser outdoor project light fatal kids are (1) laser light source, (2) grating film in front of the LED light source, (3) Rotating disc for plurality of different design grating film(s) or Piece(s), (4) incorporated LED light source to get other contour or shaped color image, or-and (5) use pin-hole image theory with LED or laser grating to show the different color or multiple color shape, contours . . . or other alternative or combination of LED and laser image or lighted patterns. All these simple and brief description but those are fatal construction for the Laser outdoor projection light has the grating film or piece in front of laser light source which is same as the above listed five of US 2014/2015 4-5 years later filed case than co-inventor's (#XX-2010) and (#TT-2010) Filed cases.

So the above 5 later filed cases should all belong to invalid US patents because co-inventor parent and child filed cases is 5 years earlier filed into PTO with earlier publication data can be verify for the concept.

The above discussion for the current invention has the parent filed case with all details drawing and claims which should overcome all 4-6 years later filed case including the (1) Laser outdoor project light, (2) LED outdoor or garden or seasonal light has (a) single moving optics lens, (b) More than one optics lens, or-and (c) Plurality of optics-lens fit into rotating disc moved by motor device.

Hereafter, the current invention is continuous or division filing of parent (#FF) or (#II) or (#TT) or (#AAA) or (#QQQ) or (#ZZZ) as below attached figures and description to show relation of these parent filing case so much simple to read.

This is Division filing for (#FF-4) U.S. application Ser. No. 14/968,862, Filed on Dec. 14, 2015 which is Continue in Part of (#FF-3) U.S. application Ser. No. 14/539,267 Filed on Nov. 12, 2014 which is Continue in Part of (#FF-2) U.S. application Ser. No. 14/275,184 Filed on May 12, 2014 which is Continue in Part of (#FF-I) U.S. application Ser. No. 12/886,832 filed on Sep. 21, 2010 now is U.S. Pat. No. 8,721,160 which is CIP for filing of (#FF-2008) U.S. application Ser. No. 12/318,470 filed on Dec. 30, 2008 now abandoned, which is Division for filing of which is Division for filing of (#Q-2007) U.S. application Ser. No. 11/806,284 Filed on Dec. 15, 2007 now is U.S. Pat. No. 7,630,004

This filing is Division filing of (#ZZZ-4) U.S. application Ser. No. 14/296,599 Filed on Oct. 18, 2016 which is Continue in Part filing of (#ZZZ-3) U.S. application Ser. No. 14/503,647 filed on Oct. 1, 2014 now is U.S. Pat. No. 9,719,654 which is Division filing of (#ZZZ-2) U.S. application Ser. No. 14/451,822 filed on Aug. 5, 2014, which is Continue in Part filing of (#ZZZ-1) U.S. application Ser. No. 14/323,318 filed on Jul. 3, 2014 which is Continue in Part filing of (#ZZZ-13) U.S. application Ser. No. 14/023,889 filed on Sep. 11, 2013.

Related to the wider area image or project image night light or LED bulb or AC plug wire LED outdoor light with or without motor/spin/rotating kits for moving image.

This filing is Division filing of

QQQ-7) U.S. application Ser. No. 15/494,477 filed on Apr. 24, 2017 which is continue in part of

QQQ-6) U.S. application Ser. No. 15/355,515 filed on Nov. 18, 2016 which is continue in part of (#QQQ-5) U.S. application Ser. No. 15/341,782 filed on Nov. 2, 2016 which is continue in part of (#QQQ-4) U.S. application Ser. No. 15/348,218 filed on Nov. 10, 2016 which is continue in part of (#QQQ-3) U.S. application Ser. No. 14/983,993 filed on Dec. 30, 2015, now is allowanced which is continue in part of (#QQQ-2) U.S. application Ser. No. 14/289,968 filed on May 29, 2014 now is U.S. Pat. No. 9,551,477 which is continue in part of (#QQQ-1) U.S. application Ser. No. 14/280,865 filed on May 19, 2014 now is U.S. Pat. No. 9,581,299 which is continue in part of (#QQQ-2012) U.S. application Ser. No. 13/540,728 filed on Jul. 3, 2012 now is U.S. Pat. No. 8,834,009 which is Division filed of (#JJJ-1) U.S. application Ser. No. 13/296,469 Filed on Nov. 15, 2011 now is U.S. Pat. No. 8,711,216

This filing is Division filing of (#MMM-2) U.S. application Ser. No. 15/402,965 filed on Jan. 10, 2017

Which is continue in Part of (#MMM-1) U.S. application Ser. No. 14/606,242 filed on Jan. 27, 2015 now is U.S. Pat. No. 9,541,260 which is Continue in Part of (#MMM-12) U.S. application Ser. No. 13/367,758 filed on Feb. 7, 2012 now is U.S. Pat. No. 8,967,831. Related for the LED Bulb has more than one area has illumination including head, body.

This filing is Division filing of (#JJJ-1) U.S. application Ser. No. 14/049,427 Filed May 22, 2014, now is U.S. Pat. No. 9,010,986 Apr. 21, 2015 issued, which is continue filing of (#JJJ-11) U.S. application Ser. No. 13/296,508 Filed on Nov. 15, 2011. Now is U.S. Pat. No. 8,562,158 issued on Oct. 22, 2013.

Related the LED bulb has built-in Camera and storage-kits with multiple functions to replay, see by wired or wireless.

This is Division filing for (#AAA-I) U.S. application Ser. No. which is Continue in Part of (#AAA) U.S. application Ser. No. 12/984,583, Filed on Now is U.S. Pat. No. 9,157,589 which is Continue in Part of (#TT-2) U.S. application Ser. No. 14/968,250, Filed on Dec. 14, 2015 which is Continue in Part of (#TT-I) U.S. application Ser. No. 14/944,953 Filed on Nov. 18, 2015 which is Continue in Part of (#TT-12) U.S. application Ser. No. 12/866,832, Filed on Sep. 21, 2010 This is Division filing for (#11-2) U.S. application Ser. No. 13/540,689 filed on Jul. 3, 2012. Publication data US 2012-026 8668 dated on Oct. 25, 2012.

which is continue in part of (#11-1) U.S. application Ser. No. 13/534,611 filed on Jun. 27, 2012, publication data US 2012/0268947 dated on Oct. 25, 2012 which is continue in part of (#11-2009) U.S. application Ser. No. 12/624,621 filed on Nov. 24, 2009, publication data US2010/0214541 date Aug. 26, 2010

This is Division filing for (#FF-4) U.S. application Ser. No. 14/968,862, Filed on Dec. 14, 2015 which is Continue in Part of (#FF-3) U.S. application Ser. No. 14/539,267 Filed on Nov. 12, 2014 which is Continue in Part of (#FF-2) U.S. application Ser. No. 14/275,184 Filed on May 12, 2014 which is Continue in Part of (#FF-I) U.S. application Ser. No. 12/914,584 Filed on Oct. 28, 2010 now is U.S. Pat. No. 8,721,160,

This is Division filing for (#Q-2007)

So[,] the simple words for current invention, just use parent co-pending case (#FF-series) including (#FF-4) (#FF-3) (#FF-2) to change 1. The rotatable disc to install optics-lens instead of slide/film.
2. Same as (#FF-4/3/2) claims stating has rotating device to rotating disc but the current invention load plurality of optic-lens.
3. Change the LED light to more specific for any kind of LED light having the LED light has certain functions or certain installation areas may selected from LED project lighted image or-and light-patterns for
   (i) outdoor garden light, (ii) outdoor or indoor seasonal light, (iii) LED light has connect with AC power source by AC plug-wire, (iv) LED light has the 3 basic components including LED and image-forming unit and project/protective front or top cover or lens install within the said any shape or any function LED project-light unit.

The current invention is continuously or division filing for co-pending parent filed case including (#Q-2007) (#FF-2007) (#TT-2010) (#QQQ-2012) (#ZZZ-2013) series, those had all functions or features on each one filing case with details discussion. The current invention attached some major parent including (#FF-4) and (#Q-07) inside the drawing pages from 11 to 24 page for quickly review parent case details.

From all the co-pending filed parent cases has function or features as below which not only for parent filing for outdoor lighting but it also cover the LED or-and laser bulb features including (1) Project light, (2) More than one function, (3) adjust focus, (4) Adjust angle, (5) Elastic contact points, (6) LED heat solution, (7) Heat sensitive parts installation, (8) Extend means, but also including new features (a) has movable-means to allow the at least one of level of the more than one lever LED bulb can move the desire level(s) away from original position, location, orientation to overcome all the interfere block-object so the said LED bulb can solve the (a) heat issue from LED(s) or circuit or electric components, (b) lamp shade metal frame's block out the LED bulb light beam traveling, (c) glass or metal or cement block means to block out the electric signals transmit from Bluetooth set, wi-fi system, internet set, App software program or any other electric wave-signals transmitting to control the said LED outdoor light or bulb or light kits and its related electric parts or accessories. It is appreciated all the above listed or discussed co-pending or issued patents co-inventor's concept, idea, design still should be considered within the current invention's scope and fall within the current invention's claims.

Furthermore, the current invention has the moving Big project-image light performance to be seen on wider viewing angle which can created by (AA) making the said LEDs has different time to turn on and off to make light source changing portion related to the film/or openings/or texture lens/or prism lens/or diamond lens/or spiral marking lens/or reflective or-and refractive lens/or project lens, or-and (BB) making rotating, spin, vibration, shake, moving of the said film/or openings/or slide/or printed piece/or texture lens/or prism lens/or diamond lens/or spiral marking lens/or reflective or-and refractive lens/or project lens, or-and project-lens has refractive or-and refractive or-and diffusing lens or-and other desired optics properties, so can make the big projection image has desired moving effects.

The current invention with moving or steady big projection image still fall within the basic relative position for parts those are still same as all co-pending filed parent cases[.]

Such as LED light source emit light to film/openings/slide/printed piece/texture lens/prism lens/diamond lens/ treated lens/printed piece/variable thickness lens or other market available piece, or-and 2nd optics-lens can create the image or-and lighted patterns (image-array or matrix or contour or geometric-shapes) to refractive properties project-lens which has at least refraction properties[.]

And, all these LED/Image-forming unit(s) or carrier/refractive project lens are the 3 basic components for project-assembly is the most simple and lowest cost project-assembly can fit into or install or arrange or assembled with any LED related light housing, or tube, or tube assembly, or frame, or holder, or disc, or groove, or ditch to form desired light device for outdoor use; those can be the separated piece(s) or can be the said housing or parts including but not limited for LED light or LED bulb shape housing only. But the current invention which cover the said outdoor project outdoor for garden light, or seasonal light, or outdoor holiday season project has the project image or-and lighted patterns function light.

The current invention incorporates with above listed co-pending or patented cases' features, construction still fall within the current inventions scope and all related equivalent function or replace parts also should fall within the current invention.

The current invention for LED outdoor or LED seasonal garden light may have at least one movable parts to make the at least one of the said LED, or-and image carrier, or- and refractive project-lens to move to get the big project image show the moving effects. One of the arrangement is to let the group of LED(s) turn on and turn off on different time period to make the light source to change position or location or orientation with related image carrier, or-and project-lens to get the moving effects to make desire light functions, performance, effect; or The at least one of the LED(s), or-and image-carrier(s), or-and project-lens incorporate with movable device including but not limited selected from IC, motor, clock movement, or-and magnetic and magnetic coil set to make moving or moved, so can get the moving effects for big project image on desired surface which at least arms distance away from the LED outdoor light or LED bulb.

From marketplace and past filing history for all co-pending or issued project LED light of current inventor has big difference and features better than some prior arts including U.S. Pat. No. 5,517,264 Sautton, Public 2006/004/4532[,] U.S. Pat. No. 3,949,350 Black, 2008-016-5527

Vander Schuit, U.S. Pat. No. 5,769,684 Lou, U.S. Pat. No. 5,934,223 Elley-Guy, U.S. Pat. No. 7,056,006 Smith, U.S. Pat. No. 7,438,446 McCann, U.S. Pat. No. 7,533,051 Brass et al, US public 2002/0089650 Stewart, US public 2008/0197374, U.S. Pat. No. 6,192,824 Change, U.S. Pat. No. 6,558,022 Kawahara, U.S. Pat. Nos. 4,025,779, 4,443,832, 5,311,356 Freilich, U.S. Pat. No. 8,157,422, US Public 2003.0151926 Mermaz et al. U.S. Pat. No. 5,595,435 Palmer et al, U.S. Pat. Nos. 7,478,912, 7,627,444 Black, U.S. Pat. No. 7,717,570 Black, U.S. Pat. No. 7,329,035 Feliciano, U.S. Pat. No. 7,419,294 Lai[.] And, none of these prior art use the simple 3 basic parts (LED or-and laser light source+image forming-unit(s) or texture lens+One of refractive lens) of the said basic project assembly to make the lighted image or-and lighted patterns to show on the outside of housing to make the building, outside wall, ground, garage door, house, building for illumination.

Furthermore, All these light devices mainly for night light application. The current invention is for Outdoor lighting including garden light; or-and seasonal outdoor lighting for garden, door, patio light string; or others which for outdoor use[.]

So, all prior arts has no one had this outdoor garden or seasonal garden or outdoor light application only the co-inventor co-pending (#TT family) and (#II family) has discussed for earlier filed cases. The current invention specify the difference with (#II-family) the LED or-and light source is belong to the project-assembly which is not from (#II-family) said the LED light source is from the main products as the revised and update drawing FIG. 25, FIG. 7 (L4 LED) which LED is built inside the main products and front has image forming unit or-and texture lens. And, front of image forming or texture lens has at least one or plurality of refractive-lens inside rotatable or movable disc to make the said main products to have desired moveable or changeable lighted image or-and lighted patterns.

However the current invention has the co-pending filing case (#TT-Family) which is CIP of (#II-2) (#II-1) (#II-2009) for same drawing for the Fig L and Fig Mon the all filed cases and FIG. 25 has been update for the LED light source is built-inside of the 3 base-assembly which has its own housing and use preferred AC wire-plug or bulb base or plug-in prong/pigtail/quickly connector so can get the AC power source for outdoor light or outdoor garden light or outdoor seasonal garden/light string/patio light/light string to use as current invention FIG. 25 and FIG. 7 LED light source (L4 LED) inside the (L8) outdoor garden cone or other shape housing. The current invention is updated the co-pending (#TT) and issued (#II) family which filed on 2010 and 2009 so current invention has more advanced features and update points from current update drawing for difference.

This is Division filing for (#AAA-I) U.S. application Ser. No. which is Continue in Part of (#AAA) U.S. application Ser. No. 12/984,583, Filed on Now is U.S. Pat. No. 9,157,589 which is Continue in Part of (#TT-2) U.S. application Ser. No. 14/968,250, Filed on Dec. 14, 2015 which is Continue in Part of (#TT-I) U.S. application Ser. No. 14/944,953 Filed on Nov. 18, 2015 which is Continue in Part of (#TT-10) U.S. application Ser. No. 12/866,832, Filed on Sep. 21, 2010

** The (#TT-family) teach the all kind of application to use 3 basic-parts of project-assembly for different housing to become different applications including (#II-2009) (#II-1) (#II-2) for all outdoor lighting, outdoor garden light, outdoor seasonal light for projection with all same drawing for (#II-2009) (#II-1) (#II-1) and the (#TT-family) also has listed the (LED or-and Laser light source) to incorporated the grating or optic-lens to make the laser projection light too. The (#TT-family) also has all the drawing of the (#FF-2008) (#FF-I) (#FF-2) (#FF-3) (#FF-4) drawing for plurality image-forming units(s) fit into holder or disc, and also has all detail description for disc or holder to load plurality of the image-forming unit(s) or optics-lens which has ROTATING DEVICE to make the said optics-lens to rotating on text and claims. Which are same as current invention to make the any combination to make the rotating for 1. (LED for N different color and N-number of the LEDs), or-and 2. (Image-forming unit(s) itself or assembly or disc or holder in type of texture-lens, prism-lens, stencil, cutout, film, slid), or-and 3. (refractive lens in different shape, size, assembly, number, disc, holder)

To make more than hundreds of combination for LED+ Image-forming unit(s)+refractive-lens to make different light effects, functions, performance.

This is Division filing for (#11-2) U.S. application Ser. No. 13/540,689 filed on Jul. 3, 2012. Publication data US 2012-026 8668 dated on Oct. 25, 2012.

This is continue in part of (#11-1) U.S. application Ser. No. 13/534,611 filed on Jun. 27, 2012, publication data US 2012/0268947 dated on Oct. 25, 2012

This is continue in part of (#11-2009) U.S. application Ser. No. 12/624,621 filed on Nov. 24, 2009, publication data US2010/0214541 date Aug. 26, 2010

** These (#II-family) are the first invention for market-place for use simple 3 basic project parts (LED+image-forming unit(s)+refractive-lens(s)) as project-assembly to fit into different outdoor application housing including outdoor lighting, garden light, seasonal lighting which having more than one light unit or LED-units. These (#II-family) also teach to install the 3 basic parts (LED+image-forming unit(s)+refractive lens) into any kind of construction of the HOUSING to form the MAIN PRODUCT including the outdoor light, garden light, light string with self-built-in LED or use main-products LED(s).

(#FF-4) U.S. application Ser. No. 14/968,862, filed on Dec. 14, 2015 which is Continue in Part of (#FF-3) U.S. application Ser. No. 14/539,267 filed on Nov. 12, 2014 which is Continue in Part of (#FF-2) U.S. application Ser. No. 14/275,184 filed on May 12, 2014 which is Continue in Part of (#FF-I) U.S. application Ser. No. 12/914,584 filed on Oct. 28, 2010 now is U.S. Pat. No. 8,721,160,

** These (#FF-family) show the (1) Plurality of image forming units or optics-lens install with the Disc or holder, and (2) The Optics-lens has rotating device to make it rotating, and (3) The one or plurality of image-forming units to rotating, these are the some assortments to make desired image or lighted patterns projection effects.

This is Division filing for which is Division for filing of which is Division for filing of (#Q-2007) U.S. application Ser. No. 11/806,284 filed on Dec. 15, 2007 now is U.S. Pat. No. 7,630,004 which show the "More than one of optics means for LED light device". Which are main features for current invention but the (#Q-07) is difference at the current invention for the 1st optics-element is not the elongate or linear type with top end reflective properties. The current invention the 1st optics-element or optic-lens is flat or curved or dome or sphere shape without the top-end has reflect all the light beam within the elongate or linear piece.

This filing is Division filing of (#QQQ-7) U.S. application Ser. No. 15/494,477 filed on Apr. 24, 2017 which is continue in part of (#QQQ-6) U.S. application Ser. No. 15/355,515 filed on Nov. 18, 2016 which is continue in part of (#QQQ-5) U.S. application Ser. No. 15/341,782 filed on Nov. 2, 2016 which is continue in part of (#QQQ-4) U.S. application Ser. No. 15/348,218 filed on Nov. 10, 2016 which is continue in part of (#QQQ-3) U.S. application Ser. No. 14/983,993 filed on Dec. 30, 2015

Now is allowanced which is continue in part of (#QQQ-2) U.S. application Ser. No. 14/289,968 filed on May 29, 2014 Now is U.S. Pat. No. 9,551,477 which is continue in part of (#QQQ-1) U.S. application Ser. No. 14/280,865 filed on May 19, 2014 Now is U.S. Pat. No. 9,581,299 which is continue in part of (#QQQ-2012) U.S. application Ser. No. 13/540,728 filed on Jul. 3, 2012 now is U.S. Pat. No. 8,834,009 which is division filed of (#JJJ-1) U.S. application Ser. No. 13/296,469 filed on Nov. 15, 2011 now is U.S. Pat. No. 8,711,216

Related the moving optics-lens or image forming-unit or LEDs for outdoor application at least for one of a garden light, outdoor light, LED bulb has project function(s).

The co-pending filing cases covering all kind of Single or multiple or plurality of lighted image or lighted patterns projection for LED outdoor lighting device has adjustable 1. focus, or 2. project direction or 3. angle and 4. Image properties such as brightness, color, select color, size. These co-pending (#ZZZ) (#QQQ) (#AAA) (#TT) (#II) (#FF) (#Q-07) family of filed cases which has all kind of LED light with or without movable or changeable image or lighted patterns of project function. The below list some of the concepts or parts & accessories to allow the said outdoor LED light device has desired movable or-and changeable or steady or selected image or-and lighted patterns including at least one;

a. changeable or change position not only (A) slide/film/image forming unit(s), but also (B) the LEDs. or-and (C) optics-lens/prism lens/diamond dome lens or other sphere lens, or-and (D) has multiple image, or-and (E) has multiple project head, or-and (F) has manual or auto or motor or rotating device make moving slide/film/prism lens/diamond dome lens/spiral making dome lens/plurality of refractive-lens in a disc or holder/or-and other selected project-lens or LEDs or image-forming unit(s) with desired assortments or combinations to get hundreds of type constructions, so can change image or-and lighted patterns as pre-determined functions.

All these features of current invention just same as the concept of these parent co-pending cases for LED outdoor light which has same theory and 3 basic parts of project-assembly to fit into the any desired outdoor light housing. The said same 3 major kits including but not limited for 3 major components which including its (1) high low position relation lower LED(s) and (2) center has image carrier or image forming unit(s) and (3) front of refractive project lens into housing of the said market available all kind of outdoor LED light or products.

Those outdoor light, or-and garden light, or-and LED bulbs has major 3 basic parts assembled or installed or fixed of different construction of housing.

The below figure(s) just show few of preferred embodiment to show how to arrange the 3 major components for each different housing of outdoor LED products for example but not limited for all other same function, alternative, or replacement embodiments than these preferred examples:

(I) The one of application for LED Bulb which has housing with Bulb base with the one more twist-tight bulb base electric contactor will become the current inventions LED project Bulb with variety construction including has overcome block-objects as co-pending (#QQQ-2) Ser. No. 14/289,968, (II) Outdoor project garden or seasonal light application which only need to design a housing and arrange the at least 3 major components into and has proper AC-to-DC circuit from outside transformer or inside built-in the housing with preferable or optional other parts & accessories and incorporate with motor assembly to rotate the said disc which has install plurality of optics-lens so can make the at least one or more than one LED light beams passing through the top image carrier 1st and then go through the top geometric or dome or half ball or at least half ball or flat cover or-and project-lens, and create or magnify the said image or-and lighted patterns enlarge to desired size to be seen.

The LED(s) light beam passing through the image-forming-unit(s) which may (1) LED light beam 1st go through texture lens and go through 2nd refractive or-and project lens or (2) LED light beam 1st go through a slide or film or opening or window or stencil and go through 2nd refractive properties project lens to enlarge the arts or image, or-and (3) LED light beam pt go through the image-forming-unit(s) and go through the 2nd refractive project lens and $3_{rd}$ go through a protective or environment light passing through lens or cover;

All these embodiment are just for few simple arrangement which may has desired combinations or assortment while use different LED light source, different image-forming unit(s), different refractive-lens in number, color, texture, image, so N type of LED×M-Type of image forming unit× P-type refractive lens can get N×M×P number of assortment(s) or combination(s) to get hundreds of different light show outdoor project lightings and each has different light performance, show. Hereof, show some possible different type for each of LED, Image forming units, refractive lens as below;

(i) LED or LED assembly have different number or color or assembly of LED(s), or (ii) The image or lighted-patterns or texture lens have different number of lens or image forming unit(s), or type, or desired treatments of surface or material of lens, or different image, marking, printing, text, arts, holes, cutout, polished, opaque, contour, shape of the said image-carrier, or (iii) The reflective or-and refractive lens or assembly have different arrangement, number, optic-properties, clearance, focus, adjustment kits, or variable thickness, or refractive or-and reflective or-and diffusing or-and random reflective or-and opening or-and windows or-and steady or moving of the said optics-lens, or (iv) The outdoor lighting or LED bulb have (1) optional other optic-lens to make narrow LED light beam to become wider and parallel light into image forming-unit(s), or have (2) protect cover, or have (3) heat-sink device, or have (4) frame, holder, rotatable disc, compartment, or have (5) conductive wires, sensor, or have (6) ground pole, ground sticker, ground installation kits, environment cover, or have (7) device or shell or ball to add for the said all kind of construction of light device.

From the co-pending all projection theory discussed or listed above, the current invention further disclosure the one project LED outdoor light or LED bulb has built-in multiple project-assembly like the co-inventor's U.S. Pat. No. 8,083,377 issued date Dec. 27, 2011 FIG. 15 and FIG. 16 has the multiple project head to create multiple big project images on areas or surface. The current invention also had same concept to have multiple of (A) LEDs, or-and (B) image carries unit or texture lens, or-and (C) project-lens with (D) the motor/movement/rotate kit/spin kit/movement/magnetic & magnetic-coil set to make the said any of (A) or-and (B) or-and (C) to make hundreds of different combinations or assortments to make the desired light show or light performance. It also optional have (D) IC with parts to make the light source or-and image carriers or-and project-lens to make moving effects to viewers.

The same concept also apply for co-inventor other patent filed for the said LED light is cover all the plug-into Outlet night light or desktop night light which has the housing parts, tube, tube assembly like U.S. Pat. No. 8,083,377 FIG. 4 to install the said image-carriers or-and project-lens or other parts including but not limited such as other optics lens, motor, gear set, time piece movement with desired speed for spin, or-and holder, frame, disc to hold the said disc of plurality of optics-lens, project lens, tube piece, LEDs, image carrier or carriers with desired focus with adjustable kits to variable requirement for different distance for big Image surface.

The current invention as above discussed LED outdoor project light has any number of the housing parts or multiple tube or tube-assembly or-and LEDs or-and project-lens assembly to put all parts inside the existing marketing outdoor lighting or garden light housing.

The said major 3 parts LEDs, image carrier, project lens fit within or install into the said garden light housing construction and it also incorporate with other tube, tube assembly, parts to make the outdoor lighting or LED bulb has 2 or more different light output-ends some for rotating or moving effects, some output-end has steady image or lighted patterns as main characters as the FIGS. 40 drawing which has the main character is steady always on and surrounding has moving or rotating lens to project moving or rotating image.

This is the other features shown on the co-pending This filing is Division filing of (#QQQ-7) U.S. application Ser. No. 15/494,477 filed on Apr. 24, 2017 which is continue in part of (#QQQ-6) U.S. application Ser. No. 15/355,515 filed on Nov. 18, 2016 which is continue in part of (#QQQ-5) U.S. application Ser. No. 15/341,782 filed on Nov. 2, 2016 which is continue in part of (#QQQ-3) U.S. application Ser. No. 14/983,993 filed on Dec. 30, 2015

Now is allowanced.

As long as the said outdoor project light has 3 basic-parts of project-assembly and the arrangement sequence is (low-to-middle-to-top or rear-to-middle-to front) for (LED—Image forming unit(s)/texture-lens—refractive Lens) should be fall within the current invention scope and claim which can move the any combination of (1) LED(s), or-and (2) image forming unit/texture lens, or-and (3) refractive-lens to become moving device and create the moving or changeable image or-and lighted patterns LED outdoor project light.

The said one of preferred embodiment to make the image or-and lighted patterns for moving or waving or rotating or changeable can made by (1) control the said LED has desired on-off time and period time and functions (2) incorporated with motor/movement/spin/rotate device to move the image carrier or-and project-lens or LED(s). The same concept can also apply to the LED bulb which can fit for all desk lamp or down light or recess light lamp holder or some adaptor. The said LED bulb has one of a preferred or optional power switch or auto sensor switch or wireless controller.

The said LED outdoor project light has all co-pending or parent filing features including: The current invention co-pending (#QQQ-2) U.S. application Ser. No. 14/289,968 teach LED bulb is good for upper or down installation because has including extractable design, extendable construction so it can overcome the down light application because some down light (LED Bulb base face land) has (1) lamp shade which made of glass, or (2) the LED bulb is surrounded by metal, cement, concrete surrounding the said Down light or recess light installation, so these application has electric-signal block-object which will affect or interfere the electric signal transmitting so stop or meet trouble for Bluetooth control, Wi-fi control, remote control, infra-red control, internet control, App software control which will lose or reduce or limited the signal transmitting to let these functions become a problem. So the current invention's co-pending (#QQQ-2) U.S. application Ser. No. 14/289,968 teach all proper movable-means help to overcome these electric signal block-objects and make the LED bulb has its designed and pre-determined functions without any affect or interfere or limited by the said electric-signal block-means. Same as the outdoor project light it has angle or direction or-and focus adjustment so can overcome the any block-object exist between the LED light beam emit to the building or housing or wall or shown-surface.

The current invention's co-pending (#QQQ-2) U.S. application Ser. No. 14/289,968 teach has more than one level(s) (including parts and accessories) LED bulb which each level can has its own functions or multiple functions control by market available skill or method may selected from Bluetooth, Wi-fi, internet, App software, IC, Remote signal, infra-red signal, motion sensor, heat sensor though computer, communication, consumer device by people. Such as the more than one levels LED Bulb has (1) Multiple colors with changeable colors and moving effects (2) Multiple functions select from market available any LED light effects for indoor and outdoor lighting (3) Multiple controller which select from market available control, sensor, switch, bluetooth, wi-fi, internet, app software, remote, infra-red or other electric or electronic related circuit or device(s) (4) More than one movable-set (5) Changeable geometric shape (6) Changeable construction (7) moveable set select from any group combination from bar, pole, spin, rotate, hinge, arms, joints, join, frame, connector, sections to make the levels, parts, accessories to be move away to desire location, positions. These are also the other features of co-pending filed case which can apply to the current invention of the outdoor project light for inner or outside parts selections to make the image angle, direction, or focus adjustable, or parts installation for outdoor project light while has movable disc which has plurality of refractive-lens rotate or move by motors.

The current invention mainly for LED outdoor light or-and for LED bulb which has following co-pending US Application many cases also teach other features as parent filing case stated as below:

1. The current invention co-pending U.S. Applications teach the (1) moving optics-lens (2) disc to install plurality of optics-refractive lens or image-forming unit(s) or film or slide (3) The moving effects made by motor or movement device or rotating device as the co-pending filed (#FF-Family) See (FIGS. 9 to 18) which filed on 2008 and (FIG. 25) for the movable disc or holder moveable or rotate by manual or automatically by motor or movement device.

2. The current invention co-pending U.S. Application many cases also teach the said LED outdoor light has (i) One or more than one of LED for desire light performance. (ii) more than one color for LED(s), (iii) more than on project assembly including the steady big steady image projection surrounding moving or rotating image or-and lighted patterns for project steady or-and moving LED lighting performance, (iv) plurality of refractive-lens fit into movable or rotatable disc, compartment, holder to make the rotating refractive-lens so can present the steady cutout or film or slide image to move a pre-determined path shown to people to be seen, (v) plurality of different color, number, type, texture-lens, image-forming units, refractive lens to get N-type LEDs×M-type of image forming-unit or texture lens×P-type of refractive-lens=get (N)×(M)×(P)=(total number of assortments or combinations) which show on the co-pending on (#QQQ-3) (#QQQ-5) (#QQQ-6) (#QQQ-7).

The current invention can create same light performance as the co-pending or patented applications as attached drawings (FIGS. 33 to 35) (FIGS. 36 to 39) (FIGS. 40 to 44 (FIGS. 45 to 48) for moving or-and steady main character 2 or more lighted image or-and lighted-patterns. The difference than prior-arts with current mainly for Plug-In night light which has prong to directly plug-into outlets installation and not like current invention for outdoor project light which use the AC-wire with Plug to connect with outlets as Co-pending Filed case (#II-2009) (#II-2) as (14 of FIG. 31) and (15 of FIG. 20) also show the power source is connect by AC-wire plug.

However, for the LED light has (iv) more than one of optics-lens which is disclosure inside the (FIG. 19) which is co-pending (#Q-07) which is parent case of co-pending filed case of (#FF-4) (#FF-3) (#FF-2) which has also details description for disc to install plurality of image-carrier(s) and rotating by motor so the current invention is Child filing case for (#FF-4) and (#Q-07-more than one optics-lens) and just change (AA) Disc to load the Plurality of "optics-lens" instead of "image-carrier", and (BB) just change to "LED outdoor lighting" housing instead of "LED night light" housing. So simple keep the same (disc install plurality of image carrier or optic-lens) and keep the same (rotating device rotate the optics-lens) and keep the same parent (#Q-7) "LED light has more than one optic-lens". These features and concept is same as parent co-pending (#FF-4) (#FF-3) (#FF-2) which is Division filed of (#Q-07) as above disclosure and drawing attachments for (#FF-4) public data and claims for these wording and also disclosure the (#Q-07) issue patents 4 pages for verify the continuously filing and division filing so there should not any LED related light application should be copy the current filing case and its parent co-pending case or issued parent filed case.

Furthermore, the current invention is CIP of the parent of the (FIG. 9) (#FF-4) which is the parent of US Application of FIG. 22) (#I I-2009) Ser. No. 12/624,621 filed on Nov. 24, 2009 which is CIP of the (FIG. 19) (#Q-07) which discussed on above listed parent case.

The (#I I-2009) had very clear and solid claim for the same 3 major components LED, and image-carrier or display-unit, and project-lens or-and protective lens or cover of the said project assembly is fit into or install into the outdoor garden light, outdoor seasonal light, outdoor Halloween light, outdoor Christmas light to project, fixed or steady or changeable image or lighted patterns.

From the (FIG. K) (#I I-2009) U.S. application Ser. No. 12/624,621 parent filing case claim 1 can see all these claims. It is appreciated that the current invention parent (FIG. 9) (#FF-4) its parent filing case (FIG. 19) (#Q-07) also is the parent of the (FIG. 9) (#I I-2009) and (#I I-2011) US application Ser. No. 13/534,611 both had (aa) The 3 major components arranged inside the main product to project the Fixed or Steady or movable or changeable image or lighted patterns.

(bb) The said main products is one of Outdoor garden light, outdoor seasonal light, Outdoor lighting which is same as the current invention concept, idea and this current invention just put all co-pending parent filed case for (#Q-07) (#I I-2009) (#I I-2) (#FF) (#TT) (#ZZ) (#QQQ) series and make brief for apply the project-assembly 3 major components can get the most simple construction and lowest cost to make clear image or-and lighted patterns with optional to change position of LED, or-and image-carrier, or-and optic-lens by motor or manual device. It also can have optional focus or projected-image location adjustment. It also can have digital data projection.

3. The current invention co-pending U.S. application many cases also teach the said LED outdoor light or LED Bulb has Focus adjustable-kits so can make same light beam emit out from same LED bulb to wherever surface(s) with desired light performance with brightness, size, light spots, color, lit-areas. The same light beam output from same LED Bulb with focus adjustable kits can create the different light pattern, light path, light brightness, light performance, light direction, light performance by viewer.

4. The current invention co-pending U.S. application many cases also teach the said LED outdoor light, garden light, seasonal light has parts such as ground bar, stake, base, holder, base, so it is enable to install on ground or rigid floor. Furthermore, the current invention may have similar parts for the extendable or the like parts of LED bulb can keep away from LED(s)'s heat, block-objects, cylinder tube to make the extendable or retractable function to simulate the firework or some near-to-far or far-to-near changing focus functions for certain image or lighted patterns, or overcome some other block-objects which block the motion-sensor lens, remote control signal, or light beam emit direction. The extendable or retractable parts keep the said LED outdoor light or the LED bulb's related circuit board/remote controller/IC/switch/sensor/electric parts or assembly or accessories away from the LED-units or block-objects to prevent from heat affect the desire functions, performance, such as Motion sensor or PIR sensor head or RF receiver or sonic receiver or Fresnel-lens or LED-unit light beam emit direction.

5. The current invention co-pending U.S. application many cases also teach the said LED outdoor light or LED Bulb has extractable/extendable/movable/rotating kits to make movement for the any combination of the parts or accessories moving, waving, shaking, vibration selected from (1) LED or LED(s), or-and (2) image forming-unit(s) or texture lens, prism lens, diamond lens, or film, or slide, or stencil, or printed piece, 1st or 2nd optics piece/lens or its related parts & accessories, or-and (3) single or more than one or plurality of refractive lens or lens-assembly alone or disc or compartment or holder. The said extendable or extractable parts preferred to design on front of the LED outdoor lighting so can make the image forming-means change distance with the refractive-lens to make the focus adjustable and create the near-to-far or-and far-to-near optics-functions, but it depend on the different requirement and different consideration of light performance needed. The extendable or retractable parts other function can offer the more space to install the preferred electric parts & accessories, offer the extra length to far-away from heat source or block-objects so the LED outdoor light or LED bulb also can overcome heat and block objects for any applications, installation. The other features than above discussed extendable or retractable feature, The current invention function to light-up the outside building or house or wall which need a very strong light brightness so the current invention need to use high wattage LED or LED(s) to offer sufficient brightness such as 0.5-10 watt LED unit or unit(s) so need extendable or heat-sink or ventilation or fan to help to reduce the heat from these super brightness LED or LED(s) accumulated heat to reduce temperatures for safety reason. This is other features for outdoor project LED light device.

6. The current invention co-pending U.S. application many cases also teach the said LED outdoor light or-and bulb different from all market available products which offer The illumination only cover the adjacent area which are start from the LED outdoor light or LED bulb to certain distance (illumination surrounding LED light source or start from LED light source to certain distance with illumination) and do not offer the illumination or image to an area(s) which has certain direction(s), angle(s), distance(s) which far away or remote-away from the LED outdoor light or LED Bulb. The current invention can make any combination to offer the near-by areas illumination, far-away areas illumination or together for both illumination effects such as the co-inventor's other products under (#QQ-2010) U.S. Ser. No. 12/771,003 filed on Apr. 30, 2010 now is U.S. Pat. No. 8,408,736 which is Division of the (#FF-2008) which is filed on 2008.

7. The current invention co-pending U.S. application many cases also teach the said LED outdoor light or LED Bulb has more than one light beams output to different area(s), direction(s), location(s) and make more than one areas or locations has illuminations which all these areas may not adjacent, link, sit together as (#QQ-2010) U.S. Ser. No. 12/771,003 filed on Apr. 30, 2010 now is US patent No. U.S. Pat. No. 8,408,736 and (#SS-2010) U.S. Ser. No. 12/876,507 filed on Sep. 7, 2010 now is U.S. Pat. No. 8,083,377 Dec. 27, 2011 issued, both are Division filed of (#FF-2008) which filed on 2008.

The said LED outdoor light or LED bulb may offer more than one area(s) have illumination is other features of current other features which can allow people to make the energy saving and only offer illumination for where needed such as Stair lighting which only Up or Down two direction need illumination to see stairs. Rest areas no need the light at all and the said stair-lighting has built-in motion sensor has sensitivity up to 10-30 feet is enough to cover one floor stairs (Normally is 18 steps). One light beam for LED bulb to emit up 9 steps and one light beam of same LED bulb to emit down 9 steps. This will be enough illumination because each up and down stair are been illuminated by each Floor's one LED Bulb, so 2 different of light beam(s) to offer same one up and one down steps. This is pretty good power saving device while motion sensor device build-in more than one of light beam as output from one LED bulb.

Hence, the current invention & co-pending U.S. application many cases also teach LED outdoor light or LED Bulb can has at least one or plurality of light beam output from one LED outdoor light or LED bulb to near-by area(s), remote-away area(s), far-away area(s) or any combination of these area(s) with adjust angle, adjust focus, elastic contact-point, rotate/spin/tilt frame or support or base to get desire direction to emit light beam or-and project image or-lighted patterns for fixed or steady or moving or changeable performance, or has added extend/retractable parts to install the parts & accessories for special near-to-far or far-to-near vision effects light show and also can away from heat or block-objects; these all belong to current invention features so can let all light beam to emit to area(s) where need the illumination or-and project image or-and lighted patterns. And, it is not like conventional LED outdoor light or LED bulb only can supply the near-by area(s) which start from the LED light source to certain limited distance areas (LED light source has limited brightness to emit to long distance except like current invention to apply optics-lens or lens-assembly to project light beams to remote-away or far-away distance which current market items did not create.

BRIEF DESCRIPTION OF THE DRAWINGS

FIGS. 6-8: Disclosure the basic refractive lens theory applied to the current invention to form the image or-and lighted patterns.

FIG. 9: Disclosure the co-pending filing (#FF-4) publication data show on all the parent filed cases and the movable disc to load plurality of image forming unit which also can simple to install plurality of refractive-lens.

FIGS. 10-16: Disclosure the co-pending (#FF-4 and its family #FF-3, #FF-2 and #FF-5) which one of copy shown clear public data on top and show clear for movable disc to install plurality of image-forming means or lens.

FIGS. 17-18: Disclosure the co-pending parent filed case (#FF-5, #FF-4, #FF-3) one of public and patented copy which show (a) moveable disc can rotate by motor or spin device (2) disc to install plurality of image forming unit (3) the device has rotating device to rotate the optics-lens inside the Claim of (#FF-family) issued patent.

FIG. 19: Disclosure the parent filed case (#Q-2007) which for "LED light has more than one optics-piece" of the co-pending (#FF-5) (#FF-4) (#FF-3) and issued patent (#FF-2) and US issued U.S. Pat. No. 8,721,160 (A) claim 2 line 4 "rotating means to rotate optic-means" and (B) claim 7 line 22 to line 26 "mean for adjust said optics-means, said . . . .

Rotating means for rotating optic-means". To show rotating optics-lens is on the parent patented case on May 13, 2014 which filed on Oct. 28, 2010 parent filed on Dec. 30, 2008 U.S. application Ser. No. 12/318,470.

FIGS. 20-22: Disclosure the Co-pending parent (#TT) of current filing and (#TT-family) is the Child Filing for (#I I-2009) (#I I-1) (#I I-2). The (#II-family) has clear said the 3 basic-parts (LED and image forming unit/texture lens) and refractive lens) to fit into main housing to form the main products including outdoor lighting, garden light, seasonal lighting as U.S. Pat. No. 8,511,877 Claim on Column line 18 to line 20 "Seasonal garden light, seasonal outdoor light, lighting fixture". It also shows on the (#II-2) patent (#I I-2009) U.S. application Ser. No. 12/624,621 filed on Nov. 24, 2009 now is U.S. Pat. No. 8,303,150 Parent claim 1 Column 9 line 18 to line 19 same as the Child (#11-2) claims as above listed.

FIGS. 23-26: Disclosure the (3 basic units of project assembly) details illustration as clear definition to use LED on other products or self-container LED unit to fit into all kind of seasonal garden light or seasonal outdoor lighting different housing with disc to load the image-forming units or optics-lens/refractive lens which is rotating or steady/no move for hundreds of preferred combination as the FIGS. 40 to 44 or-and FIGS. 45 to 48 some brief illustration out of hundreds of assortment for more/no-move, 1 or plurality of image-forming units/textures lens, 1 or multiple piece, 1 or more colors, has or without IC controller so can came out hundreds of combinations.

FIGS. 27-32: Disclosure the (#II-family) patent (#I I-2009) U.S. application Ser. No. 12/624,621 filed on Nov. 24, 2009 now is U.S. Pat. No. 8,303,150 clear stated claims 1 for power of the seasonal garden light or seasonal outdoor light has the AC plug wire to get AC power on the FIG. 14 to offer evidence the said AC plug wire is one of the preferred kits to deliver the AC power to LED seasonal garden or outdoor projection light device.

Figures 33, 34, 35:
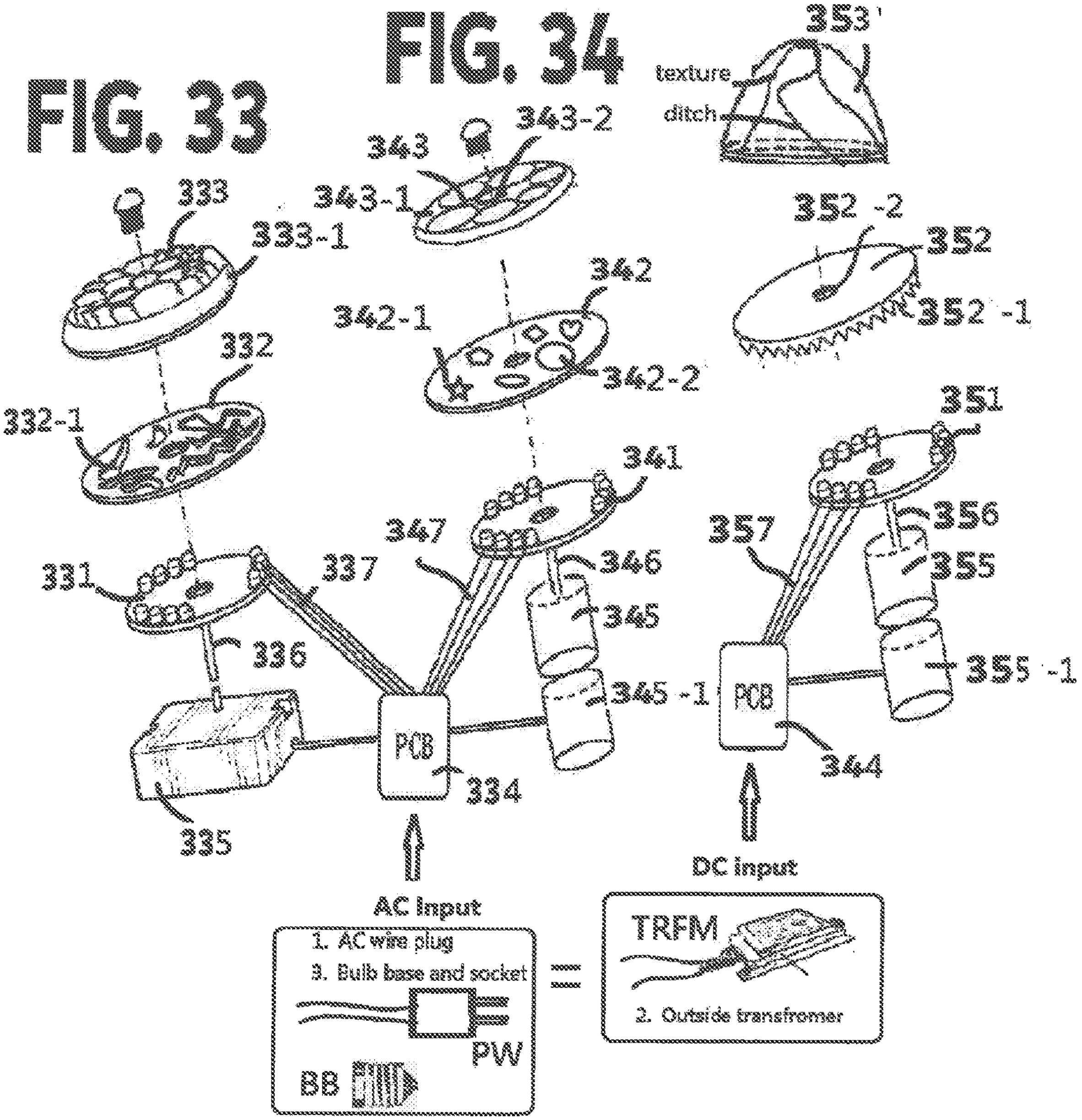

FIGS. 33-35: Disclosure the 3 preferred embodiment and construction for LED outdoor or garden light or LED bulb has projection functions and details to make changeable or movable image or lighted patterns.

FIGS. 36-39: Disclosure the 4 preferred embodiment of LED outdoor light application for several different housing to install the 3 basic parts of project-assembly into different garden light or outdoor light housing with preferred connection to AC power source to project image or-and lighted patterns FIGS. 40-48: Disclosure the move details construction for few embodiment of the said LED outdoor or garden light or LED bulb has movable or changeable image or lighted-patterns for several different housing with optional small or big tube to make both or one of steady or moving effects from one outdoor or garden light.

FIGS. 49-51: Disclosure the one of preferred top cover or optic-lens in dome or sphere or at least ½ ball shape for the inner 1st optics-lens and desired number/color LEDs with optional motor or-and gear set to make moving or-and changeable image or-and lighted patterns for outdoor or garden projection light device.

FIGS. 52-57: Disclosure the one preferred embodiment of the said LED outdoor light or garden light application with optional (1) motor and gear-set and its axis and the light traveling the said reflective or-and refractive lens on one optic-piece, or (2) go from pt optics-lens to $2^{nd}$ optics-lens both has the reflective or-and refractive properties and with preferred 3 different connector to get AC power.

FIGS. 58-61: Disclosure the co-pending cases which has the said pt optics-lens and $2^{nd}$ optics-lens for plug-in night light and current invention just simple to change the connector from prongs to the any one of 3 preferred type can connect the said current invention outdoor or garden light to get power from (a) AC plug wire or (b) Outside AC-to-DC transformer or DC-to-DC converter or other circuit (c) bulb base terminal.

Figure 62:
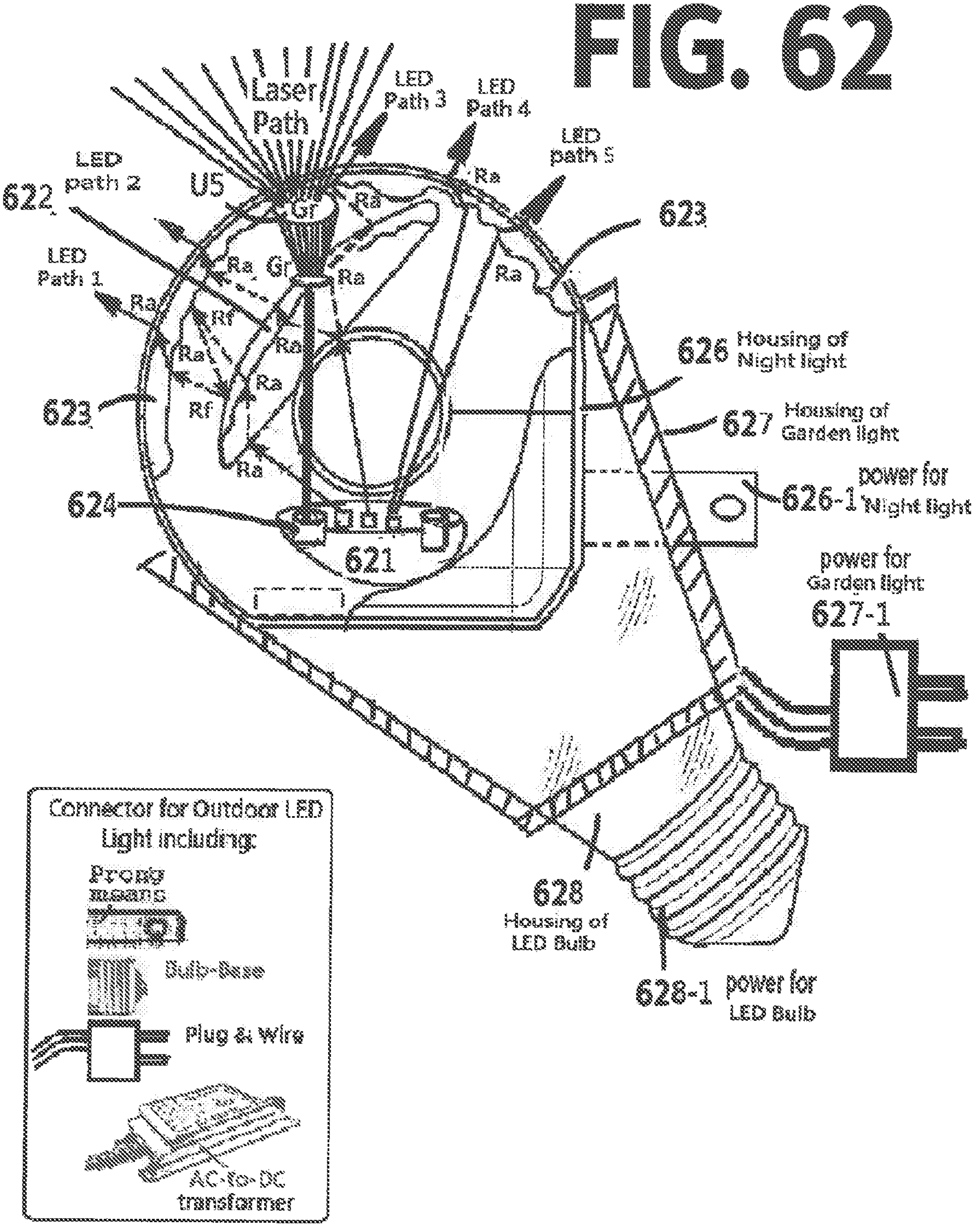

FIG. 62: Disclosure the other alternative embodiment of the said LED outdoor light application which only change the connector to AC power source and outside housing can use same 3 basic-parts of project assembly to change between (a) outdoor or garden light (b) LED bulb (c) Plug-in light by prong which is same as the co-inventor co-pending or issued patents stated as above parent filed case (#Q-2007) (#FF-2008) (#11-2009) (#TT-2010) (#QQQ-2012) (#ZZZ-2013) for several different housing to have project function to project image or-and lighted patterns FIGS. 63-64: Disclosure the some parts fit within the LED projection garden or outdoor light not only same as Fig (A) and Fig (A-1) for prism or texture lens, It also can use the variable thickness lens or-and reflective-reflector to reinforce the splendid light effects which install within the said inside of the LED projection garden or outdoor light embodiments for several different housing to project image or-and lighted patterns FIG. 65: Disclosure the one embodiment of the said LED outdoor light application of other and different housing to project image or-and lighted patterns which has other choice to get AC power source and become garden light has plug wire, or outdoor light has outside transformer, or LED bulb or Plug-in night light.

Figure 66:
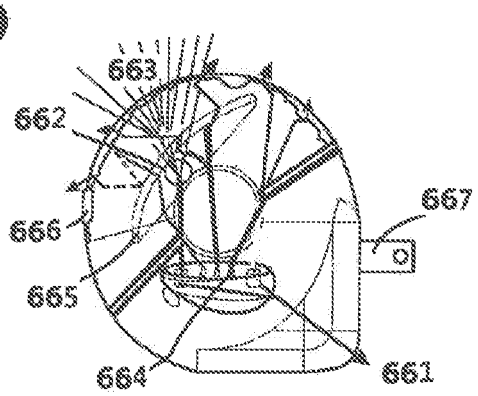
Figure 67:
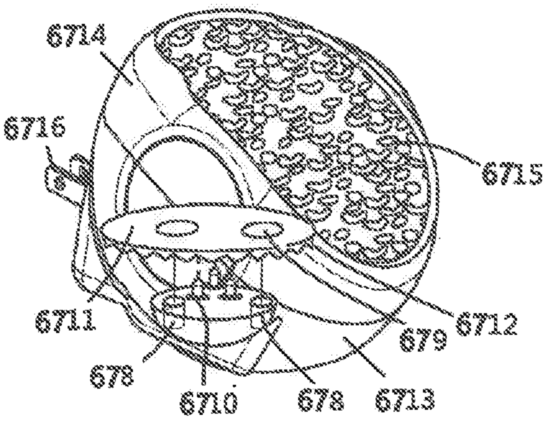
Figure 68:
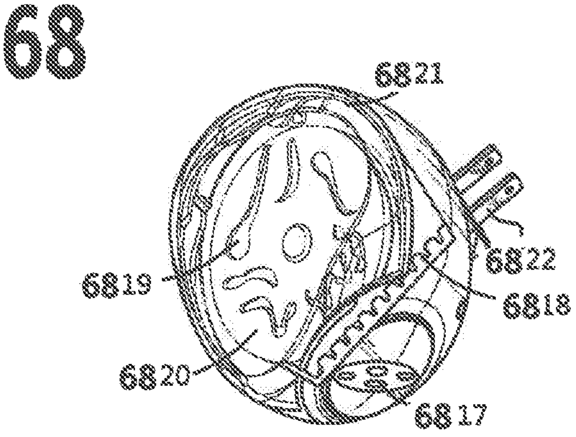

FIGS. 66-68: Disclosure the other 3 preferred embodiments which has at least 2 optic-elements which contain the optics-lens or-and optics-elements for the said LED outdoor light and while these embodiments change the prong to the plug-wire, The application can have desired different housing with preferred holder or ground stake or pole to install on ground or insert into garden areas to project image or-and lighted patterns FIGS. 69-71: Disclosure the one embodiment of the said Laser outdoor light application which may have desired different housing or-and (1) has more than one of the grating-piece which the 2$^{nd}$ grating-piece may rotate to work with 1st grating-piece, or-and (2) has the at least one of LED with preferred image-forming unit(s) so can make not only laser but also LEDs to make the variable or-and changeable image or-and lighted patterns FIG. 72: Disclosure the one of embodiment which has at least 2 optics-elements and the light beam from LED or-and Laser passing through the 1st or-and 2nd optics-elements to from the said LED outdoor light or LED bulb or plug-in night light while the AC power connector change from plug-wire to bulb-base or plug-in-prongs then become different project LED or-and Laser projection light device; each application may select the preferred or different housing to project image or-and lighted patterns FIG. 73: Disclosure the one embodiment of the said Laser outdoor light application which can be any different housing to project one color up to 3 colors Laser image or-and lighted patterns with matrix or-and array or-and contour for more than one colors created by the said Laser light source or-and LEDs which may has motion sensor, timer, remote controller or other sensor to make power on-off control the said outdoor garden light.

Figure 74:
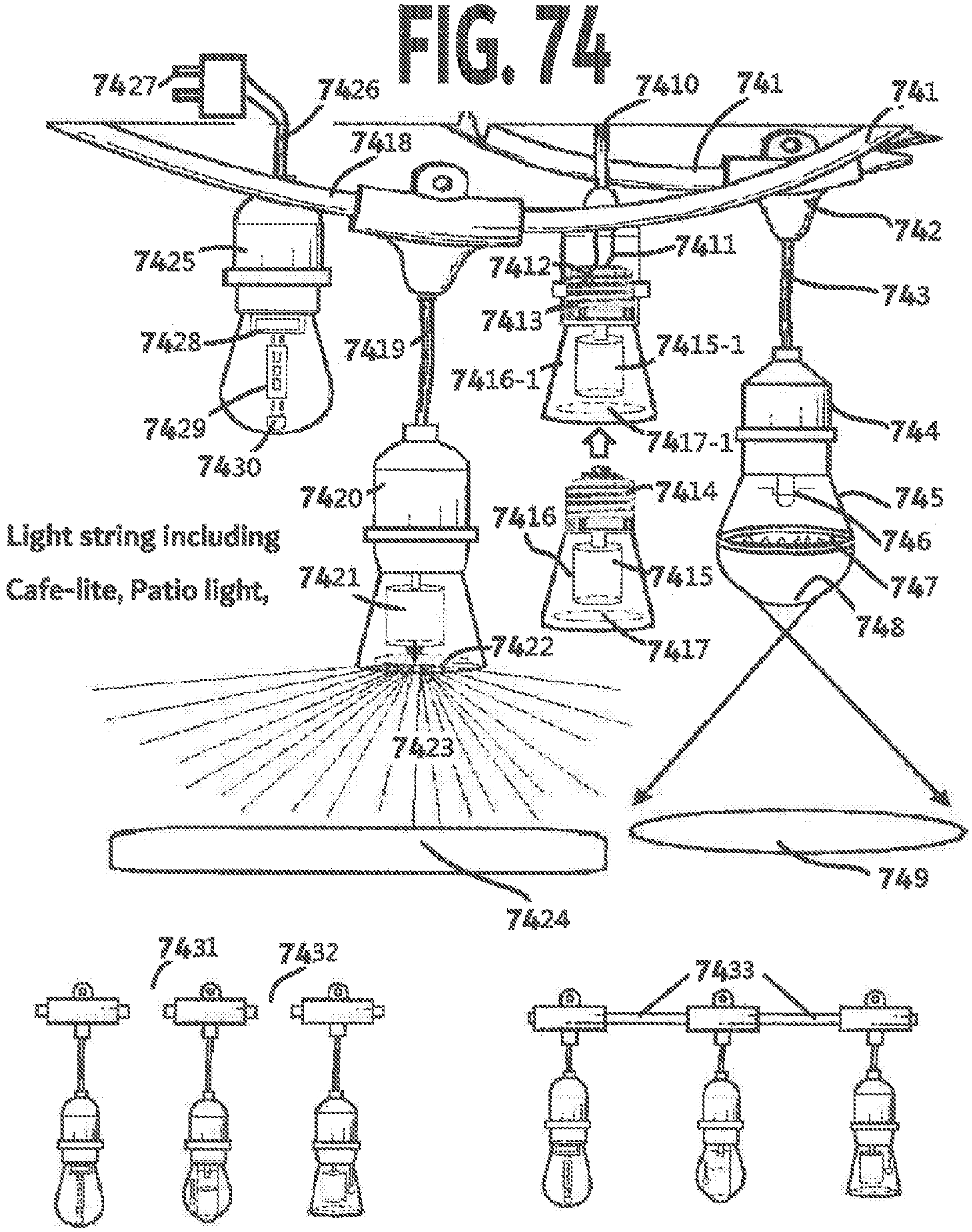

FIG. 74: Disclosure the several embodiment(s) of the said LED or-and Laser light source(s) outdoor light application(s) for several different housing has different construction to get AC power source from Plug-wire, Bulb-base, or outside transformer so can get the AC power input the said Laser outdoor light to project image or-and lighted patterns FIGS. 75-81: Disclosure the 7 different embodiments of the said LED or-and Laser light source(s) outdoor light application for several different housing and incorporate with the conductive-kits or connector(s) to AC power source and project image or-and lighted patterns FIGS. 82-88: Disclosure the 7 preferred embodiment of the said Laser or-and LED outdoor light application for several different housing and inner has (a) rotate or non-rotating optics-element(s), or-and (b) tube-divider to has different section of light unit to present Big image fixed or-and small plurality small image rotating projection, or (c) make moveable, or-and changeable image, or-and (d) has both Big fixed & Small rotating optics-element(s), or-and (e) fixed or-and rotated or more than one of grating-piece to project image or-and lighted patterns

DETAIL DESCRIPTION

The current invention has parent and co-pending file case of (#FF-series) as above discussed which shown the plurality of film or slide or image-carriers or texture lens fit into a disc or roller and optics-lens is rotating by rotating device those are show at (#FF series) text and claims which is same as co-pending case The current invention is Division or continuously filing for (#AAA-I) U.S. application Ser. No.

which is Continue in Part of (#AAA) U.S. application Ser. No. 12/984,583, Filed on Now is U.S. Pat. No. 9,157,589 which is Continue in Part of (#TT-2) U.S. application Ser. No. 14/968,250, Filed on Dec. 14, 2015 which is Continue in Part of (#TT-I) U.S. application Ser. No. 14/944,953 Filed on Nov. 18, 2015 which is Continue in Part of (#TT-12) U.S. application Ser. No. 12/866,832, Filed on Sep. 21, 2010

This is Division filing for (#II-2) U.S. application Ser. No. 13/540,689 filed on Jul. 3, 2012. Publication data US 2012-026 8668 dated on Oct. 25, 2012.

This is continue in part of (#II-1) U.S. application Ser. No. 13/534,611 filed on Jun. 27, 2012, publication data US 2012/0268947 dated on Oct. 25, 2012

This is continue in part of (#11-2009) U.S. application Ser. No. 12/624,621 filed on Nov. 24, 2009, publication data US2010/0214541 date Aug. 26, 2010

This is Division filing for (#FF-4) U.S. application Ser. No. 14/968,862, Filed on Dec. 14, 2015 which is Continue in Part of (#FF-3) U.S. application Ser. No. 14/539,267 Filed on Nov. 12, 2014 which is Continue in Part of (#FF-2) U.S. application Ser. No. 14/275,184 Filed on May 12, 2014 which is Continue in Part of (#FF-I) U.S. application Ser. No. 12/914,584 Filed on Oct. 28, 2010 now is U.S. Pat. No. 8,721,160, The current invention also is continuously-in-Part (CIP) of the co-pending family (#ZZZ-series) has parent filed on Sep. 11, 2013 which has moving device as the This filing is Division filing of (#ZZZ-4) U.S. application Ser. No. 14/296,599 Filed on Oct. 18, 2016 which is Continue In Part filing of (#ZZZ-3) U.S. application Ser. No. 14/503,647 filed on Oct. 1, 2014 now is U.S. Pat. No. 9,719,654 which is Division filing of (#ZZZ-2) U.S. application Ser. No. 14/451,822 filed on Aug. 5, 2014, which is Continue In Part filing of (#ZZZ-1) U.S. application Ser. No. 14/323,318 filed on Jul. 3, 2014 which is Continue In Part filing of (#ZZZ-13) U.S. application Ser. No. 14/023,889 filed on Sep. 11, 2013.

So combine co-pending existing drawing and parts from these 6 (#FF) (#II) (#TT) (#AAA) (#QQQ) (#ZZZ) family and each family has series filed cases which it is simple to only change (A) plurality of the (image-forming unit(s) inside rotatable disc) to (project refractive-lens in rotatable disc) instantly become the current invention, and it also can move (B) Plurality of optics-lens or-and (C) Plurality of the LED(s) or-and (D) plurality of the Image-forming unit(s) then can make a new application for outdoor lighting or seasonal garden light like the co-pending (# II) family which has (#11-2) (#11-1) (#11-2009).

However, to prevent from the argument from marketplace so make this reinforced filing case as child-filed cases as below;

From the above background and drawing discussion, all drawing discussion should also part of details description so not copy into this detail description again.

The current invention for LED or-and laser outdoor light or LED Bulb present a moving image to move certain degree-path or arc-path or desired path from the image appear location to image disappear location under predetermined path, or-and present multiple big project image on the outdoor building, wall, garage door, or floor surface.

The current invention co-pending filing cases already made a big improvement than conventional market available all kind of LED night light or-and LED bulb which not only can offer nearby areas illumination but also the remote area(s) has lighted image or image or contour to show people at dark environment.

Or, The co-inventor other earlier filed case (#QQQ-2) that not only has more than one levels, parts, accessories can change position by moveable-parts to make the LED or- and laser light or-and LED Bulb can overcome all kind of block objects or items which may cause light traveling to desired surface has trouble which caused by (a) heat created by LED(s) or its circuit, electric components (b) light beam traveling hit or has the block-item to affect or interfere light traveling (c) signal delivery has block-items to affect or interfere all kind of electric signal transmitting (d) other block-items or objects or trouble to destroy the said LED desire functions, performance, effects but also inventor's LED or- and laser light or-and LED bulb offer nearby and far away illumination or image or both, and the said LED or-and Laser light or LED bulb also can has other features including but not limited from below, it is appreciated the all listed above co-pending or earlier parent fled cases' claims and scope including the idea, concept, construction, embodiment(s), drawing, box text should be for current invention's claim, scope, coverage, also including following features;

(1) Multiple colors LED(s) which has changeable colors or-and moving the said (1-1) LED(s) or-and (1-2) image-forming unit/texture lens, or-and (1-3) refractive-or-and reflective lens or assembly.

(2) Multiple functions select from market available LED or-and Laser light effects for outdoor lighting including at least for outdoor garden light or outdoor seasonal garden or patio or light strings.

(3) Multiple controller or-and circuit or-and IC which select from market available controller, sensor, switch, wireless controller, remote controller, blue-tooth, wi-fi, internet, app software, remote, infra-red or other electric or electronic related circuit or device(s)

(4) The said LED or-and Laser outdoor light has at least one of movable device or kits or assembly including motor, movement, spin device, rotate device and related parts & accessories.

(5) The said LED or-and Laser outdoor light has geometric shape further has universal or- and interchangeable-housing to change from AC-to-DC or DC-to-AC which AC power can get be by prong or AC Plug-wire or bulb base, and the DC can get by battery or outside transformer.

(6) Changeable construction or-and shape such as extend, transforming (7) moveable device or kits or assembly parts or-and accessories may select from any group combination from bar, pole, spin, rotate, hinge, arms, joints, join, frame, or connector, sections to make the levels, parts, or accessories to be move away to desire location, positions. These are the optional features of the current invention.

The co-pending cases (#QQQ-2) teach LED Bulb has more than one level(s) and has desire level(s) can change position, location, orientation to overcome any block-item to get the desire LED Bulb functions by preferred type of moveable-device or kits or assembly. Basing on same concept, the current invention may have movable lens, or-and has movable image forming unit(s)/texture-lens/grating-piece(s), or-and movable LED or-and laser light source to make desired moving effects.

Also, the current invention and co-pending filing cases has more than one light beam emits out from LED or-and laser light source(s) which under at least one of one controller or IC or other circuit or parts & accessories for the more than one of the light effects and functions for LED or-and laser light device which may selected from (a) power failure, (b) remote control, (c) Infra-red controller, (d) bluetooth, (e) communication with mobile phone, (f) Wi-fi, (g) internet communication or application, (h) APP software control, (i) motion or moving, photo, or-and any kind of market available sensor to trigger at least one of light beam of LED(s) or-and laser light source to offer the light beam for illumination for near-by areas(s) and project by the at least one of refractive or-and reflective lens, or-and other optics-lens; The said LED or-and Laser light device of current invention has optional other front or top cover which only to protect inner parts, or-and the cover or rubber-sealing to protect inner parts and offer environment protection such as waterproof or UL-protection, so the inner LED or-and Laser light beam can pass these protective-lens or-and meet all outdoor environment requirements.

It is appreciated that the current invention also has all below (22) features as below:

1. An AC power source LED outdoor light has moving lighted image or-and patterns project-assembly, comprising:
   at least one LED,
   at least one image-forming unit(s) or-and texture-lens,
   at least one projection-lens has at least refractive function for projecting to get enlarged size of image or-and lighted-patterns show on the outdoor building or-and house or-and garage door or-and outdoor surface when LED light beams pass through the image-image forming unit(s) or-and texture-lens, and
   wherein the 3 basic parts including (1) LED, (2) image-forming unit(s) or texture-lens, (3) refractive-lens of the said project-assembly that fit-in or built-in within LED outdoor light device,
   said frame, support, housing, or parts arranged or-and installed or built-in within a plug-in outlet LED light or LED bulb with AC bulb-base or AC plug-wire LED outdoor light; and
   at least one moving device for causing the projected enlarged image or-and lighted patterns to move or change, and the at least one moving device or design for the said LED outdoor light device including at least one of:

(a) a controller or-and IC or-and other circuitry for turning at least one or plurality of LED on and off at desired time, cycle, period to cause the apparent moving or motion or changing of the projected image, (b) a motor or time movement or rotating-set for causing movement of the (i) one or plurality of image-forming unit(s) or-and texture-lens; or-and (ii) the one or plurality of refractive or- and reflective lens or optics-lens; or-and (iii) LED or LED(s); to cause the apparent moving or motion or changing of the projected enlarged image or lighted-patterns, and (c) a magnetic-unit and magnetic coil set for causing the movement of the (i) at least one image-forming unit or texture-lens(s); or-and (ii) the at least one projection-lens; or-and (iii) LED or LEDs; to cause the apparent moving or motion or changing of the projected enlarged image or-and lighted-patterns.

2 An AC power source LED outdoor light has moving lighted image or-and patterns project-assembly, wherein the image forming unit(s) is one of printed window, film, slide, texture-lens, treatments on lens, variable thickness lens, piece has marking, piece has opening(s), piece has cut-out, stencil, or displayer that forms a relatively lighted small image as light beams emit from LED pass through the image forming unit(s); and the relatively lighted small image being enlarged and projected by the at least one of fixed or moving refractive-lens.

3. An AC power source LED outdoor light has moving lighted image or-and patterns project-assembly, wherein the moving projection-assembly including (1) LED(s) and (2) image-forming unit or-and texture-lens (3) refractive-lens or-and top protective-lens 3 basic parts is arranged to fit Within or built-in an AC power source LED outdoor light, or LED Seasonal light device, or LED Halloween light device, or LED Christmas light device, for indoor or-and outdoor use.

4. An AC power source LED outdoor light has moving lighted image or-and patterns project-assembly, wherein the moving projection-image assembly is arranged to fit within or built-in an LED bulb.

5. An AC power source LED light has moving image or-and patterns project-assembly, wherein the motor is coupled to a gear set to reduce a high motor speed to a relatively desired speed for rotating the at least one or any combination of (1) LED(s), or-and (2) image-forming unit or texture-lens, or-and (3) refractive-lens or-and top-lens, or-and (4) whole project assembly including LED and image-forming-unit and project-lens.

6. An AC power source LED outdoor light has moving lighted image or-and patterns project-assembly, wherein the at least one refractive-lens is plurality of refractive-lens assembled into a frame, disc, holder which rotated by the motor or movement under a predetermined speed.

7. An AC power source LED outdoor light has moving lighted image or-and patterns project-assembly, wherein the at least one LED includes a plurality of LEDs or at least one LED arranged to emit a preferred one color or 2 colors or plurality of colors or more than one color.

8. An AC power source LED outdoor light has moving lighted image or-and patterns project-assembly, wherein the at least one refractive-lens or top protective-lens is a single piece lens mounted in a frame, holder, or disc.

9. An AC power source LED outdoor light has moving lighted image or-and patterns project-assembly, wherein the at least one projection-lens is refractive-lens or top protective-lens includes one piece or a plurality of projection-lenses having different or same optical properties with others refractive-lens or top protective-lens.

10. A plug-in night light or LED bulb has moving lighted image or-and patterns projection-assembly, wherein said moving device causes said at least one (1) projection-lens or top protective-lens, or-and (2) image-forming unit or texture-lens, or-and (3) LED(s) to undergo or operate at least one of the following motions: rotation, spinning, vibrating, shaking, waving.

11. An AC power source LED outdoor seasonal light has moving lighted image or-and patterns project-assembly, wherein said controller or-and IC or-and other circuitry creates said apparent motion or changing of the projected lighted image or-and patterns by causing the plurality of LEDs to sequentially flash, fade-in and fade-out, change colors, randomly turn on and off, or exhibit other LED light performances, effects, duration, or duty cycles.

12. An AC power source LED outdoor seasonal light has moving lighted image or-and patterns project-assembly, further comprising another texture-lens or treated-lens or top-protective-lens having a areas or sections or parts or surface has texture or printing or marking or other market available treatment(s).

an AC power source LED outdoor seasonal light has moving image or-and patterns project-assembly, wherein said projection-assembly includes a tube or tube assembly or housing or body having different diameters including center big diameter one to create big steady lighted image or patterns, and big diameter one has surrounding plurality of moving refractive-lens in a disc to create the plurality of moving lighted image or patterns.

13. An AC power source LED outdoor seasonal light has moving lighted image or-and patterns project-assembly, wherein the projected image is one of or combination or more than one of (1) cartoon character, (2) time, (3) geometrically shaped image, (4) logo, (5) word, (6) artwork, (7) seasonal sign, (8) seasonal related marking, (9) seasonal sign, (10) seasonal arts, or (11) visible image, or-and (12) lighted patterns or arts.

14. An AC power source LED outdoor seasonal light has moving lighted image or-and patterns project-assembly, wherein the plurality of refractive-lens(s) included install in a roller or disc or holder which rotate to make the projected enlarged lighted image or-and patterns to move along an pre-determined path, or arc path, or one side to other side, or from one location of a circle to the another location of circle.

15. An AC power source LED outdoor light has moving lighted image or-and patterns project-assembly, wherein the image-forming unit(s) is a fixed or- and rotating and the image-forming units is a piece has (i) shaped openings, cutouts, or (ii) printed windows or textured lens or marked lens, or treated lens, or (iii) the projection-lens assembly includes plurality of refractive-lenses in a disc or holder.

16. An AC power source LED outdoor seasonal light lighted moving image or-and patterns project-assembly, wherein said light beams from the LEDs are pass through a first optic-lens having (1-a) a textured surface or (1-b) refractive or-and reflective surface, and has at least one of second optics-lens having a (i) dome or sphere shape has refractive or- and reflective properties, or (ii) at least half ball or more than ½ ball or ⅔ ball, or whole shape has refractive or-and reflective properties, or (iii) flat or geometric or sphere shape of non-optics property protective-lens to protect inner parts and only offer protection purpose; to refract or-and transmit light beams that have been traveled or-and dispersed by the said first optics-lens which has one or combination of the treatments on parts, areas, sections, surface including (i) textured or marking, or (ii) art-added, or (iii) treated, or (iv) printed, or (v) stenciled, or (vi) having image, or (vii) having variable thickness.

17. An AC power source LED outdoor seasonal light has lighted moving image or-and patterns project-assembly, wherein the at least one fixed or moving image-forming unit(s) is a plurality of printed windows, cutouts, textures, marking, printing, variable thickness, stencils, films, or slides, and has the at least one top or front projection-lens or protective-cover or protective-lens which is a relatively large size to cover the inner parts.

18. An AC power source LED outdoor seasonal light has lighted moving image or-and patterns project-assembly, further comprising an outer or top or front projection-lens or protective-cover which having a round, semi-spherical, or spherical shape, or flat shape; to further (1) enlarge the projected image or-and (2) just protect the inner parts.

19. An AC power source LED light outdoor seasonal has lighted moving image or-and patterns project-assembly, further comprising an additional optic-lens situated in front of the at least one LED for widening a narrow light beam emitted out from the at least one LED before it passes through the at least one image-forming unit(s) or texture-lens.

20. An LED outdoor or garden light for projecting moving lighted image or-and lighted pattern(s), comprising:

at least one LED, at least one image-forming unit(s) or texture-lens, at least one projection-lens has at least refractive or-and reflective function for enlarge and projecting an image when light beams emit from LED pass through the said image-forming unit(s) or texture-lens, and the at least one projection-lens has at least refractive or-and reflective optics-function to increase size or-and angle of tiny size of lighted image or-and patterns after LED light beam travel through, and project-lens to projects an enlarged lighted image or-and lighted-patterns to a surface located on outdoor including building, house, garden, garage door, floor, ground where located at least feet away from LED light; and The LED light has AC plug-wire and circuitry for connecting with the AC power source; and At least one moving device for causing the projected enlarged lighted image or-and lighted-pattern for apparent moving or changing, wherein, the at least one moving device including (1) motor, or (2) time movement, or (3) magnet-unit and coil set; for causing movement or rotating or waving or vibration of the one or desired combination of 3 basic project-assembly parts which may selected from (i) LED(s), or (ii) image-forming unit(s) or texture-lens, or (iii) (a) refractive-lens, or (b) refractive or-and reflective lens, or-and (c) protective-cover, protective light transmitting piece.

21. An LED bulb for projecting moving lighted image or-and patterns, comprising:

at least one LED, at least one image-forming unit(s) or-and texture-lens, at least one projection-lens has at least refractive or-and reflective optics function for projecting an image or lighted-pattern(s) when light beams emit from the at least one LED pass through the image-forming unit(s) or-and texture-lens, and the at least one projection-lens has at least refractive or-and reflective optics function to increase tiny size of lighted image or pattern that created after LED light beam emit through the said of the image-forming-unit or- and texture-lens, and project to outdoor building or house or garage or wall or floor or ground surface where location feet away from LED bulb;

The LED bulb has a bulb base including contacts or-and IC or-and circuitry for connecting to AC power source; and at least one moving device for causing the enlarged projected lighted image or-and lighted patterns to appear to move or changing, and The at least one moving device including a motor, time movement, or magnet and coil set for causing movement of the at least one or desired combination 3 basic project-assembly parts including (i) LED(s), or (ii) image-forming unit(s) or-and texture-lens, or (iii) refractive or-and reflective lens or cover; thereby cause the apparent motion or moving or change or shaking or waving the projected lighted image or lighted-pattern(s).

From above listed (22) details description for the current invention features for the 3 basic project-assembly parts for LED outdoor or LED outdoor seasonal light or LED bulb which is the most simple construction than ever and can project a nice and clear moving or changeable lighted image or-and lighted-pattern for big size and visible for people and shown on house, building, fence, walls for outdoor use or even can apply to indoor while use the different conductive-system which may selected from the (1) prongs or (2) AC plug-wire, or (3) outside unit AC-to-DC transformer, or (4) built-in AC-to-DC circuitry, (5) DC power bank, or (6) DC power storage batteries and rechargeable from solar power. Or the power system can be any type available from marketplace. However, the current invention mainly to cover the AC powered outdoor garden light, outdoor seasonal light, outdoor patio light, outdoor seasonal light string from these group different applications which there is no any prior art except the co-pending (#TT-Family) and co-inventor (#II-2) (#II-1) (#II-2009) filed for outdoor garden light, outdoor seasonal lighting including the light string, patio light, cafe light for light string has the movable lighted image or-and light patterns. Such as FIG. 85 has inner fixed big image projection and has plurality of small moving image or-and lighted patterns which same as the FIG. 40 show the (4113) for center Big fixed or steady big image projection and surround the plurality of (413a) refractive-lens fit into rotate disc with light block-out tubes for different diameter to form the clear without light beam interference as the co-pending filed case (#QQQ-2) to overcome the block-items which will interfere the light beam traveling.

The current project-assembly has 3 basic parts to make it simple and low cost while the project assembly put into different housing such as FIG. 62 show out can be an outdoor light or a LED bulb or a night light) with desired connector system can be any application projection light for different purpose which maybe below applications while the 3 basic parts of project-assembly built-into or fit into all kind of housing design with different construction which is so simple just move the current invention discussed the 3 basic parts into, then can come out many different LED or-and laser light has project moving or-and fixed lighted image or lighted-pattern and these combination may come out different LED or-and LASER light device at least can be below products;

a. LED Outdoor Garden projection light same as (#1I-2) (#II-1) (#II-2009)

b. LED Outdoor & indoor seasonal project light same as (#II-2) (#II-1) (#II-2009)

c. LED Outdoor & indoor Halloween or-and Christmas outdoor light d. LED Indoor project light. (co-pending #FF-family, #TT-family)

e. LED Project flashlight. (co-pending #DD-Division)

f. LED project LED Bulb. (co-pending #MMM-family, and #QQQ family)

g. LED security light (co-pending #KKK-family, #JJJ-family, #III-family)

h. LED patio light (co-pending #XX-family including #XX-2, #XX-I)

i. LED Seasonal light string. (co-pending #XX-family including #XX-2, #XX-I)

J. LED Cafe light set (co-pending #XX-family including #XX-2, #XX-I)

k. LED or Laser project light while add extra Laser Light source

L. LED project ball

M. LED party light

All above listed (A) to (M) application which apply the 3 major parts of the project-assembly with different installation or arrangement or housing with related parts as above listed the co-inventor's variety of the co-filed or-and co-pending or-and parent filed cases. It is appreciated these co-pending, parent filed cases listed above has the same or alternative or equal functions to apply the basic 3 parts of current invention of project-assembly should be fall within the current invention and its parent filed cases' claims or-and coverage or- and scope without any argument. All alternative or replaceable or equal function such as to add the extra parts, or extra lens, or extra accessories for all different housing or shape to form other product which has basic 3 major parts of current invention for LED light with moving, movement, spin, rotating to make the said project lens or-and image-forming-unit/image-carrier or-and LED(s) to move or to change position or location or orientation should still fall within the current invention scope or claims without argument especially the current invention scope and claims aim only for outdoor lighting or garden lighting only not related the plug-in night light.

Figure 1:
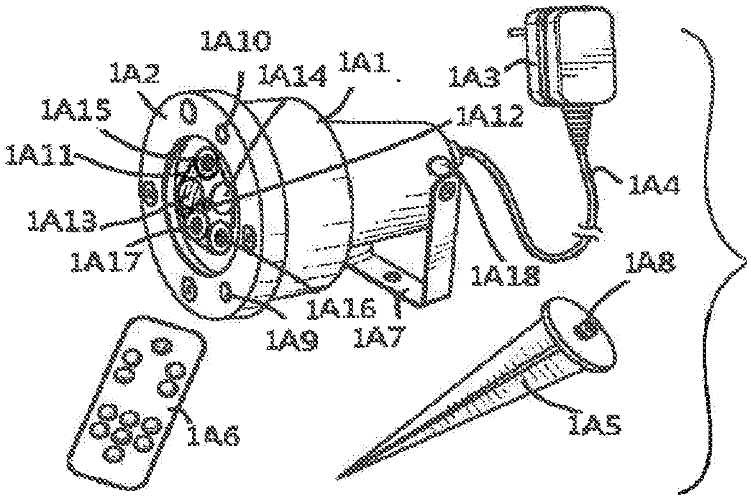
FIGS. 1-5: Disclosure the 1st embodiment of the said LED outdoor light application for 5 preferred for Laser or-and LED outdoor lighting with different housing to project image or-and lighted patterns

The current invention has very details notes on each parent filed drawing so here do not discuss details, please refer to attached current invention with update the parent or co-pending case filed drawing with brief description below:

From FIG. 1 disclosure the one of preferred embodiment of LED or-and laser outdoor or garden or outdoor seasonal light (1A1) has the AC plug-wire or outside transformer (1A3) with wire (1A4) to connect with AC power source.

The outdoor light (1A1) has ground stake or pole or bar (1A5) with top connector or screw (1A8) to fasten with the light bracket hole (1A7) so can install on the flat surface by the bracket or install with the ground stake (1A5) to insert into grass ground or mud of outdoor. The said bracket has fastened units to allow the project direction can be adjustable to desired location such as building, housing, walls, floor, garage door for outdoor areas surface to show the lighted image or-and patterns.

The outdoor garden or seasonal light (1A1) has the front cover (1A2) has the flat protective-lens which do not have any optics refractive or-and reflective optics properties to protect the inner fixed or rotating one or plurality of the grating-piece (1A13). The rotatable disc or holder or compartment (1A11) can install plurality of the grating-piece or hologram-piece (1A14) in front of the said lower laser light source (1A15) (1A16) (1A17) which maybe red or-and green or-and blue or-and other combination colors. The laser light source (1A15) (1A16) (1A17) emit the laser light beam to the front grating-piece (1A13) to split the laser light beam into plurality of the lighted patterns in array/matrix/dot matrix/contour shape for desired colors and size.

The light outdoor light (1A1) is a laser project light device which can be control by the desired sensor (1A9) which maybe the motion-sensor or photo-sensor or pair of moving detectors or other market available sensor type to turn on and turn off the said laser outdoor project light under pre-determined functions, light performance. It also can control by wireless controller (1A6) which may selected from IR or RF or Wi-fi or internet system or Remote controller which can control the (1) turn on and turn off, (2) colors selection, (3) Brightness or-and dimmer, (4) mixed color or freeze color, (5) rotating or non-rotating, (6) image or-and patterns selection so it become very good application while use wireless controller (1A6). The grating-piece (1A13) or hologram piece (1A14) can be a film or injected piece and install on the disc or holder or carrier (1A11) and rotated by the inner or lower motor, movement, rotating device to make the grating-piece change one by one as many as market required to get the desired lighted image or-and patterns. It is appreciated the said Laser project light (1A1) also can incorporate with the one or plurality of LED light source as the FIGS. 83, 86, 87 and FIGS. 66, 67, 68, FIG. 62, FIGS. 69,70,71, 72 so can created more exciting and eye-catching LED or-and Laser Project lighted-image or-and lighted patterns which including the (1) colorful image or-and (2) contour of laser image or-and (3) laser array or matrix or dot-matrix (4) other geometric shape or art lighted image or-and patterns.

Figure 2:
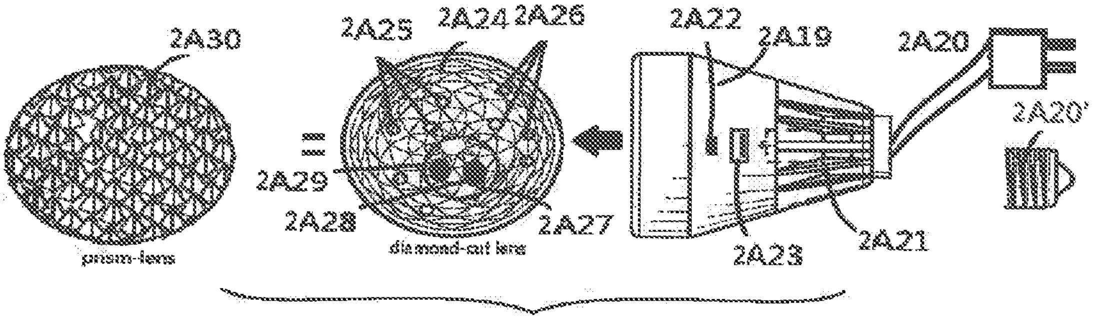

From FIG. 2 show the side view of the one of embodiment of LED and laser outdoor project light device which has the housing (2A19) and inner construction to install the optics-lens (2A24) (2A30) which has refractive or-and reflective or-and diffusing optics properties or any combination for market available optics-lens those to make the inner LED(s) (2A25) (2A26) to passing through so can get desired light effects. The said optics-lens (2A24) (2A26) has window (2A29) and the window area (2A27) has no any optics-properties to allow the inner Laser light-source (2A 28) (2A 29) laser light-beam can pass through front fixed or rotating one or plurality of grating-piece (not shown) to form the desired laser image or-and lighted patterns to emit out through the protective-window (2A27) to building or house or wall or outdoor surface.

Figure 3:
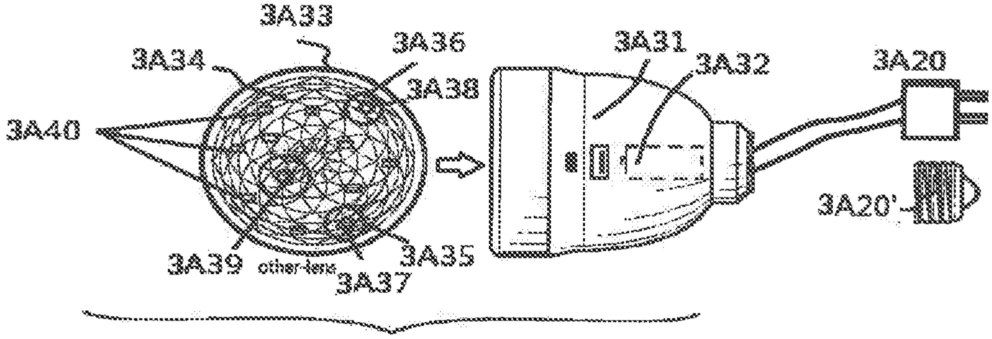

From FIG. 3 the optics-lens (3A30) has plurality of the prism-shape tiny optics-lens for form a round piece of the optics-lens (A3) which make the inner light-beam to be pass through under number of reflection or-and refraction to make the pre-determined enlarge and wide spread out to outside of the said optics-lens (A30). If need to get more splendid light effects can add at least one 2nd or more added optics-lens in-front of the said 1st optics-lens with preferred distance arrangement to make the LED light beam to get more splendid effects. To get more exciting LED light effect can make the at least 1st or 2nd optics-lens to move or rotating or spin to make moving effects. It is appreciated this arrangement for LED light device has the 1st and 2nd or more than one of optics-lens is same of the Co-pending (#ZZZ-family) and identically with the (#ZZZ-3) U.S. application Ser. No. 14/503,647 filed on Sep. 11, 2013 now is U.S. Pat. No. 9,719,654 which has very clear to cover all LED light device on whole text and claim only limited for the (outdoor lighting). Same as the current invention scope and claims and same as the co-pending (#ZZZ-4) and (#QQQ-5) (#QQQ-6) (#QQQ-7) (#FF-3, 4, 5) (#QQQ-3-2), The current invention just make more clear drawing and detail text to show out AC plug-wire and outdoor lighting housing designs and light traveling through the different and many choice of optics-lens.

From FIG. 2 show the other optics-lens (2A24) which is sphere or ½ ball or ⅔ ball or dome shape which has plurality of diamond-cut surface which came out a plurality of the tiny convex-lens and every tiny convex-lens has outside arc-shape and inside surface is flat so allow the light beam to emit into has multiple times of reflection or-and refraction to spread out the LED light beams. This is same as co-pending (#ZZZ-2013) (#ZZZ-1) (#ZZZ-3) (#ZZZ-4) (#FF-2008 family) and can see details drawing for LED light pass through the said optics-lens (2A24) as FIGS. 49, 50, 51 of. This kind of diamond cut optic-lens can be for outside cover or 2nd or 3$^{rd}$ optics-lens for LED light source which also same as the (#ZZZ-3) U.S. application Ser. No. 14/503,647 filed on Sep. 11, 2013 now is U.S. Pat. No. 9,719,654 can apply for the LED outdoor or LED garden or LED seasonal light application. The co-inventor apply this diamond-cut as rotating top cover in co-pending filed (#ZZZ-1) and (#ZZZ-2) (#ZZZ-2013) and apply this diamond-cut for 2nd optics-lens or top cover which can be rotating or non-rotating to incorporate with 1st optics lens which preferred is prism design as optics-lens (2A30) for (#ZZZ-3) application because the (A24) design is very good optics-lens.

From FIG. 3 show the similar concept and construction with FIG. 2, the difference at the LED on this preferred embodiment is Chip LED or Dice-LED in single piece(s) or combined into chip-on-board (COB) types and each of the LED on this embodiment is rectangular shape unit. Not round DIP LEDs.

Figure 4:
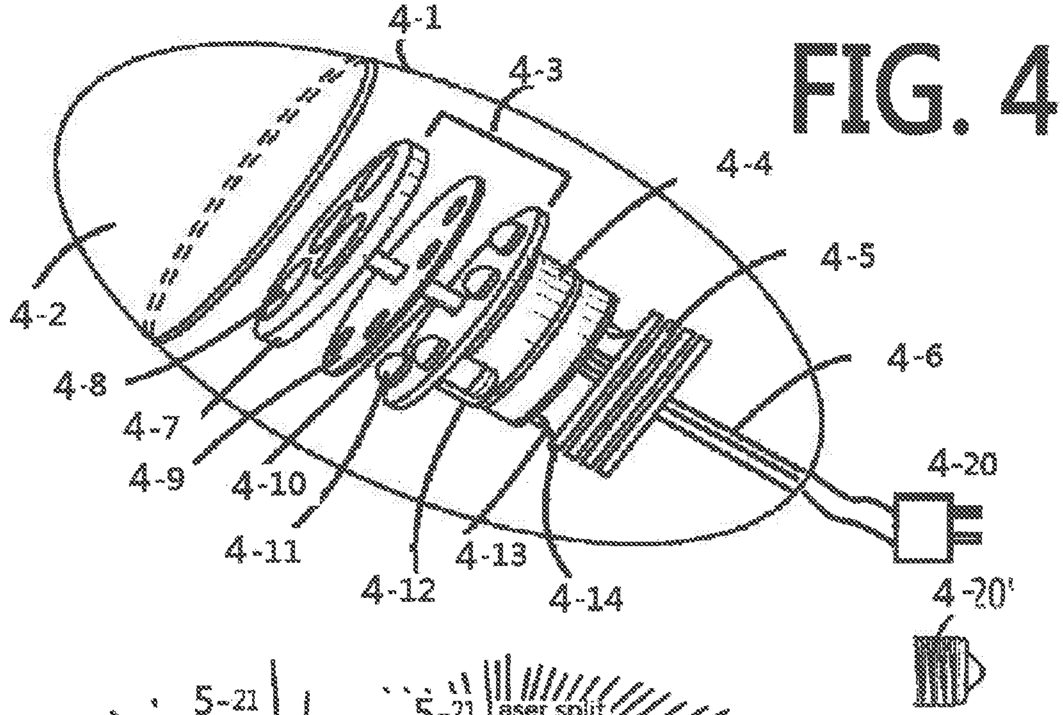

From FIG. 4 show the other embodiment for LED or-and Laser outdoor project light device ((4-1) which has the football shape and has one end ((4-2) is detachable parts for value appearance purpose only. The said 3 basic parts for project-assembly (3) (4-3) is built-in or fit into the light (-1) (4-1) and the light has the motor or movement (-4) (4-4) with optional heat-sink (-5) (4-5) to make heat ventilation out while the LED(s) use a high-power or high-wattage type which will created and accumulate very high temperature so need some ventilation holes or gate or door (not shown) and heat-sink, even need fan (not shown) to make cool down the temperatures created by high-power or high-wattage LED(s).

From FIG. 4 the Football shape LED or-and Laser outdoor project light has the project assembly (4-3) which has 3 basic parts including LED(s) (4-11) and Image-forming unit or texture-lens (4-9) and top refractive-lens (4-8) so the LED light-beam travel through the image-forming unit or-and texture-lens (4-9) to emit into the top reflective-or-and-reflective lens (4-8) to make wider spread out and enlarge lighted image or-and patterns out of the light ((4-1). The said LED(s) (4-11) is install on the base or holder which has center axis (4-10) extend from the lower motor (4-4). The Axis (4-10) can make the desired base of the LED(s), or-and Image-forming unit (4-9), or-and top refractive or-and reflective lens (4-8) to rotating so this will come out many combination to make one or two or three basic parts to rotating so can come out many different light effects. The calculation will be same as the FIGS. 55, 56, 57 show (3 type of the top cover or 2$^{nd}$ optics-lens)×(4 type of image-forming units or-and texture-lens)×(3 type of LED(s) for number and color) so can get (3×4×3=36 different combination). This is for example. This is not really number for each of 3 basic-parts for different design, so the possibility for different combination number maybe up to hundreds of the assortments or combinations can created by the different design for each of 3 basic-parts. This also is not same as other US prior arts scope and concepts.

From FIG. 4 the refractive or-and reflective optics-lens (4-8) has plurality of piece fit into the movable or rotatable disc (4-7) or holder or compartment which install with the axis (4-10) to rotate by motor-assembly (4-4). The said image-forming unit or-and texture-lens can be a one piece has (a) shape openings, cutouts, stencils or (b) printing, window, texture, marking, or (c) film, slid, full color arts, or (d) texture lens; which can form the image, patterns while light passing through.

From FIG. 4 the LED can be I color or 2 color or more than 2 colors with desired light turn-on and turn-off (d1) timing (d2) cycle (d3) duration (d4) sequential (d5) light show (d6) period time (d7) frequency; those can make a variety choice or light performance to create desired or pre-determined functions, light effects.

From FIG. 4 the LED or-and laser outdoor project light has the wire (4-6) and plug (4-20) to connect with AC power source. It also can use alternative connectors such as bulb-base, prong, outside circuit to connect with AC power source. Furthermore, while use the different connector (4-20) also can make some design or housing changed to let people know this is the certain application from outside housing shape such as Bulb has limited housing, garden light has traditional cone or cylinder or speaker or pagoda or coach shape, the night light has small unit however to apply the different housing shape or design or construction as long as the outdoor lighting as the 3 basic-parts of project assembly should still fall within the current invention scope and claims including above listed all the co-pending filed case idea, concept, features, function, construction, arrangement.

Figure 5:
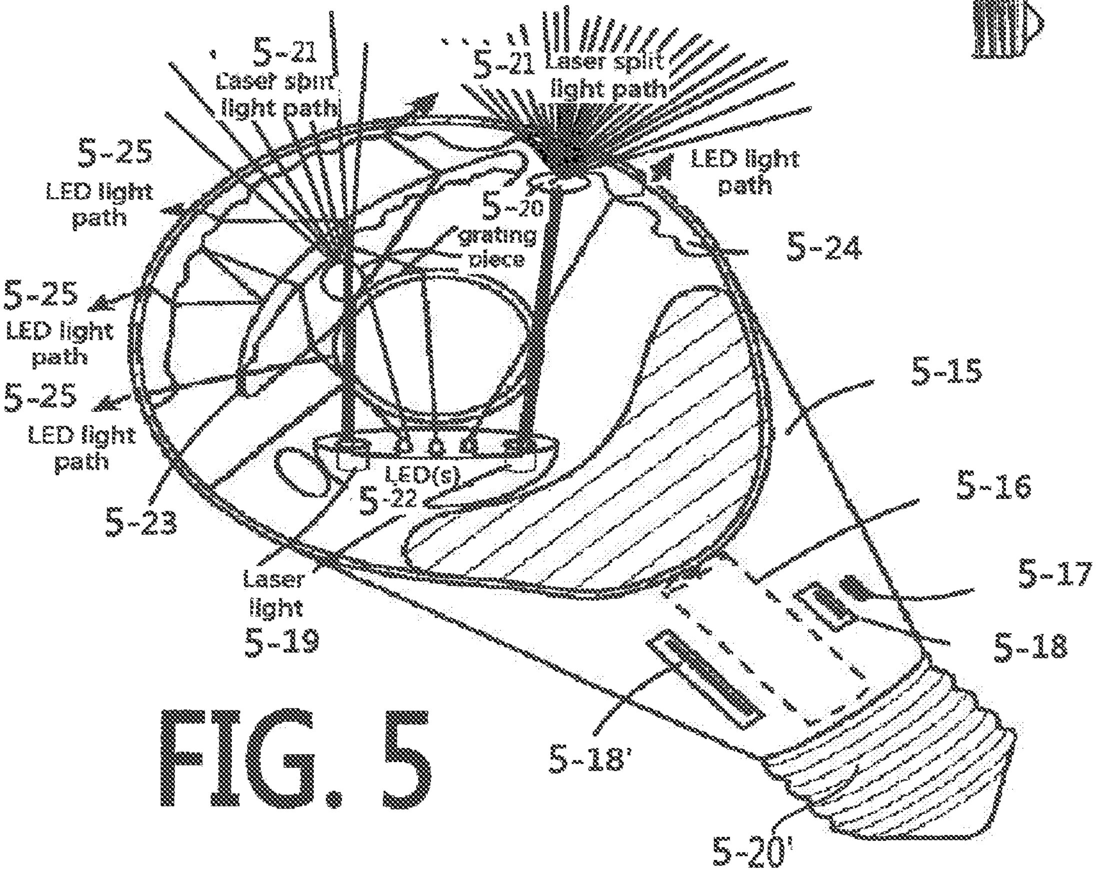
Figure 10:
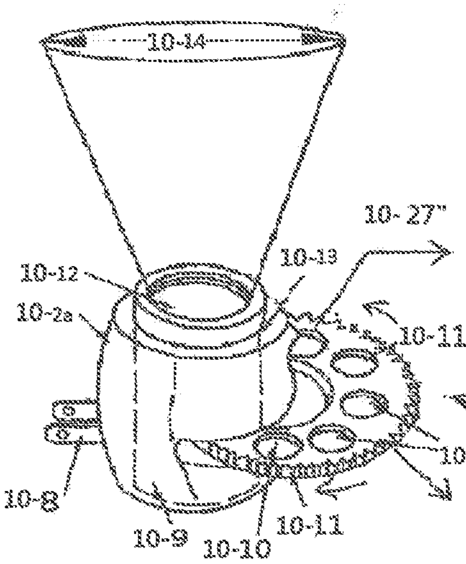
Figure 11:
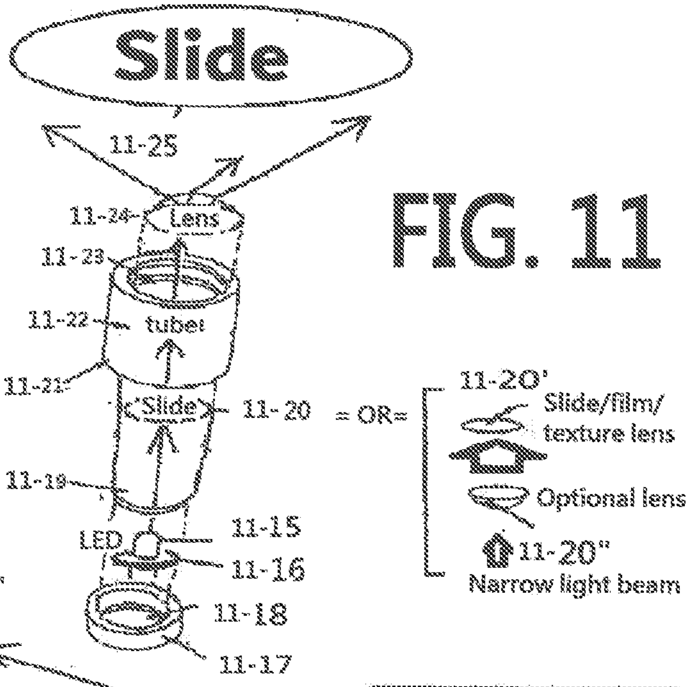
Figure 12:
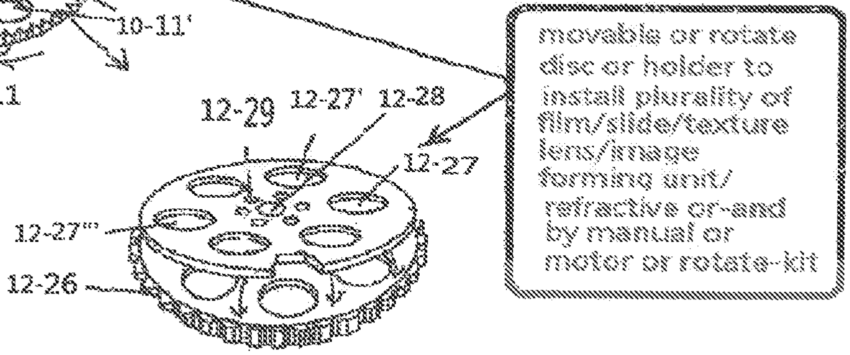

From FIG. 5 show the other embodiment of the LED or-and laser outdoor project light (5-15) which has the shape similar with Bulb which can install on the ground stack or bracket or bar (1A5) with some modification construction and install the Bulb like outdoor lighting to ground stake or bracket (1A7) by conventional assembly skill. The alternatively, The bulb-shape outdoor light also can have male bulb-base to fit into the garden or outdoor light housing which has the female bulb-base receiving-socket inside so can simple twist the male-bulb-base into female-bulb socket so can offer the same function with above discussed outdoor lighting including drawing for FIGS. 1, 2, 3.

From FIG. 5 has both LED light source (5-22) and Laser light source (5-19). The Laser light source (5-19) emit one or more color Laser light-beam to the $I_{st}$ grating-piece (5-20) to split the original high-wattage laser light-beam into plurality low-wattage laser light-beams (5-21) spread out to big areas to be seen. The grating-piece (5-21) can be one piece or more than one piece, so can make more complicated arts or geometric lighted patterns or-and lighted image. The light (5-15) also has LED light source (5-22) some light emit through the pt optics-lens (5-23) which at least refractive or-and reflective lens so can see the Light beam from LED(s) (5-22) been reflected or-and refracted for many times while LED light beam travel through the 1st optics-lens (5-23) or even some light beam further travel through the 2nd optics-lens (5-24) so can created the light path like (5-25) which spread out to wider angle as drawing many different location of outside sphere or ball cover has spread out LED light beam path (5-25) located on 8/9/10 clock position. Not only the 8/9/10 location can have the LED spread light beam but all other 6/7/11/12 also has all LED spread light because the drawing space limitation so the LED spread light path (5-25) do not show on the clock position 6/7/11/12 and even the inner side of the Bulb-shape outdoor lighting unit.

From the FIG. 5 also can see the bulb-shape outdoor light has non-optics properties window on its top cover to get inner Laser LED light beam passing through to create plurality of low-wattage laser light beam see on FIG. 5 however basing on drawing space limitation the plurality of laser light beam should cover all clock location at least can see the lighted laser image or pattern on the clock position of 10/11/12/1.

From FIG. 5 the LED or-and laser outdoor light may have optional built-in (1) USB port (5-18) to get power from outside power source, or-and (2) USB ports (5-18') for charging other device, or-and (3) AUX plug (5-17) is Auxiliary function to connect with music device, or-and (4) rechargeable battery (5-16) for power fail or back battery purpose, or-and (5) switch or sensor or moving detectors, or-and (6) wireless controller receiver; so can make the bulb-shape outdoor light to use for outdoor with most completely functions for outdoor illumination, project image or patterns, power fail light, USB charger, USB Power back, wireless device These are some added functions for bulb-shape outdoor light but not limited for listed (1) to (6) function. It should cover all possibility function which not shown here.

From FIGS. 6, 7, 8 show the current invention discussed the refractive optic-lens properties and its theory. This show the basic physics theory to prevent from people mis-leading by wording.

From FIG. 9 is copy of the co-pending parent case US Publication No. 2016/0097409 which pub. Date on Apr. 7, 2016 which has all "Related U. S. Application data" to offer evidence that the (#FF-4) is CIP of (#FF-3) is CIP of (#FF-2) is CIP of (#FF-2008) which is Division of the (#Q-2007). Also, from drawing can see the co-pending parent filed case (#FF-2008) co-inventor show the movable or rotating disc has install plurality of the said image forming units. This is the first filed case for movable and rotatable disc to load optics-elements.

From FIGS. 10, 11, 12, 13, 14, 15, 16, 17, 18 is copy of the US public data for co-pending (#TT-2010) US 2011/000-7496 pub. Date Jan. 13, 2011. Same drawing also shows on PARENT (#FF-2008) Filing US Public No. 2009/028-4960 pub. Date Nov. 19, 2009. The drawing shows out the Movable or rotatable disc or holder to install plurality of the optics-elements. The FIG. 17 and FIG. 18 show the claim parts has "has rotating-means to rotate the optics-element" so these 4 evidence as the above discussed co-inventor had parent filed case (#FF-Family) already show (1) movable or rotatable disc to install plurality of optic-element (2) optics-lens rotate by the rotate-means since 2008. The same claim show on the (#FF-I) issued patent U.S. Pat. No. 8,721,160. From FIG. 19*s* how the (#Q-20007) which has the 1st optics means and 2nd optics-means to make wider view angle illumination inside abstract and the text which is parent filed of co-pending (#FF-2) (#FF-3) (#FF-4) (#FF-5) and its child filed case (#TT-2010) (#TT-I) which is parent filed case of the said (#ZZZ-family) and (#QQQ family).

From FIG. 17 and FIG. 18 disclosure the co-pending parent filed case (#FF-5, #FF-4, #FF-3) one of public and patented copy which show (a) Moveable disc can rotate by motor or spin device (2) disc to install plurality of image forming unit (3) the device has rotate device to rotate the optics-lens inside the Claim of (#FF-family) issued patent.

From FIG. 19 disclosure the parent filed case (#Q-2007) which for "LED light has more than one optics-piece" of the co-pending (#FF-5) (#FF-4) (#FF-3) and issued patent (#FF-2) and US issued U.S. Pat. No. 8,721,160 (A) claim 2 line 4 "rotating means to rotate optic-means" and (B) claim 7 line 22 to line 26 "mean for adjust said optics-means, said . . . .

Rotating means for rotating optic-means". To show rotating optics-lens is on the PARENT patented case on May 13, 2014 which filed on Oct. 28, 2010 parent filed on Dec. 30, 2008 U.S. application Ser. No. 12/318,470.

From FIGS. 20, 21, 22, 23, 24, 25, 26, 27, 28, 29, 30, 31, 32 these 5 pages total 13 Figures copy of the US patent document show the same drawing for co-pending (#TT) (#TT-I) which are the parent of the Co-pending (#ZZZ-family) and (#QQQ-family). From FIG. 20 and FIG. 21 and FIG. 22 disclosure the Co-pending parent (#TT) of current filing and (#TT-family) is the Child Filing for (#II-2009) (#M) (#I I-2). The (#II-family) has clear said the 3 basic-parts (LED+image forming unit/texture lens)+refractive lens) to fit into MAIN HOUSING to form the Main-products including outdoor lighting, garden light, seasonal lighting as U.S. Pat. No. 8,511,877 Claim on Column line 18 to line 20 "Seasonal garden light, seasonal outdoor light, lighting fixture". It also shows on the (#II-patent) (#II-2009) US application Ser. No. 12/624,621 filed on Nov. 24, 2009 now is U.S. Pat. No. 8,303,150 Parent claim 1 and Column 9 line 18 to line 19 same as the Child (#II-2) claims as above listed.

FIGS. 23, 24, 25, 26 disclosure the (3 basic units-project assembly) details illustration as clear definition to use LED on other products or self-container LED unit to fit into all kind of seasonal garden light or seasonal outdoor lighting different housing with disc to load the image-forming units or optics-lens/refractive lens which is rotating or steady/no move for hundreds of preferred combination as the FIGS. 40, 41, 42, 43 or-and FIGS. 45, 46, 47, 48 some brief illustration out of hundreds of assortment for more/no-move, I or plurality of image-forming units/textures lens, I or multiple piece, I or more colors, has or without IC controller so can came out hundreds of combinations.

From FIG. 25 show the conductive wire or string (LI) (L2) several different arrangement to connect with AC power source including built-in lamp-base (L2) (L2') has built-in or snap-in or tight-fit-in LED light source (L4') (L4") to install with the housing (L8') (L8") of 2 parts of the project-assembly including (a) image-forming unit(s) (L6") or-and texture lens (L6'), and (b) refractive or-and reflective lens (L7') (L7") so can project the lighted image or-and lighted patterns. The housing (L8") has one fixed image-forming unit (L6") that is a slide or film or printed piece or piece has shaped opening, piece has cutouts, stencil piece to create an image while LED (L4") light beam passing through and go through the refractive-lens to enlarge and spread out to outdoor areas, surface such as building, house, wall, garage door, floor.

The LED (L4') install to the housing or tube (L8') which has preferred movable disc or holder (78) has install plurality of the image forming-unit or textures-lens or-and has movable disc or holder to hold plurality of the refractive-lens (L7'). The said both of movable disc or holder (78) can be rotate by manual or incorporate with motor or rotating device as FIGS. 36, 37, 38, 39 FIGS. 40, 41, 42, 43 FIGS.

45, 46, 47, 48 which has motor with axis to make the said preferred disc or disc(s) to rotating and change position for the LED light source.

The movable disc can load (A) Image-forming unit (s) or-and texture lens to create the image while light beam passing through or-and (B) refractive lens to enlarge and spread out the image created by image-forming-unit(s) or-and textures lens, or-and (C) grating or hologram piece which can have different art design for grating piece to split the high-wattage laser beam go through it and make plurality of low-wattage Laser light beam with matrix, array, dot-matrix, contour of item, art, shape.

The LED (L4) and Other LED (L4') (L4") has different application for main products. The LED (L4) is part of project-assembly so the 3 basic-parts project-assembly has self-own LED (L4) and all fit into main product housing where can put all the LED, and the image-forming unit or-and texture-lens, and refractive-lens 3 basic-parts into one compact housing (L8) so this kind of main-product's housing can put all 3 basic-parts into and this kind of main-product including garden light, outdoor lighting, seasonal garden light which LED light source(s) only need less than palm size areas for installation.

The other LED (L4') (L4") is not belong project-assembly and it is belong to the main-products which the main-product has more than one of LED light source and each space need at least arm-away distance so it is too difficult to load or arrange all parts & accessories into one housing of main-products. This kind of main-products including as (i) light string, (ii) patio light, or (iii) light-device has plurality of LEDs and each LED has arm-distance space; so this kind of the LED (L4') (L4") is part of the main-products and add-on the said (A) image-forming-unit or-and texture-lens, and (B) refractive-lens which has its housing (L8') (L8") to add-on the main-product's spaced LEDs (L4') (L4").

From FIGS. 27, 28, 29, 30, 31, 32 disclosure the (II-family) patent (#II-2009) US application Ser. No. 12/624,621 filed on Nov. 24, 2009 now is U.S. Pat. No. 8,303,150 clear stated claims 1 for power of the seasonal garden light or seasonal outdoor light has the AC plug wire to get AC power on the FIG. 31 to offer evidence the said AC plug wire is one of the preferred kits to deliver the AC power to LED seasonal garden or outdoor projection light device.

From FIGS. 33,34,35 disclosure the 3 preferred embodiment and construction for LED outdoor or garden light or LED bulb has projection functions and details to make changeable or movable image or lighted patterns. From FIGS. 33, 34, 35 can see the LED or-and laser outdoor or garden or season garden light has 3 basic-part of project-assembly including LED (331) (341) (351), and (ii) image-forming unit or-and texture-lens (332) (342) (352), and (iii) refractive or-and reflective lens (333) (343) (353) from low to top. The said LED (331) (341) (351) that may (LED 1) has one or more than one piece, or (LED2) has one or more than one color, or (LED 3) has desired on-off time, period of time, cycle, duration, sequential, or (LED 4) has desired LED type selected from Dip LED, Chip LED, Dice LED, Chip-on-Board (COB) LED; so it has variety X-combination (X is any number) of the said LED (NI) specification for current invention.

For the image-forming unit or-and texture lens (332) (342) (352) that may (Image1) is a image-forming unit which is a slide, film, stencil, (Image 2) piece has printing, piece has cutouts, piece has shape opening, piece has geometric design, piece has window, (Image 2) grating piece, hologram piece, or-and (LENS 1) is a texture lens which has at least refractive or-and reflective or-and diffusion or-and grating or-and protective optics-properties including (LENS 2) prism lens, diamond-cut lens, variable thickness lens, marking lens, sandblaster lens, craving lens, (LENS 3) combo-lens which has any combination for refractive, reflective, diffusion, grating, protective optic-lens in one piece, or (LEND 4) other treated lens which can create a image or patterns, or-and (LENS 5) combo-lens which one lens has desired any combination may selected from reflective, refractive, diffusion, protect window, flat piece without optics-properties. Protective lens, (LENS Shape 1) dome lens, (Lens shape 2) sphere lens, cover, (Lens shape 3) ½ ball, (LENS shape 4) ½ ball with other piece to become ⅔ or ¾ ball combination lens which offer image-forming and refractive combo-lens; so the image-forming unit or-and texture-lens may has Y-combination (Y is any number) for current invention.

The said refractive or-and reflective lens (333) (343) (353) which has optic properties to enlarge and spread out the lighted image or-and patterns to outdoor building or house or garage door or walls or ground. The said refractive or-and reflective lens (333) (343) (353) that may (aaa) only one optics properties has combination of reflective or-and reflective or-and diffusion or-and protective-window for laser light source or-and protective cover for laser light source, or-and (bbb) more than one of refractive or-and reflective lens including 1st or-and 2nd or-and more, or-and (ccc) plurality of refractive or-and reflective lens fit into disc or holder or compartments with or without motor or spin device or movement device to make it for manual or automatically movement, shaking, vibration, waving, or-and (ddd) the above said combo-lens in one piece or-and 1st or 2nd or more optics-lens or-and plurality of optic-lens inside disc has moving, rotating, spinning, waving, vibration to make the desired function; so the refractive or-and reflective or-and diffusion or-and protective-lens has Z-combination (Z is any number).

From above discussed (X)×(Y)×(Z) assortment can get hundreds of combinations to make the different light effects while each of the 3 basic-parts with different construction, design, size or specification. This is other features for the current invention.

From FIG. 33 the LED (331) light beam pass through top image-forming unit (N2) which is a piece has (a) cutouts, or (b) window, or (c) printing, or (d) shape opening, or (e) stencil, or (f) arts on piece. And LED (NI) light beam passing through the image-forming unit(s) (332) treatment (332-1) create the light beams has shaped or geometric shape and emit to the top at least one (XX-1) refractive, (XX-2) reflective, (XX-3) diffusion, (XX 4) grating piece, (XX-5) protective, and (XX-6) combo lens which has any combination for lens from (XX-I to XX-5) 6 desired optics-properties, so enlarge and spread out the shaped light beam out from image-forming unit(s) to outside. In order to make the more splendid light effects, optional can have movement or motor or spin device (335) which has the axis (336) to passing through or join with the each of above said 3 basic-parts of project-assembly on this preferred embodiment including LED(s) (331) & image-forming unit(s) (332) & refractive or-and diffusing or-and reflective lens (333) so can make any one of more than one of the 3 basic-parts to rotating to move to get variety of combination s and come out plurality of different light effects. The said Motor and LED connect with PCB (334) by wire (337) and the PCB including preferred circuit or-and controller connect with the preferred connector to get AC power source wherein the said connector(s) can selected from AC plug-wire or bulb-base or outside circuit or outside transformer so can get AC power source to make the said LED or-and Laser outdoor or seasonal or garden light to get desired projection light effects with splendid light effects with or without the said movement device.

From FIG. 34 can see the same most simple construction for LED or-and laser outdoor light device has the LED (341) and image-forming unit (342) and refractive or-and reflective lens or assembly (343). Here the said image-forming unit (342) is not only can create same image or lighted patterns as the (342) image-forming unit (342-1) which by the pin-hole image theory but also can have the full color with details image or lighted patterns while the image-forming unit(s) (342) is at least one (YY-I) film (342-2), (YY-2) slide (342-2), (YY-3) displayer including LCD or TFT or Screen, (YY-4) printed colorful piece, and (YY-5) grating or hologram piece (N2-2') while light source is laser light source; so can get very details image such as cartoon character, words, sign, logo, art, designs by the current image-forming unit(s) (342).

Also, the said top or front refractive or-and reflective lens (343) which can be a single piece lens or plurality of lens fit or install on the said movable or rotatable disc (343-1) or holder or compartment (343-1) so can rotating the said disc or holder or compartment (343-1) to allow the below tiny lighted image or-and patterns to passing through each one of plurality of top refractive or-and reflective lens (343) while disc is rotating by lower motor (345-1) and its gear-set (345) which power by the PCB (334) while incorporate with preferred one of connector which may selected from the AC plug wire, AC bulb-base, AC prong, AC outside circuit kits including AC-to-DC transformer.

From the FIG. 35 the said outdoor light device has the similar of FIG. 33 and FIG. 34 for outdoor or garden or seasonal lighting device which has LED (351) and image-forming unit (352) here is the treated-lens or texture-lens (352) has the prism (352-1) or diamond-cut FIG. 49 or FIG. 47 (475-1), or FIG. 47 (473-3) variable thickness, or FIG. 67 (6715) diffusion surface, or FIG. 46 (465-1) marked lens, or FIG. 62 (623) texture lens, or FIG. 51 (5113) convex lens, or FIG. 62 (625) craved or engraved or laser craved lens, or FIG. 47 (473-3) (473-2) (473-1) combo-lens which have more than one of reflective, refractive, diffusing, grating, protective, total reflective, retro-reflective lens, or FIG. 47 (473-3) (473-2) (473-1) grating or hologram piece or lens; so can create plurality LED light beam has lighted image or-and patterns or-and split high-wattage laser beams to plenty of low-wattage laser light-beam.

The light-beam out from the image-forming unit (352) emit to the top or front 2$^{nd}$ optics-lens or top optics-cover (353) (depend on application for products is horizon or down light device) which has desired treatment as the above discussed the treated-lens or texture-lens (352) is at least one (A) prism (352-1), (B) diamond-cut FIG. 49 or FIG. 47 (475-1) (342), (C) variable thickness FIG. 47 (473-3), (D) diffusion surface FIG. 67 (6715), (E) marked lens FIG. 46 (465-1), (F) texture lens, FIG. 62 (623), (G) convex lens FIG. 51 (5113), (H) craved or engraved or laser craved lens FIG. 62 (625), and (I) grating or hologram piece or lens FIG. 47 (473-3) (473-2) (473-1), for variety treatments or high polished protective lens to create enlarge and spread out lighted image or-and patterns. Same as above discussion FIGS. 33, 34, 35 it has motor (335) (345-1) (355-1) and gear-set (345) (355) to make any combination of 3 basic-parts of project assembly to rotate and make hundreds of assortments to get many different light performance.

The said connector for current invention as "AC power source" shown can use (Power 1) AC plug wire, or (Power 2) AC bulb-base, or (Power 3) AC prong, or (Power 4) outside circuit including AC-to-DC transformer while the outdoor light device has no any circuit inside. Hereafter, all connector should cover these 4 embodiments are powered by AC power source.

Figure 36:
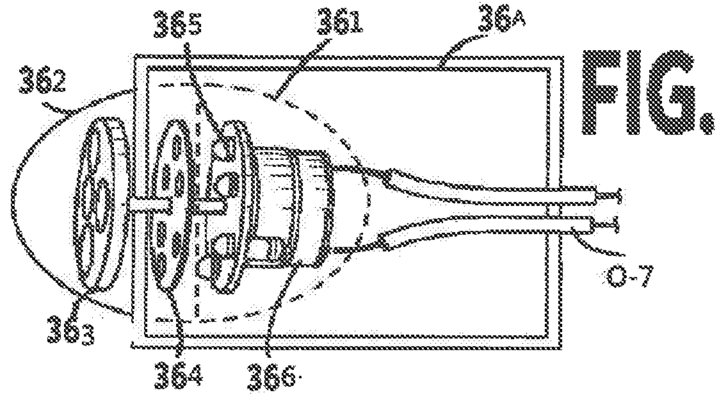

From FIG. 36, the outdoor or garden or seasonal LED or-and laser light has desired housing to fit the 3 basic-parts of project-assembly as current and co-pending filed concept and idea and construction. The said outdoor light may has different shape of housing including (HH-1) tube shape, or (HH-2) Cone shape, or (HH-3) Speaker shape, or (HH-4) football shape, or (HH-5) any geometric shape to load the basic 3 basic-parts of project assembly and the optional selected added parts including the (DD-I) Disc, holder, compartment to load plurality of LED(s); or-and image-forming unit or-and texture-lens, or grating piece; or- and refractive or-and reflective or-and diffusing or-and protective lens. The 3 basic parts can be built-in or installed into the desired housing to form the simplest construction for outdoor projection outdoor light. The arrangement for built-in or installed 3 basic parts as below preferred drawing but any alternative design should still fall within the current invention.

From FIG. 36 show the outdoor light has 3 basic-parts (363) (364) (365) of project assembly fit into a foot-ball shape housing only, or can have environment protection a 2nd housing (36A) which is a rectangular housing (36A) which has the top or front optics-lens or optics-cover which is only the protective-lens (362), dome (362), sphere (362) or ½ ball or more than ½ ball shape (362) and allow the inner 3 basic-parts (363) (364) (365) project-assembly to create the desired lighted image or-and light patterns. The inner 3 basic parts has motor to make any combination as above discussed (XX)×(YY)×(ZZ) of 3 parts to rotate to make hundreds of assortments.

The said light has wire to work with above discussed "AC power source" connector to form a completely outdoor light.

Figure 37:
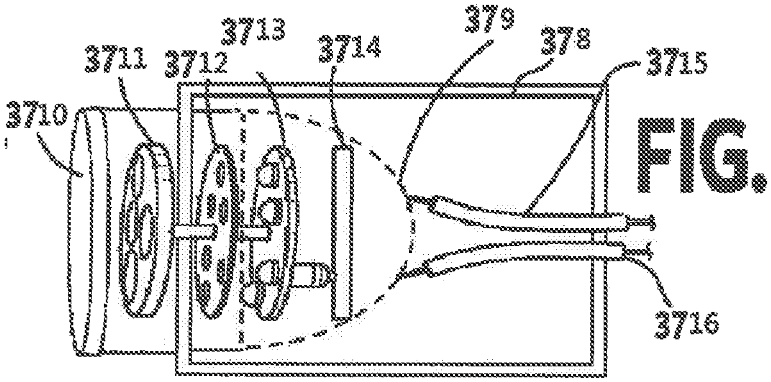

Same as the FIGS. 36, 37, 38, 39. From FIG. 37 show the 3 basic-parts (3711) (3712) (3713) of project-assembly fit into one housing (379) for outdoor use or-and optional have 2$^{nd}$ environment or protective or cosmetic housing (378). The outdoor light has flat cover or flat lens for protection function because the inner 3 basic-parts of project-assembly for the desired combinations for rotate or non-rotate any of the 3 parts already can create splendid light performance.

Figure 38:
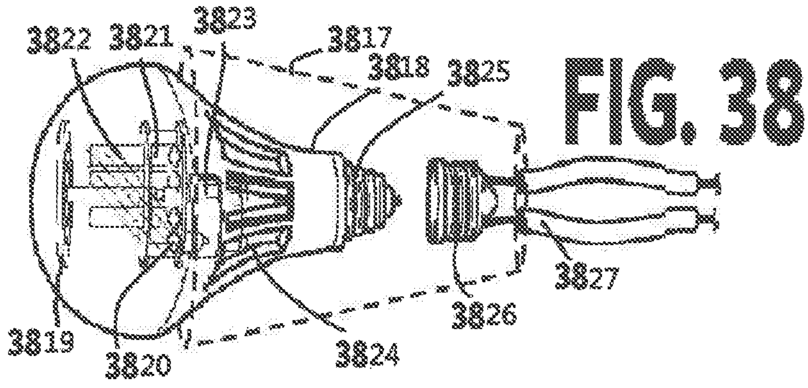

From FIG. 38 the 3 basic-parts (3819) (3820) (3821) installed into a Bulb-shape housing (3818) and it is not use the conductive wire (367) (3715) to connector to get AC power. The bulb-shape outdoor light (3818) has its own connector is AC bulb-base (3825) and can install on outdoor light base (3817) inner female bulb-socket (3826) or other female bulb-socket (not shown) to build the electric delivery.

The female bulb-socket (3826) can use any one of the 4 connectors as above discussed to get AC power source while use different shape of the outdoor housing as the (36A) (378) (3817). The said Bulb-shape outdoor light (3818) with base (3817) which may sealed together with rubber-sealing (not shown) or not sealed together for different requirement for environment standard or-and for easily replace the bulb-shape light unit (3818).

Figure 39:
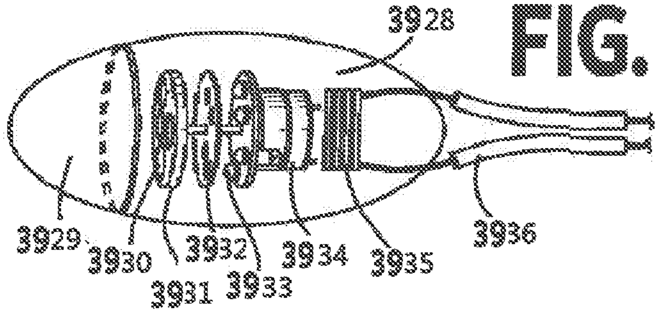

From FIG. 39 show the outdoor light is football shape (3928) which has one end (3929) is cosmetic piece. The 3 basic-parts (3931) (3932) (3933) install inside the housing (3928) and the LED (3933) are high-powered LEDs which have high-temperature so need heat-sink) (3935) to make ventilation to cool down the heat.

The alternative use fan or more heat-sink (3935) while use more high-power LED (3933) while need to project more brighter or more long distance for projection image-or-and patterns. Same as the Laser light source while use the high wattage laser light source also can have the optional ventilation design including ventilation hole, grill, slots, heat sink or fan or liquid ventilation medium.

From FIGS. 40, 41, 42, 43, the several embodiments to show more details of rotate disc that has plurality of refractive or-and other optics-properties lens.

From FIG. 40 see the outdoor light (401) has 3 basic-parts (402) (403) (404) of project assembly inside.

The LED (404) emit light-beam to the front image-forming unit (403) which is a piece with openings, shape hole, or film, slide, displayer or texture lens or treatment lens; so, can create image. The light-beam came out of the image-forming unit(s) (403) emitting to the front plurality of refractive lens (402) which inside the rotatable disc (402-1 and fixed on the axis (405-1) from below motor (405), so can make the plurality of refractive lens(s) (402) to rotating.

At the same time each tiny lighted image or-and patterns came out from image-forming unit(s) (403) will show out big image-or-patterns to outdoor surface(s) while the number I of refractive-lens (402) rotate and fall into range of light-beam out from one of the image-forming unit (403), and big image-or-patterns will disappear while the rotate Number I of refractive-lens away from the light-beam covered range. Same as other number of rotating refractive lens and number I big image-or-patterns and at the same time has N-Number of plurality of refractive-lens is rotating so also has N-Number of big image-or-patterns is moving show up and disappear.

The Said Light (401) motor (405) and circuit (407) has conductive piece to build the electric signal delivery and the circuit (407) connect with the said one of the above discussed one of 4 types and here is connect with AC plug wire. The said light (401) can work for down light or horizon installation on ground for outdoor garden light with preferred image-forming unit such as seasonal sign or arts.

From FIG. 41 show the alternative construction which has apply the light-beam block-device which may a tube for different diameter for big-tube (413) or-and has small-tube (412). The tube (413) (412) main purpose is isolate the LED or-and laser light-beam to interfere desired light performance.

For examples the big-tube (413) has its own 3 basic-parts or selected parts to make a steady and fixed big-image show out to outdoor surface(s). At the same time surrounding the big-tube (413) has plurality of the rotating optics-lens inside the rotating-disc (412') and each refractive-lens (P3') (413') is rotating and fall within or away-from the said shaped lighted image- or-patterns light beam came out from lower image-forming unit(s) (411) so create multiple moving image-or-patterns as FIGS. 40, 41, 42, 43, 44.

This has tube (413) can create a 2 type of image including center has Big-Size Image-or-patterns including cartoon, logo, words, sign or other geometric or arts, and surrounding it is a lot of moving small image which can be any color, design, shape, image, patterns. This is same as parent and co-pending (#QQQ-3) U.S. application Ser. No. 14/983,993 filed on Dec. 30, 2015 which is Division filed case for (#QQQ-2012) now just make more clear for tube function and upgrade to make big-size steady and surrounding small-size moving lighted image-or-and patterns.

From FIG. 41 The said optional tube (414) (412) main purpose is isolate the other LED light-beam to interfere the desired light performance also can present light to leakage out to other area to make image darker. These small tube inside is hollow and without any image-forming unit(s) or-and LEDs.

From FIG. 41 the said LED(s) (414*a*) which may has different number color or different unit number and also can have any combination for colors under pre-determined requirements so it can be I color or 2 colors or more than 2 colors with IC control to make it has pre-determined on-off time, period of time, cycles, duration, color changing, selected color, freeze color, fade-in or fade-out, chasing, random, pair flash, sequential flashing or other market available LED IC functions to use for desired functions.

From FIGS. 40, 41, 42, 44, also show the front disc for refractive or-and other optics-functions lens including rotating grating-piece, it also show the disc for the rotating or not-rotate disc for the image-forming unit(s). This can be same as the above discuss for any possible to make different front enlarge or split light beams lens assembly and the image forming unit(s) or-and texture lens. There have hundreds of combinations or assortments can be choice by market requirement.

From FIG. 42 show more simple application than FIG. 40 which has each of 1st optical element or lens (4219) in front of each tube (4218) which in-front of each of LED (4216). Each tube (4218) is optional to prevent the other LED or-and Laser light source beams to interfere the desired light performance and also can prevent the light source light-beam leakage to reduce the brightness.

The light beam emit out from light source (4216) to front tube (4217) (4218) and emit to the front of 1st optics-lens (4219) which is an image-forming unit or texture-lens or grating-piece (4219) to form the lighted image or-and patterns. The tiny lighted image or-and patterns then go through the 2nd optic-lens (4221) which is the lens has at least one of refractive or-and reflective or-and diffusing or-and protective lens to emit out the lighted image or-and patterns. While the 2nd optic-lens) (4221) is protective purpose because the tiny lighted image or-and patterns under the protective-lens will spread out to desired size and range while (light 1) the light source is a strong and high-power LEDs use for the outdoor light or-and (Light 2) the inner light source is a Laser light source and already passing through the grating-piece for image-forming unit(s) (4219).

From FIG. 42 also show the circuit (4222) passing through the water-resistant sealing (4224) and has AC plug wire (4226) (4227) to connect with AC power source. Same for the top cover (4228) also has rubber-sealing to make environment requirement and meet the IP-grade for outdoor lighting water resistant standard.

From FIG. 44 the outdoor light is a laser light source (4429) which has circuit) (4429) and wire (4433) (4435) to connector selected from one of the 4 connector (4436) as above discussed with AC power source (not shown).

The Laser high-wattage light-beam pass through the front image-forming unit(s) or grating-piece assembly (4430) which may has plurality of grating-piece (4430) fit into a rotatable disc or holder (4431) and each of the grating-piece has different laser-treated for different grating or-and hologram construction so can came out the (Laser !) linear, or-and (Laser 2) dots, or-and (laser 3) array, or-and (Laser 4) matrix, or-and (laser 5) contour, or-and (laser 6) shape outline; so can create the desired laser image or-and patterns for desired number of colors.

The alternative or upgrade application can incorporate with LED light source so can have LED or-and Laser all kind of light performance from one unit of outdoor lighting or outdoor garden light or outdoor seasonal light. The LED can create full details color image such as cartoon character and laser can create the background or splendid laser light image or-and patterns. This same as the FIGS. 83, 86,87,88.

From side FIG. 43 show preferred 4 connectors as FIG. 43 choice for outdoor light as above discussed.

From FIG. 45 the outdoor light has alternative construction than the and FIGS. 33, 34, 35. The FIG. 45 show the LED (451) emit the light-beam to top image-forming unit(s) which has above discussed including:

(Properties XX-I) refractive, or-and (Properties XX-2) reflective, or-and (Properties XX-3) diffusion, or (Properties XX-4) grating or hologram, (Properties XX-5) protective, or (Properties XX-6) combo lens which has any combination for lens from XX-I to XX-6 optics-properties (Image 1=YYI+2) is an image-forming unit which is a slide, film, stencil, (Image 2=YY3) displayer, displayer including LCD or TFT or Screen, (Image 4=YY) piece has printing, piece has cutouts, piece has shape opening, piece has geometric design, piece has window, (Image YY=5) grating piece, hologram piece, (YY-1) film (342-2), or (YY-2) slide (342-2), or (YY-3) displayer including LCD or TFT or Screen, (YY-4) printed colorful piece, or (YY-5) grating or hologram piece (LENS 1) is a texture lens which has at least refractive, or-and reflective, or-and diffusion, or-and grating or-and protective optics-properties (LENS 2) prism lens, diamond-cut lens, variable thickness lens, marking lens, sandblaster lens, craving lens, (LENS 3) combo-lens which has any combination for refractive, reflective, diffusion, grating, protective, grating, hologram optic-properties in one piece, or (LEND 4) other treated lens which can create image or patterns, or-and (LENS 5) combo-lens which one lens has desired any combination may selected from reflective, refractive, diffusion, grating, hologram, protective window, flat piece without optics-properties. Protective lens, (Lens Shape 1) dome lens, (Lens shape 2) sphere lens, cover, (Lens shape 3) ½ Ball, (Lens shape 4) ½ ball with other piece to become ⅔ or ¾ ball combination lens which offer image-forming and refractive combo-lens.

(ZZ-1) variable thickness, or (ZZ-2) diffusion surface, or (ZZ-3) marked lens, or (ZZ-4) texture lens, or (ZZ-5) convex lens, or (ZZ-5) craved or engraved or laser craved lens, or (ZZ-6) combo-lens which have more than one of reflective, refractive, diffusing, grating, protective, total reflective, retro-reflective lens, or (ZZ-6) grating or hologram piece or lens (Laser 1) linear, or-and (Laser 2) dots, or-and (laser 3) array, or-and (Laser 4) matrix, or- and (laser 5) contour, or-and (laser 6) shape outline.

(LED 1) has one or more than one piece, or (LED 2) has one or more than one color, or (LED 3) has desired on-off time, period of time, cycle, duration, sequential, or (LED 4) has desired LED type selected from Dip LED, Chip LED, Dice LED, Chip-on-Board (COB) LED; (HH-1) tube shape, or (HH-2) Cone shape, or (HH-3) Speaker shape, or (HH-4) football shape, or (HH-5) any geometric shape.

(Power 1) AC plug wire, or (Power 2) AC bulb-base, or (Power 3) AC prong, or (Power 4) outside circuit including AC-to-DC transformer From FIG. 45, 46, 47, 48; the FIG. 45 see the LED (451) emit light to top image-forming unit (454) is the slide or shape cutout or printed piece or window (453), and shaped lighted image or-and patterns emit to front or top enlarge size refractive or-and other optics-properties lens (455). The light device has the top or front plurality of refractive-lens (455) fit into rotating disc (456) so the LED (451) light beam go through the image forming unit (453-1) and while the refractive lens (455) rotating into range (RG) of the light beam the big-image (Big 455 in) show up, and while the refractive-lens 455 rotate away-from the light-beam range (RG) big-image (Big 455 out) disappear; so the big-image (455) show up to disappear on track (path). The traveling track (path) can design basing on the number of the refractive-lens (455) inside the rotatable disc and the number of the image forming unit (453-1) and other related design the upgrade or alternative design the LED (451) can incorporate with optional optic-lens which change the LED (451) narrow light emit angle to wider angle and become parallel light beam to make the light-beam emit into image-forming unit(s) for more evenly for area section, area.

From FIGS. 46, 47 the outdoor light has LED (461) to emit light to front pt optics-lens of image-forming unit which is a rotating prism optic-lens (463) and created plurality of refractive or-and reflective light beam spread out from the top of the prism-lens (463).

The plurality of LED light-beam came out from the prism-lens (463) and emit to the front 2nd optics-lens which is a fixed and non-rotating optic-cover in ½ ball or more than ½ ball shape with diamond-cut (465-1) or marked-lens (465-1) or variable thickness-lens (465) so can change the light-beam came out from the pt optic-means (463).

Same as FIG. 46 which has the rotating 1st optic-lens (473) has variable thickness optics properties or marked optics-lens (471) work as image-forming unit (471). The LED (471) emit light to top 1st optic-lens work as variable thickness lens (473) to create plurality of LED light-beam and emit to the front 2$^{nd}$ optic-lens (475) which has the diamond-cut treatment (475-1) which has the inner flat and outside is round shape (Same as FIGS. 49, 50, 51 which is co-pending filing #ZZZ-2013 same drawings) so it is a convex-lens has refractive optics-properties to enlarge the pt optic-lens created plurality light-beam to outside of the light unit to outdoor surface to show on building or house or outdoor surface(s).

From FIG. 48 the outdoor light is a laser light device which has Laser light source (4811) fit on the hole (4812) of the base (4813). The laser light beam (4814) emit to front or top one or plurality of grating or-and hologram piece (4815) which is install on the disc (4816) and split the laser light-beam (4814) into plurality of low-wattage laser light-beam (4817).

The plurality of low-wattage laser light-beam emit through the top or front 2nd optic-lens which is type of protective-lens which do not have any optics-functions. Or/The light plurality of low-wattage laser light-beam (4817) emit to 2$^{nd}$ optic-lens (4818) which is rotating (Same as FIGS. 45, 46, 47, 48 or fixed one or plurality number of grating or-and hologram piece (not shown) may installed inside the rotating-disc (Same as 4816) so can change many of different constructure or design of grating-piece so can get the laser image for different (Laser Image I) contour, (Laser Image 2) shape, (Laser image 3) light patterns, (Laser Image 4) spots, (laser image 5) array, (Laser image 6) matrix image or-and patterns; to show out the for wide view area. It appreciated the laser outdoor or laser seasonal or laser garden light may incorporate the sensor device as parent and co-pending (XX-family filed on 2010) to stop the laser light source emit light beam while people fall within the motion sensor or moving-detectors assembly pre-set safety area.

From FIG. 49 The outdoor light has the top cover is a diamond-cut optic-lens has LED light source (492) emit light-beam (493) to inner flat reflective-area to split into light beam (493*a*) emit to refractive case and reflected light beam (493*a*) to hit the inner other points and light beam pass through the wall material and deviate direction as light beam (493*b*) and light-beam (493*c*) came out from the outside surface. The light beam from LED (492)—reflected by cover inner reflective surface—to split and one of light beam (493*a*)—emit to cover material and refracted to change direction for light beam----->(493*b*)—and emit out from cover thickness and refracted out light beam (493*c*). This is one of the LED light traveling path.

One other embodiment, The LED light-beam (492) reflected into not only have (493*a*) but also have the 2nd reflected light-beam (494) which is reflected again by inner surface to get the LED light beam (495) and emit to cover to change direction light beam--->(495*a*) which refracted and emitted out light beam---------->(495*b*).

The light-beam (494) also not only reflected into (495) but also have light-beam (494*a*)—refracted into light beam----(R4') (494*b*)---- and refracted light beam-(494*b*)------ and refracted out light beam (494*c*).

So, the diamond-cut optic-lens (497) for outdoor light front cover to incorporated with inner 1 st optics-lens such as rotating prism-lens FIG. 35 (352) can created splendid light performance. Furthermore, while change the LED color from 1 color to 2 color or more colors and IC control so can make the more assortments light performance outdoor lighting.

From FIG. 49 show how to make the diamond (497) or other optic-cover more than ½ ball (509 and 5011). The top cover has one ½ half ball (509) (497) for top and add or assembled with lower partial of ball (5011) so can make the top cover or top optics-lens has more than ½ ball size (509 and 5011). The reason to make more than ½ ball (509 and 5011) because we need to make much bigger size and more eye-exciting lighted image or-and pattern. The distance from the top cover or top optics-lens to the inner 1st optics-lens has related the best distance which is more than ½ ball because more distance can create more spread out and more clear image or-and lighted patterns.

From FIGS. 50, 51 show the inner construction of the 2nd optic-lens which is diamond-cut optic-lens. The inner surface has a lot of flat surface (5112) which has high polished treated so can easily reflect all input light-beam and reflect to other direction depend on the input angle of light-beam similar with prism lens FIG. 35 (352). The diamond-cut top sphere 2nd optic-lens (5113) outside ball type so the outside is round (5113) and inner is flat (5112) surface so it become the convex lens (5013) so the 2nd optics lens for diamond-cut unit which also has plurality of the tiny convex-lens which offer the refractive optic-properties. This embodiment clear explain the diamond-cut $2^{nd}$ optics-lens (497) (509) (5011) has both refractive (5113) or-and reflective (5112) optics properties in one top cover or top-lens to make the inner 1st optics-lens (5011) or prism lens FIG. 35 (352) came out light-beam to make more refraction and-or reflection to get splendid light effects.

From FIG. 52 the outdoor light has the movement device here is the motor (522) which install on the outdoor light base (521) and top has installed the more than one LED (525). The motor has axis (526) which passing through the LED (525) PCB board and can assembled with the current invention 3 basic-parts of project-assembly. The base (521) has AC power source connector as above 4 selection and here use the bulb-base to get AC power source.

From FIG. 53 the outdoor light as the FIG. 52 which has the AC connector by plug (5313) and wire (5314) to get AC power. The inner side of base has motor (5311) and circuit (5310) to connect by conductive wire (5312) on the base (539).

From FIGS. 55, 56, 57 show the 1st optics-lens for different types such as rotating variable-thickness-lens or prism-lens as 1st optic-lens and LED light beam passing through to form the lighted patterns and light beam came out from the 2nd optics-lens which is more than ½ ball or sphere shape install on top or front of the said housing so can create the desired light effects.

These embodiments FIGS. 55, 56, 57 show the rotating 1st optics-lens light beam came out to emit into the non-rotating and water-resistance or-and environment grade sealed 2nd optics-lens to create desired light effects. The side text show the hundreds of the combination while change any one of the 3 basic-parts of project-assembly can make more than hundreds of assortment and create a lot of different light effect outdoor garden or seasonal or patio or light string light device as above or co-pending filed case. It is appreciated any alternative or equal function or replaceable idea, construction, concept still should fall within the current or co-pending or above discussed all idea, drawing, concept and claims.

From FIGS. 58, 59, 60, 61 and FIG. 61 show the different AC connector selected from the above discussed 4 type and show the inner LED light source (580) (590) (6001) (6002) (610) passing through the 1st optics-lens (581) (591) (601) 601-1) (611) and the light beam came out from theist optics-lens (581) (591) (601) 601-1) (611) emit to the 2nd optics-lens (582) (592) (602) (612).

From FIG. 60 also show the inner light source is not only LED light source (6001) but also has the laser light source (6002) and the laser light-beam passing through the front grating-piece (601-1) which the grating-piece (601-1) is built-in the $2^{nd}$ optic-lens which has the LED light source required refractive or-and reflective or-and diffusion optics-properties and also has the laser light source (6002) need for grating-piece or-and protected-lens both all built-on the said $2^{nd}$ optic-lens. (610)

From FIG. 61 show the LED (610) has Circuit board (614) and has the outside AC-to-DC AC connector to connect with AC power.

From the FIG. 62, the outdoor light has identically 3 basic-parts of project-assembly built-in preferred (a) night light housing (626) with prong (626) so can become outdoor plug-in prong outdoor night light, or (b) cone or cylinder or tube shape housing (626) with AC plug wire (626) for outdoor garden light, or (c) bulb-shape housing (626) with AC bulb-base (626) for outdoor bulb light which can fit into the patio light, cafe light, light string. So, this embodiment to explain the co-inventor most simple 3 basic-parts of project assembly can fit into any different design or construction housing with selected AC connector as above discussed to become many different applications for LED or-and laser outdoor lighting for garden or outdoor or seasonal or light string or patio light to project the lighted image or-and patterns as co-pending (#Q-200&) (#FF-2008) (#11-2009) (#TT-2010) (#QQQ-2012) (#ZZZ-2013) and its CIP or Division filed cases scope and idea which show all evidence on above discuss (FIGS. 9 to 32). It is appreciated the all above discussed co-pending these family filed case all scope, idea, concept, drawing, construction and all alternative or replacement or equal function should still fall within the current invention scope, idea, concept and claims.

From FIG. 62 the outdoor light in different housing has 3 basic-parts of LED project-assembly but also has the at least one or more than one of grating-piece arranged inside the housing or-and arranged on top-cover to make I time split the higher-wattage into plurality of the lower-wattage laser light beams as laser path show on the drawing. The rest of LED PATH is the LED light source (621) light beam travel trace which the LED light-beam travel thought the 1st optic-lens (622) and the light beam came out from the 1st optics-lens (622) emit to the 2nd optics-lens (623) which has refractive or-and reflective or- and diffusion optic-properties.

From FIGS. 63, 64 show the Inner of the top cover for LED or-and Laser outdoor light for the inner 1st optic-lens. From FIG. 63 show the inner 1st optic-lens has plurality of variable-thickness (635) or-and refractive (635) or-and diffusing (635) or-and reflective (635) or-and grating-piece (632) built-in one pt optic-lens act as image-forming-unit. The lower LED light source (634) light-beam pass through the top 1st optics-lens (635) and emit to the 2nd optic-lens act as top cover. The outdoor light also included the $2^{nd}$ laser light source which higher-wattage laser light beam emit to the top 1st optics-lens (632) and emit to the 2nd optic-lens which is protect-cover or optics-properties cover to make the laser light-beam came out from 1st optics-lens which is grating-piece to make the Laser light-beam to change direction and spread out too.

From FIG. 64 show the other 1st optics-lens which is a reflector which can be any kind of market available, the preferred type as the FIG. 64 which has plurality of the reflective-surface on a bow or dish or half-ball base to reflected all the inner LED unit light source where the LED light source is not dip-type so it will install on the lower PCB (646) as the height of (647) so LED light source for Chip LED or dice LED or COB LED need reflector to help to reflect all LED output light-beam to front position. This is example for the current invention while the LED light source from chip LED or dice LED or COB can incorporate with the desired reflector inside the housing. Furthermore, the LED light source also can be a different type such as LED bar or LED pole which has many LED install on vertical bar or PCB like cone type to emit light to all surrounding surface. (Not shown)

Figure 65:
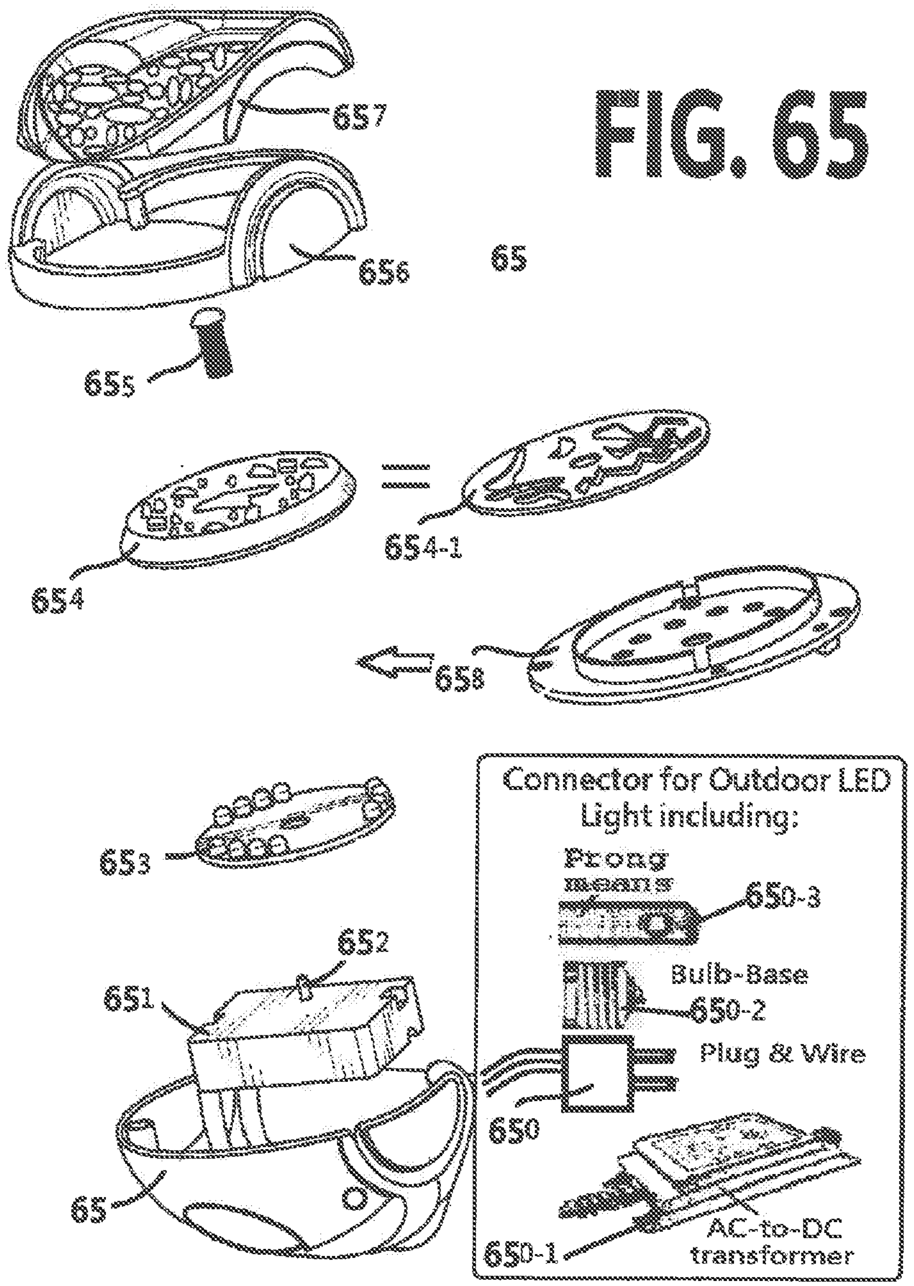

From FIG. 65 show the alternative construction for the FIG. 33 which has different base (65) and top $2^{nd}$ optics-lens act as top cover (657) both assembly with middle housing frame (656) together. The said rotating 1st optics-lens (654) can be a ring type (654) or a piece type (654-1) act as rotating image-forming unit to create the movable and changeable 1st image while the lower position LED (653) emit light beam to the rotating 1st optics-lens. The light beam came out from rotating 1st optics-lens emit to the top 2nd optic-lens as top-cover (657) which is refractive or-and diffusion or-and reflective optics properties to create the splendid light effects. The said rotating 1st optic-lens which is connect with the lower movement device (651) which may is a motor or movement or other rotate unit (651) with axis (652) to fix the rotating 1st optic-lens and assembled the rest of the parts by frame or holder (658).

From FIG. 66, 67, 68, the outdoor light which show the co-pending file case for (ZZZ-4) and issued patent (#ZZZ-3). The said (#ZZZ-4) U.S. application Ser. No. 14/296,599 Filed on Oct. 18, 2016 which is Continue in Part filing of (#ZZZ-3) U.S. application Ser. No. 14/503,647 w is U.S. Pat. No. 9,719,654 which is CIP of parent filed (#ZZZ-2013) filed on Sep. 11, 2013. The FIG. 66 show the 1st optics-lens is refractive or-and reflective lens (665) for LED light source and also has 1st optics-lens (662) is a grating-piece for Laser light source; to allow the one outdoor light has both the LED or-and laser light source and create the combo light effects. The combo lighted image or-and light patterns is the one light device has both the LED or-and laser light source and both has its own lighted image or-and lighted patterns.

From FIG. 67 show outdoor light device has the LED or-and laser light source and also show out the combo-image which including the lighted image or-and lighted patterns made by different image-forming unit(s) or textures-lens or grating-piece.

Same as the FIG. 66, the outdoor light has the laser light source (678) and laser light beam to pass front or top grating-piece to emit the plurality of low-wattage laser light beams to $2^{nd}$ optics-lens to refract or-and diffuse or-and reflect laser low-wattage laser light beam to spread out. Same time the LED light source (6710) passing tough the 1st optics-lens which is prism-lens (6712) and create a plurality of the LED light beam to emit to the top 2nd optics-lens to refracted or-and reflected to outside the outdoor light.

From FIGS. 66, 67, 68 the outdoor light has different 1st optic-lens which is a piece has openings or cutouts or printing or stencil or windows to allow the LED light-beam to emit through the shaped openings or holes or cutouts similar with pin-hole image theory to create the shaped lighted patterns or image or contour. The shaped lighted image or patterns came out from 1st optics-lens emit to the 2nd optics-lens which is clear top cover which has no optics-properties or the 2nd optics-lens which has refractive or-and reflected or other optics-properties so can enlarge size of the lighted image or patterns. Same time it may has Laser light source and passing through the grating-piece to make plurality of the Laser light-beams to viewer.

Figures 69, 70, 71:
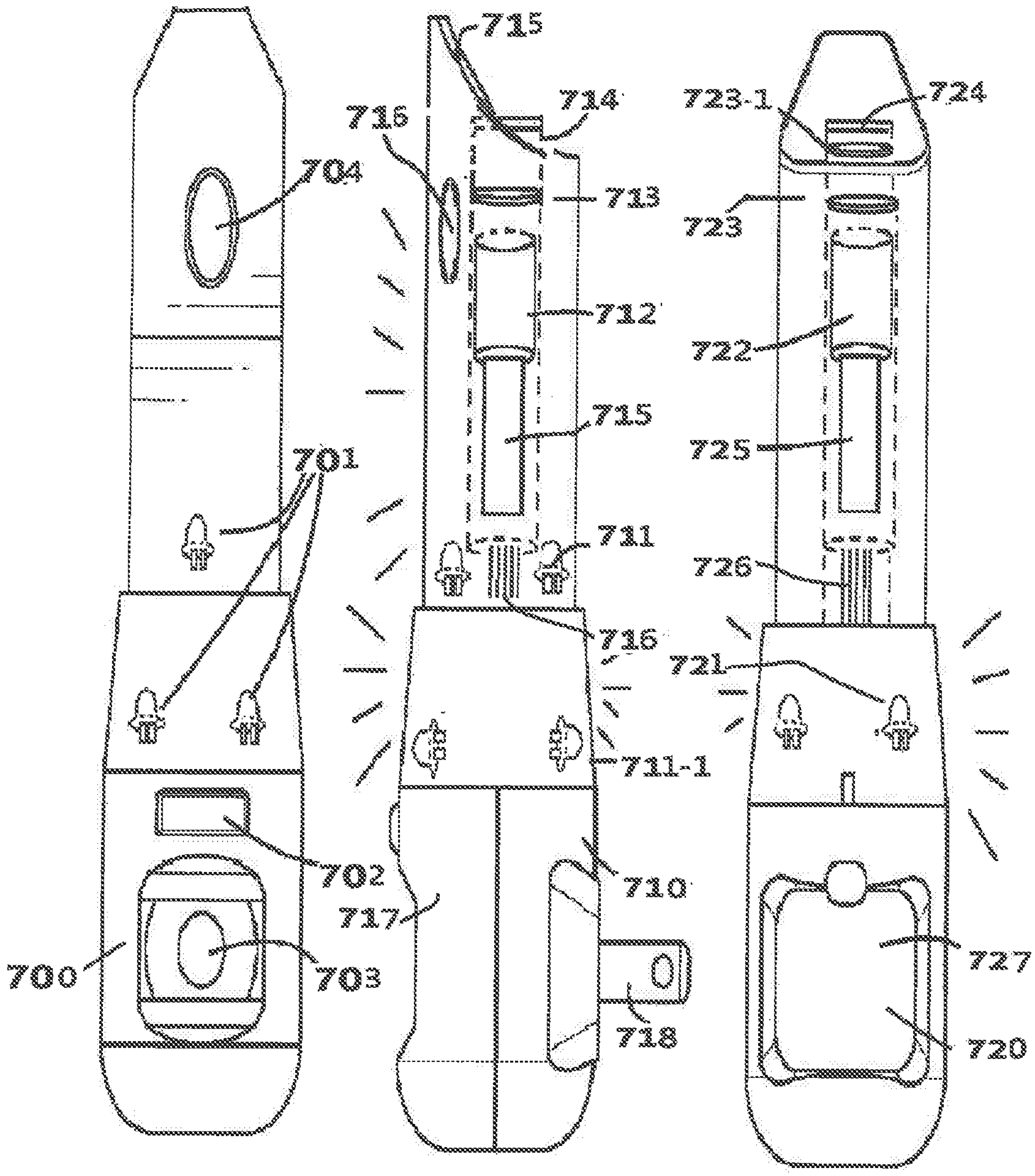

From FIGS. 69, 70, 71 show the combo light source has both LED and laser light source, and combo image (has both LED and laser light source created lighted image or patterns).

For different view angle. The FIG. 71, the laser light source has 1st grating-piece (723) to get the 1st high-wattage laser light-beams to split into plurality lower-wattage laser light-beam and it can go through top one or more or rotating different design grating-piece so can make the lower-wattage laser light-beam to become desired more plurality of the mini-wattage laser light-beams. The grating-piece for more than one piece can install on rotatable-holder to change one by one to get different plurality of laser lighted image or patterns as above discussed details.

From FIGS. 69, 70, 71 also can see combo-light source which can created the combo-image or-and light patterns as above FIGS. 69, 70, 71 discussion.

Figure 72:
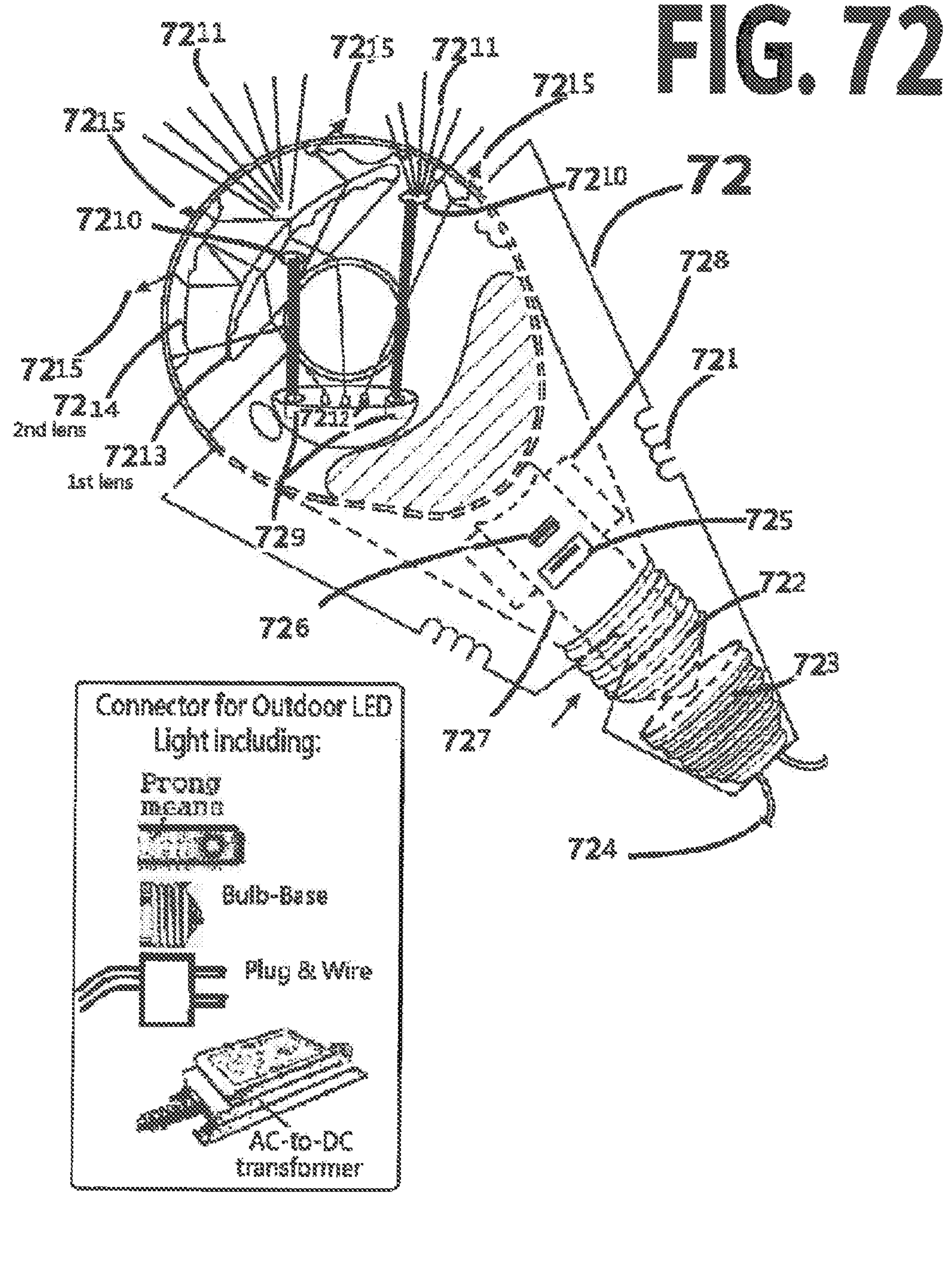

From FIG. 72, the outdoor light (72) has cone or tube or cylinder housing and AC wire to connect with preferred connector selected from the 4 suggested type as above discussed. The outdoor light (72) the cone or tube or cylinder housing has wire arrangement slots or ditch (721) to allow the USB related wires (Not shown) can coil or wrap or fit into while people use the USB related wire to charge or to supply the power. The inner of the housing not only has the 3 basic-parts of project-assembly as above all discussion but also has rechargeable battery (727) and the USB ports (726) (727) for (USB 1) charging or supplying current from built-in Type A USB (725) to outside rechargeable battery of electric or digital data device including the i-phone or android phone or communication or computer device, or (USB 2) get electric power from outside power source through the Micro USB or Type-C USB (726). The said inner parts also can have the power fail light function which can use the built-in rechargeable battery (727) to supply power with proper power fail circuit.

From FIG. 72 The said Inner housing has all parts including the (i) 3 basic-parts for laser light source (729) & 1st optics-lens is grating-piece (7210) & 2nd optics-lens is protective-lens (728), or (ii) 3 basic-parts LED (728)& 1st optic-lens (728) & 2nd optics-lens (728) of project-assembly. The outdoor light inside housing also can have rechargeable battery, or- and USB ports can inside preferred housing as the above discussed FIGS. 5, 38, 62.

From FIG. 72 the outdoor light uses the bulb-shape housing which has combo-light source and combo 1st optics-lens including the LED image-forming unit(s) for LED light source and 1st grating piece for laser light source. The AC connector (722) (723) can selected from 4 suggested type (attached details inside) here use the male-bulb-base (722) to fit into the housing female-bulb-socket (723).

Figure 73:
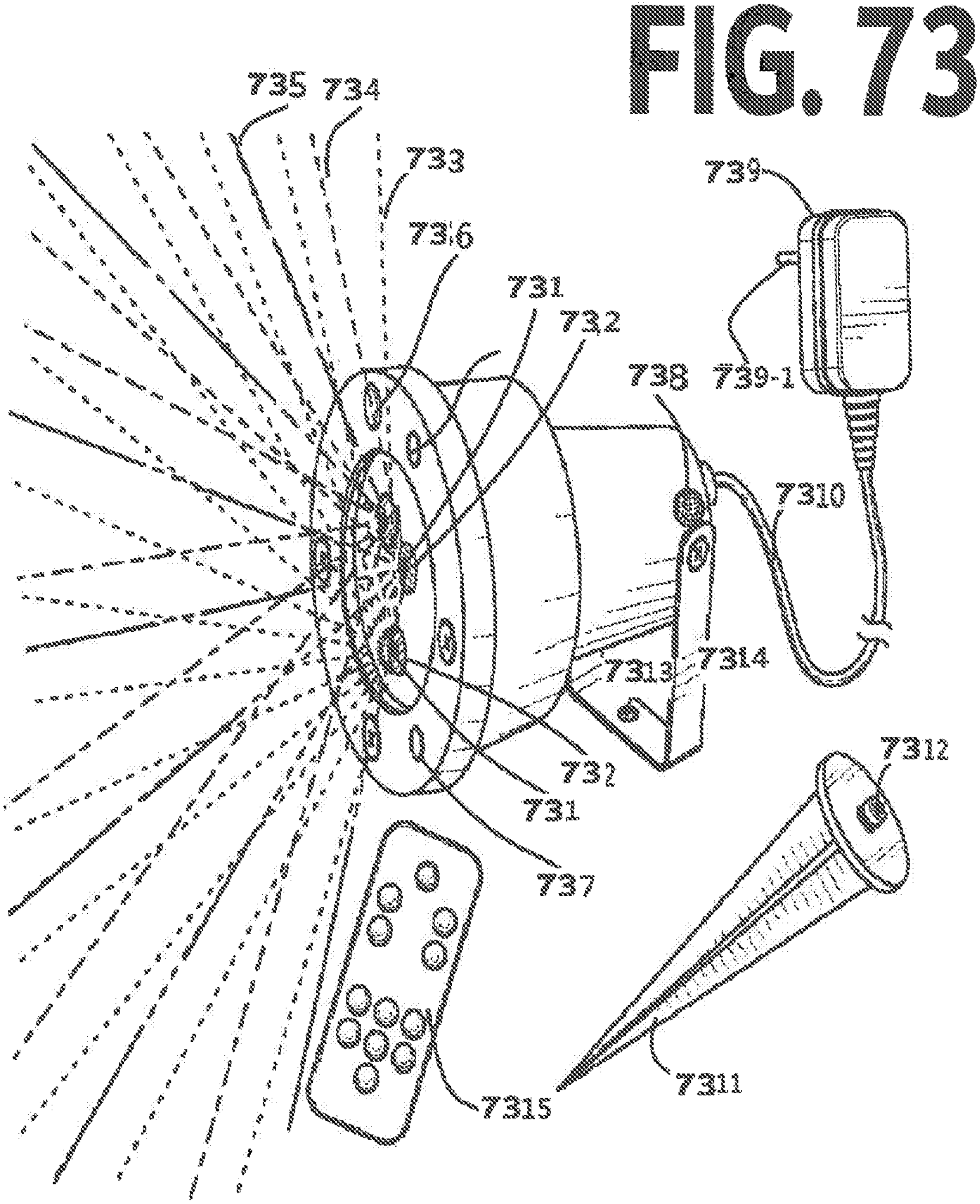

From FIG. 73 the LED or-and Laser outdoor light which is same as the FIG. 1. The difference at the (i) the grating-piece (732) is only in-front of the laser light source (731) and not same as the FIG. 1 or FIGS. 36, 37, 38, 39 that has rotatable disc to load plurality of grating-piece(s) and each grating-piece has different design some can project the array, some can project linear art, some can project contour or shape art, some can project dots or matrix, some can project special geometric shape or others. So, these are the major difference for one. VS. plurality rotating grating-piece.

The other difference at the FIG. 73 show the multiple color of Laser light beams including 1st color (733) and $2^{nd}$ color (734) and $3_{rd}$ color (735). The outdoor light also has photo-sensor (736), or motion/moving detectors (737), or even has speaker (738). The outdoor light also can optional incorporated inside wireless communication system including wi-fi, Zegbi wave, internet, IR, RF or incorporate with APP software and communicate by 3G/4G/5G network.

From FIG. 74, the one of the outdoor lighting for outdoor cafe light set which very similar with the above discussed FIG. 25. The difference at FIG. 74 cafe light which has the bulb-base is injection with the power-cord (741) which has one branch (742) that has electric-wire (743) to connect with lamp-base (744) which has non-detachable 3 basic-parts of LED project-assembly including LED (746), and 1st optic-lens (747) to create the lighted image or-and lighted patterns, and 2nd optics-lens as top cover which has refractive or-and reflective lens to enlarge size of the lighted image or-and lighted patterns (749).

From FIG. 74, the 2nd bulb-Base has the inner conductive wire (7411) to built the electric signal delivery from power-cord to the inner female bulb-socket (7412) which can received the female bulb base (7414) for the front or top laser project assembly including laser light source (7415) to the front or top 1st optic-lens which is grating-piece (7417) and the high wattage laser beam to split into plurality of low wattage laser beam (not shown) then emit from the 2nd optic-lens which has no optics properties and it only for protect inner parts.

From FIG. 74, the $3_{rd}$ branch of cafe light has conductive wire (7419) has bulb base which also has laser light source (7421) emit the high-wattage laser light-beam (Arrow-head) go through the front 1st optic-lens which is grating-piece to split high wattage laser light beam into plurality of lower wattage laser light-beam and came out from 2nd optics-lens which for protect inner parts to outside of light and shown the plurality of the tiny lower-wattage laser light-beam (7423) on outdoor surface (7424)

From FIGS. 75, 76, 77, 78, 79, 80, 81 has the all kind of the different housing design FIGS. 75, 76, 77, 78, 79, 80, 81 for LED or-and laser outdoor light which has different housing shape or-and different $2^{nd}$ optics-lens FIGS. 75, 76, 77, 78, 79, 80, 81 for different functions. Those also has different connector to get AC power as attached 4 suggested connectors for outdoor LED or-and laser light.

From FIGS. 82, 83, 84, 85, 86, 87, 88 for outdoor LED or-and Laser light has combo parts including (i) combo light source including LED or-and Laser light source(s), and (ii) combo tube including big tube and small tube, and (iii) combo 1st optic-lens including refractive or-and reflective or-and diffusion lens; and laser light source's grating or-and hologram lens, and (iv) combo $2^{nd}$ optics-lens including laser light source's refractive or-and reflective or- and diffusion lens; and laser light source 2nd grating-piece or protective-lens or cover, and (v) combo image for LED light source's lighted image or-and patterns; and laser light source plurality of lower-wattage laser light-beams or shape image or contour image or geometric arts in dots or array or matrix arrangement or any combination for these laser image or-and patterns.

Figure 82:
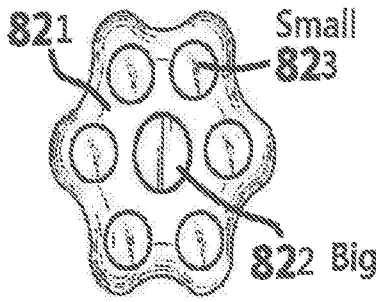

(vi) From the FIG. 82 show the said above discuss combo (i) has the big-tube on center which has fix big image or patterns; and surround the big-tube has plurality of small tube (823) to create a lot of lighted image or lighted patterns.

Figure 83:
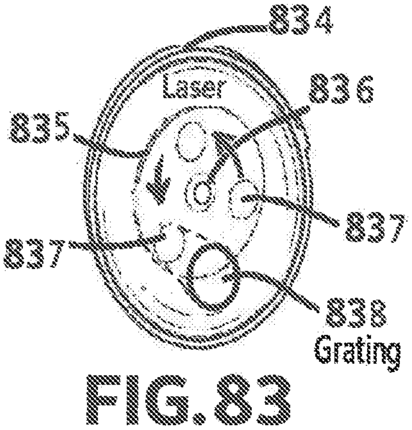

(vii) From the FIG. 83 show the said laser light source outdoor light has laser light source (837) emit high-wattage laser light-beam through the front 1st grating-piece (838) and go through the 2nd optic-lens which is a protective-lens (834). The 1st optic-lens which is grating-piece (837) has plurality number and install on rotatable disc (835) and rotating along the center axis (836).

Figure 84:
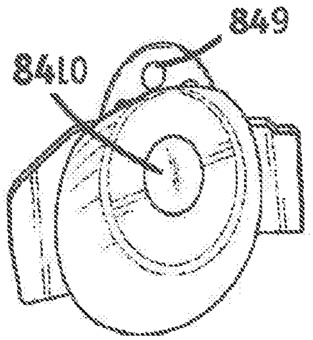

(viii) From the FIG. 84 show the alternative for ratable 1st optic-lens (849) which has lower position LED or laser light source (Not shown) to go through and emit the lighted image or-and patterns to the 2nd optics-lens (8410) to enlarge size or-and spread to wider areas. The said 1st or 2nd optics-lens as above discussed can selected from hundreds of the combinations.

Figure 85:
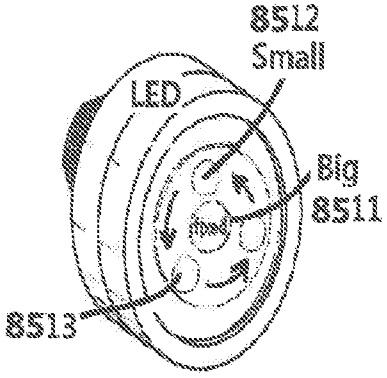
Figure 87:
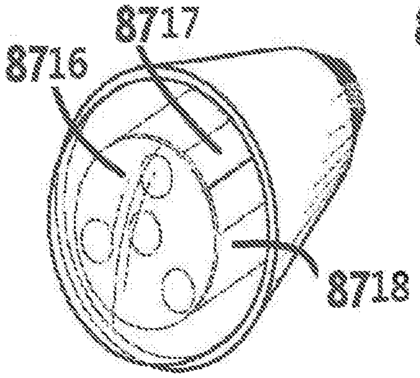

(ix) From the FIGS. 85, 87 which is the combo (i) light source or-and (ii) combo 1st or 2nd optic-lens or-and (iii) combo tube concept which has the Center big-tube (8511) and surrounding is rotating plurality of the 1st optics-lens so can create a combo-image including the fixed non-rotating big-size image or-and patterns, and surrounding with moving and changeable small-size image or-and patterns. The lower position light source can be LED or-and laser light source (not shown).

Figure 86:
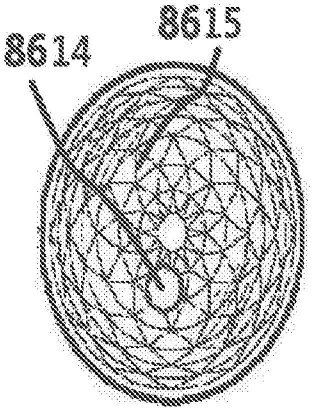
Figure 88:
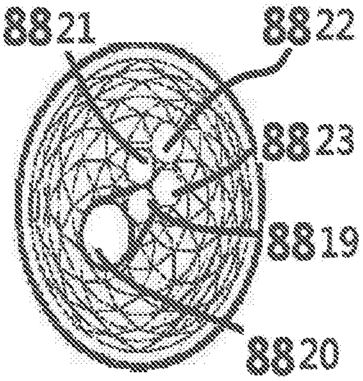

From the FIG. 86 and FIG. 88 the outdoor light 2nd optics-lens in preferred round shape for cross-section view which may be is ½ ball or more than ½ ball or sphere or dome or flat shape. The said $2^{nd}$ optic-lens which has combo image-forming unit(s) including LED light source's (8821) (8822) (8823) refractive or-and reflective or-and diffusion (8615) or-and protective lens (8614) (8820), and Laser light source's (8819) has grating or- and hologram piece on inner as 1st optic-lens and 2nd optic-lens is a protective lens (8814) (8820)

It is appreciated above details description for each parts discussed on above and all co-pending or parent filed case for each parts should be consider still fall into current invention scope and claims including each parts or construction or assembly or system with alternative or equivalent function or replaceable parts also should fall within the current invention's scope and claims including all co-pending and parent filed cases for (#Q-Family=Filed on 2007 has its child filed pending cases)

(#FF-family=Parent case filed on 2008 and its child filed pending cases) (#II-family=parent filed on 2009 and its child filed pending cases)

(#TT-family=filed on 2010 and its child pending cases)

(#XX-family=Parent filed on 2010 and its child pending cases) (#QQQ-family=Parent filed on 2012 and its child pending cases) (#ZZZ-family=Parent filed on 2013 and its child pending cases).

The invention claimed is:

1. An AC powered LED projection light for creating a moving or changeable image and/or pattern, comprising:

at least one LED;

at least one image carrier configured to create an image and/or pattern;

at least one projection lens having at least a refractive function for projecting the image or pattern to a surface situated at least one foot away from the LED light projection device when a light beams from the at least one LED pass through the at least one image carrier and the at least one projection lens, wherein:

the at least one LED, the at least one image carrier, and the at least one projection lens are arranged in at least one of a housing, tubular piece, frame, support, and part of the LED light, movement or changing of the image and/or pattern is caused by at least one of the following arrangements:

(a) at least one of an integrated circuit and circuitry for turning more than one said LED on and off for at least one of sequential flashing or sequential fade-in and fade-out;

(b) a motor or time movement for causing movement, rotation, or changes in position of at least one of:

(i) said image carrier, a disc, or a holder, in which is installed or built-in a plurality of said image carriers; in front of white or color LEDs without any collimating elements to create parallel light beams, (ii) at least one cover, optics lens, rotatable holder, or movable holder on which is installed or injected in a plurality of refractive or optics lenses; to cause at least one same image to move from one position to another position, and (iii) at least one optics lens or prism lens in front of an integrated circuit controlled plurality of white or colorful LEDs; without any collimating elements to create parallel light beams; and (c) a magnetic unit and magnetic coil set for causing the movement, rotation, or changes in position of at least one of the following:

(i) said image carrier, or a disc in which is installed or built-in a plurality of said image carriers; in front of white or color LEDs without any collimating elements to create parallel light beams, (ii) at least one cover, optics lens, rotatable holder, or movable holder on which is installed or built-in a plurality of refractive or optics lenses; to cause at least one same image to move from one position to another position, and (iii) at least one optics lens or prism lens in front of an integrated circuit controlled plurality of white or colorful LEDs; without any collimating elements to create parallel light beams.

2. An AC powered LED projection light for creating a moving image and/or pattern as claimed in claim 1, wherein the image carrier has at least one of a printed window, film, slide, texture, treatment, variable thickness, marking, opening, cut-out, stencil, and display unit.

3. An AC powered LED projection light for creating a moving image and/or pattern as claimed in claim 1, wherein the projection light is at least one of an LED outdoor light, LED seasonal light or tree top light string or light device, LED Halloween light string or light device, and LED Christmas light string or light device, for indoor and/or outdoor use and connected with a power source by an AC or USB plug wire, AC bulb-base, AC-to-DC transformer, or AC prong.

4. An AC powered LED projection light for creating a moving image and/or pattern as claimed in claim 1, wherein the image carrier is a first optics lens that creates a tiny lighted image or lighted pattern that is emitted to a top or front optics lens, wherein the top or front optics lens is (1) a top or front projection cover, (2) a refractive lens, or (3) a plurality of refractive or projection optics lenses fitted in a movable or rotatable disc holder or injected in one piece.

5. An AC powered LED projection light for creating a moving image and/or pattern as claimed in claim 1, wherein the motor is coupled to a gear set to reduce a high motor speed to a relatively lower speed for rotating at least one of: (1) the at least one image carrier, (2) a projection or decorative cover, (3) a rotatable disc holder having a plurality of refractive lenses or a plurality of refractive lenses injected in one piece, and (4) the at least one LED.

6. An AC powered LED projection light for creating a moving image and/or pattern as claimed in claim 1, wherein the at least one projection lens is a rotatable, replaceable, or movable disc or holder or injected piece having a plurality of refractive lenses.

7. An AC powered LED projection light for creating a moving image and/or pattern as claimed in claim 1, wherein the at least one LED includes a plurality of LEDs or at least one LED arranged to emit a plurality of colors, and incorporated with an integrated circuit to enable color changing, freezing, selection, or brightness adjustment.

8. An AC powered LED projection light for creating a moving image and/or pattern as claimed in claim 1, wherein the at least one projection lens or cover is a piece with or without a plurality of built-in refractive lenses.

9. An AC powered LED projection light for creating a moving image and/or pattern as claimed in claim 1, wherein the at least one projection lens or cover is or has at least one of the following: (1) a plurality of projection refractive lenses, (2) more than one optical property, (3) a treated prism, (4) a variable thickness, and (5) a refractive, reflective, refractive and reflective, or protective lens.

10. An AC powered LED projection light for creating a moving image and/or pattern as claimed in claim 1, wherein the moving device causes at least one of the at least one projection lens, at least one image carrier, and at least one LED; to undergo or cause at least one of the following motions: (a) rotation, (b) spinning, (c) vibrating, (d) shaking, and (e) waving.

11. An AC powered LED projection light for creating a moving image and/or pattern as claimed in claim 1, wherein the controller, integrated circuit, or circuitry creates said apparent motion or changing of the projected image or lighted pattern by controlling at least one group of the LEDs to exhibit at least one of the following light effects: (a) sequential flashing, (b) fade-in and fade-out, (c) pair flashing, (d) randomly flash, (e) turn on and turn off at desired times, (f) change, mix, or freeze colors, or (g) exhibit other LED light performances, effects, duration, or duty cycles.

12. An AC powered LED projection light for creating a moving image and/or pattern as claimed in claim 1, wherein the at least one image carrier is an optics lens or piece that includes at least one area, section, part, or surface having at least one of: (1) a texture, (2) printing, (3) marking, (4) sand polish, (5) laser carving, and (6) art or a design.

13. An AC powered LED projection light for creating a moving image and/or pattern as claimed in claim 1, comprising at least one tube or tube assembly having at least one of the following configurations:

(A) the tube or tube assembly acts as a light blocking unit to prevent light not emitted by the at least one LED from interfering with a pre-designed light performance;

(B) at least a second tube or projection assembly projects an image or light pattern having at least one of a different size, movement, and color with the first tube or projection assembly;

(C) each tube or tube assembly has a predetermined light function and projects its own predetermined said image or light pattern; and (D) each tube or tube assembly acts as a light-blocking unit to prevent LED light beams from leaking out of the tube or tube assembly and reducing a brightness of the projected image or light pattern.

14. An AC powered LED projection light for creating a moving image and/or pattern as claimed in claim 1, wherein the projected image is at least one of a cartoon, character, time, geometrically shaped image, logo, word, artwork, weather display, seasonal sign, seasonal related marking, seasonal art, visible image, and lighted art; the projected image having at least one of:

(1) a preferred size, diameter, shape, angle, or color, or (2) a preferred moving, steady, rotating, and/or surrounding type of image or lighted pattern.

15. An AC powered LED projection light for creating a moving image and/or pattern as claimed in claim 1, wherein the at least one projection lens is included in a rotating assembly that causes the projected image or light pattern to move along at least one of (1) a predetermined path, (2) an up and down or right and left moving path, (3) an arc path, (4) one side to another side, and (5) from one side of a circle, contour, or geometric shaped edge to another side.

16. An AC powered LED projection light for creating a moving image and/or pattern as claimed in claim 1, wherein the at least one image carrier is a fixed and/or rotating image carrier having at least one of (i) shaped openings or cutouts, (ii) printing, (iii) windows, (iv) textures, (v) markings, (vi) carvings, (vi) polishing, (vii) art, (viii) treated parts, segments, or areas.

17. An AC powered LED projection light for creating a moving image and/or pattern as claimed in claim 1, wherein light beams from the at least one LED pass through at least one fixed or rotating first optic lens having a desired textured or treated optic surface, segments or area, and light beams exiting the first optics lens are emitted to at least one fixed or rotating second refractive element or protective cover having a relatively large size and a shape selected from (i) a dome or sphere, (ii) at least a half ball, or (iii) a flat cover.

18. An AC powered LED projection light for creating a moving image and/or pattern as claimed in claim 1, wherein the at least one image carrier includes at least one of a top or front (a) projection cover or lens, (b) refractive lens or cover, (c) protective cover, and (d) protective lens; each having at least one of a printed window, cutout, texture, marking, carving, laser carving, printing, variable thickness, stencil, film, plastic piece, printed piece, and slide.

19. An AC powered LED projection light for creating a moving image and/or pattern as claimed in claim 1, wherein the at least one projection lens or cover is at least one of an (i) outer cover, (ii) a sealed outer transparent housing, (iii) a top or front refractive projection lens, and (iv) a protective-cover; having a round shape, semi-spherical shape, spherical shape, or flat shape.

20. An AC powered LED projection light for creating a moving image and/or pattern as claimed in claim 1, wherein the at least one LED further comprises an additional optic lens or cover situated in front of each LED for widening and/or collimating a narrow light beam emitted out from the at least one LED before it passes through each image carrier.

21. An AC powered LED projection light for creating a moving image or lighted pattern, comprising:

at least one LED;

at least one image carrier configured to create an image and/or lighted pattern;

at least one refractive projection lens or cover for enlarging a size of the image and/or pattern when a light beams from the at least one LED pass through the at least one image carrier and the at least one projection lens or cover, to project an enlarged said image and/or lighted pattern to a surface situated at least one foot away from and/or on the LED projection light;

at least one, an AC plug-wire, and/or circuitry for connecting with an AC power source; and at least one moving device for causing the projected enlarged image and/or lighted-pattern to appear to move or change, wherein the at least one moving device includes a motor, time movement, or magnet and coil set for causing movement of at least one of (i) the at least one image carrier, (ii) the at least one refractive projection lens or cover, and (iii) the at least one LED, and thereby cause the apparent motion or changing effect of the enlarged image and/or lighted pattern, which is projected by the at least one projection lens or cover and not by a pin hole image function lens.

22. An LED projection light for projecting a moving image, comprising:

at least one LED;

at least one image carrier configured to create an image and/or lighted pattern;

a plurality of refractive lenses or a cover that is (1) injected into one structure or (2) fitted within a rotatable disc or holder to project the image and/or pattern when a light beams from the at least one LED pass through the at least one image carrier and the at least one projection lens or cover, and show the projected image and/or lighted pattern on a surface situated a plurality of feet away from and/or on the LED projection light for applications selected from: (i) an outdoor garden light, (ii) an indoor or outdoor light string, (iii) an indoor or outdoor seasonal light or treetop light, (iv) an indoor or outdoor plug-in light, or (v) an outdoor AC plug-wired or AC-to-DC transformer powered light;

at least one of an integrated circuit and circuitry for controlling a color, brightness, or light effects of the at least one LED; and at least one moving device for causing the projected image and/or lighted pattern to appear to move or change, wherein moving or changing image and/or lighted pattern is projected by the at least one projection lens or cover, and not by a pin hole image function lens.

23. An LED outdoor light for projecting an image or lighted pattern, comprising:

at least three parts, the at least three parts including:

(i) at least one LED having at least one of: (a) at least one white light beam for image projection, and (b) at least one colorful light beam for lighted pattern projection;

(ii) an image carrier that is or has at least one of a (1) film, (2) opening, (3) printing, (4) marking, (5) carving, (6) textured piece, (7) slide, (8) textured lens, (9) variable thickness lens, (10) treated lens, (11) marked lens, and (12) piece with a shaped hole, cutouts, opening, or art; to create the image and/or lighted pattern; and (iii) a plurality of optics lenses injected into one piece, or fitted with a holder or a top protective cover; having refractive properties or optical properties other than pin hole imaging properties, wherein the at least three parts are situated or installed by a frame, housing parts, or support inside an outdoor light housing to cause the image and/or light pattern to be projected onto a light device surface, and/or an outdoor building, house, ground, or desired surface that is at least a plurality of feet away from the LED outdoor light, and wherein the LED outdoor light further includes at least one moving device and the moving device is at least one of (a) a motor, time movement, or magnet and coil set to move, rotate, or spin at least one of (1) an image carrier, (2) a plurality of optics lenses injected into one piece or fitted with a holder or cover, and (3) a top protective cover, and (b) at least one of a circuit, integrated circuit, controller, and sensor, to cause the at least one LED to turn-on and turn-off, sequentially flash, or sequentially fade-in and fade-out, to create a projected image and/or pattern with at least one of changing, moving, rotating, and variable effects.

24. An LED outdoor light for projecting an image or lighted pattern as claimed in claim 23, wherein the moving device moves at least of: (a) the at least one LED, (b) the at least one image carrier, and (c) the at least one projection lens or cover; to cause: (i) moving, rotating, swinging of the projected image or pattern, and/or (ii) changing of at least one of a position, color, or focus of the projected image or pattern.

25. An LED outdoor light for projecting an image or lighted pattern as claimed in claim 23, wherein light beams are emitted by the at least one LED to the at least one image carrier to form a tiny shaped and/or color image, which is then emitted to the at least one projection lens or a rotating holder having a plurality of built-in or injected refractive lenses, or a cover with or without art or optical arrangements.

26. An LED outdoor light for projecting an image or lighted pattern as claimed in claim 23, wherein the image carrier is or has at least one prism lens that rotates to cause multiple reflections and refractions of light beams from the at least one LED, which are emitted to the top or outer cover.

27. An LED outdoor light for projecting an image or lighted pattern as claimed in claim 23, wherein the at least one image carrier has a top rotating disc or holder or piece in which is installed or injected a plurality of refractive lenses to cause the projected image or lighted pattern to travel a predetermined path.

28. An LED outdoor light for projecting an image or lighted pattern as claimed in claim 23, wherein the motor has a gear set to reduce a high motor rotating speed to a desired rotating speed for (1) the at least one image carrier, (2) the at least one projection lens or cover, or (3) a rotating disc, piece, or holder which has a plurality of refractive lenses.

29. An LED outdoor light for projecting an image or lighted pattern as claimed in claim 23, wherein the LED outdoor light has a connector to receive input power from at least one (1) an AC plug or USB wire, (2) an AC bulb-base, (3) an AC prong, or (4) an outside transformer having an AC-to-DC circuit.

30. An LED outdoor light for projecting an image or lighted pattern as claimed in claim 23, wherein the at least one LED is an LED dice, LED chip, dual in-line pin (DIP) LED, multiple different color dice or chips built-in one LED, or chip on board (COB) LED.

31. An LED outdoor light for projecting an image or lighted pattern as claimed in claim 23, wherein the at least one LED has more than one color, or is an LED having multiple colors.

32. An LED outdoor light for projecting an image or lighted pattern as claimed in claim 23, wherein the at least one projection lens or cover has more than one segment, area, part, or piece which is or has a (i) single optic lens, (ii) convex lens, or (iii) treated surfaces, and wherein the segments, areas, parts or pieces are assembled or injection molded to form a single projection lens or cover, which is in a shape of a ball, sphere, half-ball, flat piece, curved piece, flat dome, curved dome, or at least half ball to fit into an outdoor light housing, frame, holder, or disc.

33. An LED outdoor light for projecting an image or lighted pattern as claimed in claim 23, wherein the at least one projection lens or cover includes a plurality of combined, assembled, or injected optics lenses or pieces, which are tiny sized and spaced from each other.

34. An LED outdoor light for projecting an image or lighted pattern as claimed in claim 23, wherein light beams exiting from the at least one image carrier pass through at least one part rotated by a motor, movement, or rotating device, and said part is selected from:

(i) the at least one projection lens or cover, (ii) a disc, holder, or injected having or installed with a plurality of refractive lenses, (iii) the top protective cover having a plurality of tiny convex lenses, diamond-cut surfaces, or spiral lined, curve-lined, engraved or grooved surfaces, or (iv) a disc or holder installed with plurality of said image-carriers.

35. An LED outdoor light for projecting an image or lighted pattern as claimed in claim 34, wherein the at least one image carrier is or has (1) a treated lens, (2) an injected plastic piece, or (3) a piece made of a light blocking material and having at least one of a printed window that is not punched through, a film, a slide, an opening, a cut-out, a stencil, a marking, carving, laser carving, laser printing, texture, and a display-unit.

36. An LED outdoor light for projecting an image or lighted pattern as claimed in claim 34, wherein the moving device rotates, spins, moves, vibrates, shakes, or waves at least one of the projection lens, the discs, or the top cover.

37. An LED outdoor light for projecting an image or lighted pattern as claimed in claim 23, wherein the at least one of a circuit, integrated circuit, controller, and at least one sensor creates said apparent motion or changing of the projected image or lighted pattern by controlling a plurality of the LEDs to (a) sequentially flash, (b) fade-in and fade-out, (c) change colors, (d) randomly flash, (e) turn on and turn off at desired times, (f) change, mix, or freeze colors, or (g) exhibit other LED light performances, effects, duration, or duty cycles.

38. An LED outdoor light for projecting an image or lighted pattern as claimed in claim 34, wherein the LED outdoor light is or has an added optics lens or piece including texturing, printing, an image, or a refractive function.

39. An LED outdoor light for projecting an image or lighted pattern as claimed in claim 34, wherein the LED light is or has a cone shaped housing which has wider top and a narrower base.

40. An LED outdoor light for projecting an image or lighted pattern as claimed in claim 34, wherein the projected image or lighted pattern is or has at least one of (1) a cartoon, (2) a character, (3) a geometrically shaped image, (4) a lighted pattern, (5) a logo, (6) a word, (7) an artwork, (8) and a weather display.

41. An LED outdoor light for projecting an image or lighted pattern as claimed in claim 34, wherein a moving projected image created by a rotating (A) plurality of refractive lens fitted into, injected into, or installed within a holder, injection piece, or disc, or (B) injected piece, such that the projected image is a continuously moving image that moves from one side to another side or up and down along an arc, circle, curve, line, or pre-determined path.

42. An LED outdoor light for projecting an image or lighted pattern as claimed in claim 34, wherein the LED outdoor light has at least one of the following features: (A) the at least one image carrier includes at least one of a steady or rotating image carrier which has shaped openings or cutouts, printing, or windows, (B) the at least one LED has more than one color, and (C) the top protective cover is installed on top of refraction lenses to project the steady and/or rotating image or lighted pattern having a predetermined size or viewing angle.

43. An LED outdoor light for projecting an image or lighted pattern as claimed in claim 34, wherein the image carrier is at least one rotating first prism, textured, or treated optics lens that creates the image or lighted pattern and allows LED light beams to pass through and be emitted to a fixed second relatively large optics lens, piece, or cover, that forms a moving projected image.

44. An LED outdoor light for projecting an image or lighted pattern as claimed in claim 43, wherein the first optics lens is textured and shaken by a magnet and coil set and the second optics lens, piece, or protective cover has a shape selected from (i) a dome or sphere, (ii) at least a half ball, or (iii) a flat or flat dome cover; to refract and/or transmit LED light beams that have traveled through and/or been dispersed by the first optic-lens to form the moving light effects.

45. An LED outdoor light for projecting an image or lighted pattern as claimed in claim 34, wherein the at least one image carrier includes a first light-blocking optics element having a plurality of printed windows, cutouts, textures, markings, printing, carvings, stencils, films, or slides, and wherein light exiting from the light-blocking optics element passes through the rotating first optics lens, and then passes through the top cover, which serves as a second optics lens and has a sphere shape, at least ½ ball shape, or flat shape.

46. An LED outdoor light for projecting an image or lighted pattern as claimed in claim 34, wherein the at least one projection lens is formed by a relatively large flat or curved (i) cover, (ii) outer or top cover having refractive and/or reflective optics properties, (iii) an outer projection lens, or (iv) a front or top protective cover.

47. An LED outdoor light for projecting an image or lighted pattern as claimed in claim 34, wherein the LED light has more than one LED and is controlled by the integrated circuit and/or controller to cause color and/or pattern changing, and wherein the LED light has (A) an outer or top cover, (B) a dome cover, (C) an outer ball, or (D) a top piece through which the image is projected and/or that is provided to protect inner parts.

48. An LED outdoor light for projecting an image or lighted pattern as claimed in claim 34, wherein the outdoor LED light has a first optic lens that serves as said at least one image carrier to form multiple LED light beams and a second optics lens or cover that serves as the at least one projection and/or protective lens.

49. An LED outdoor light for projecting an image or lighted pattern as claimed in claim 34, further including fixed or rotating first and second optics lenses.

50. A seasonal LED light, LED light string, or tree top LED light having moving image projection, comprising:

(1) at least one LED, (2) at least one image carrier, (3) at least one refractive lens or a plurality of optics lenses injected into one piece or fitted within a holder, and (4) a flat, dome, or spherical cover;

to create and project an image or lighted pattern onto an indoor ceiling, walls, or floor, or on an outside building or house surface a plurality of feet away from the seasonal LED light, LED light string, or tree top LED light;

at least one motor, movement, or magnet and coil set; to cause (i) the at least one image carrier, (ii) the at least one projection lens, (iii) the plurality of optics lenses injected into one piece or fitted within a holder, or (iv) the flat, dome, or the spherical cover to move, rotate, spin, shake, or wave and thereby move the projected image or lighted pattern, wherein:

the at least one LED is connected with a power source and circuit to turn on the at least one LED and provide a light function, effects, or performance, and the image carrier includes at least one of a film, slide, and prism lens through which light beams from the at least one LED pass to form a small image or pattern that is emitted to at least one of:

(1) the projection lens, (2) the plurality of optics lenses injected into one piece or fitted with a holder, and (3) the flat, dome, or spherical cover, to project the moving image or lighted pattern, wherein the image or light pattern is not a pinhole image.

51. An LED bulb or tree top light having moving image projection, comprising:

(1) at least one LED, (2) at least one image carrier, (3) at least one refractive lens or a plurality of optics lenses injected into one piece or fitted within a holder, and (4) a flat, dome, or spherical cover;

to create and project an image or lighted pattern onto an indoor ceiling, walls, or floor, or on an outside building or house surface a plurality of feet away from the seasonal LED bulb or tree top light;

at least one motor, movement, or magnet and coil set configured to cause the at least one of the at least one image carrier, the at least one projection lens, the plurality of optics lenses injected into one piece or fitted within a holder, or the flat, dome, or the spherical cover, to move, rotate, spin, shake, or wave and thereby move the projected image or lighted pattern; and at least one of a circuit, integrated circuit, controller, and sensor to cause the at least one LED to turn-on and turn-off and provide predetermined light functions, effects, or performance, wherein:

the image carrier is selected from: (a) a piece having openings, (b) a film, slide, or piece having printing or marking, or made up of different materials, (c) a display-unit, (d) a textured lens, treated lens, or prism lens or piece, (e) a variable thickness lens or piece, (f) a marked lens or piece, (g) a treated lens or piece, (h) a printed piece, (i) a piece having cutouts, or holes, or shaped art, or (j) a disc or holder having built-in installed, or injected a plurality of optics lenses, refractive and/or reflective lenses, or diffusing lenses, wherein an LED light beam emitted to the image carrier creates tiny images and/or lighted patterns, the light beams exiting the image carrier to at least one of (A) the projection lens or cover, (B) a carrier having a plurality of projection or optics lenses, and (C) the flat, dome, or spherical cover, to enlarge and project the moving image or lighted pattern, and the LED bulb is an individual detachable or non-detachable unit, and the LED unit is injected with, assembled to, or detachable from a light string or at least one electric wire for at least one of a hanging light string, landscape light string, pathway light string, patio light string, indoor light string, seasonal light string, tree top light device, and outdoor garden light; for indoor or outdoor use.

52. A seasonal tree top or light string light device, comprising:

(1) at least one LED and/or laser light source, (2) at least one image carrier or grating piece that serves as a first optic element, and (3) at least one second optics element that is one of (3a) a refractive lens, projection lens, plurality of optics lenses injected into one piece or fitted within a holder, or (3b) a flat, dome, or spherical cover;

to project at least one LED and/or laser image and/or light pattern, wherein:

the first optics element is configured to create an image and/or lighted pattern, and is at least one of:

(a) the image carrier, which is (1) refractive, (2) reflective, (3) diffusing, and/or forms the image or patterns, and is selected from at least one of a prism-lens, a diffusing lens, a variable thickness lens, a convex lens, a treated optics lens having markings, art, or printing, a film, a slide, a light-blocking piece having at least one cut-out, a piece having at least one window, and a piece having at least one shaped hole, and (b) the grating piece, which has diffractive properties to split a laser beam into a plurality of dots, figures, lines, or matrix art, light beams from the at least one LED and/or laser pass through the at least one first optics element and are emitted to at least one steady, rotating, movable, detachable, or replacable second optical element for:

(A) LED applications in which the second optical element is rotated by at least one of a motor, movement, and magnetic coil, or (B) Laser applications in which the second optical element is fixed, installed in a manually rotatable holder, or moveable about more than one axis, and the seasonal tree top or light string light device has (1) AC plug wires, or (2) an external transformer, or (3) a built-in or external DC power source to connect with an AC or DC power source through a conductive piece or USB wire.

53. An AC powered seasonal outdoor light, comprising:

(1) at least one LED and/or laser light source, (2) at least one image carrier or grating piece, and at least one of:

(3a) a refractive lens, projection lens, plurality of optics lenses injected into one piece or fitted within a holder, (3b) a flat, dome, spherical, or protective cover;

to project at least one LED and/or laser image and/or light pattern, wherein:

the at least one image carrier or grating piece is a first optics element, light beams from the at least one LED and/or laser light source pass through the at least one first optics element to create tiny images and/or lighted patterns, and then are emitted to:

(1) at least one stead or rotating plurality of refractive lenses injected into one piece or fitted within a movable, detachable, or replaceable holder, and/or (2) a protective cover to:

(a) split a laser beam into dots, at least one figure, at least one line, and at least one geometric shape, and/or (b) change a size, spread-out angle, and/or range of the tiny images or lighted patterns exiting from the first optics element to be shown on at least one of:

(i) an outdoor surface that is feet away from the seasonal outdoor light, and (ii) a surface of the seasonal outdoor light, and the AC powered LED and/or laser seasonal outdoor light has (1) internal AC-to-DC circuitry and an AC plug wire, or (2) an external transformer; or (3) at least one built-in or external DC power source connected through a conductive piece or USB wire, to connect the LED and/or laser seasonal outdoor light with an AC or DC power source to provide light functions.

* * * * *